United States Patent [19]

Pope

[11] Patent Number: 5,390,262
[45] Date of Patent: Feb. 14, 1995

[54] METHOD FOR SPLITTING AND CONFIGURING A MULTI-CHANNEL IMAGE PROCESSING SYSTEM

[75] Inventor: Charles K. Pope, Waterloo, Canada

[73] Assignee: NCR Corporation, Dayton, Ohio

[21] Appl. No.: 770,793

[22] Filed: Oct. 3, 1991

[51] Int. Cl.[6] .................................................. G06K 9/36
[52] U.S. Cl. .................................. 382/41; 358/474; 382/49; 382/27
[58] Field of Search ........................ 382/27, 41, 49; 358/486, 474, 140; 348/441, 448

[56] References Cited

U.S. PATENT DOCUMENTS

| | | | |
|---|---|---|---|
| 3,588,329 | 6/1971 | Monk et al. | 358/426 |
| 4,302,775 | 11/1981 | Widergren et al. | 382/56 |
| 4,314,281 | 2/1982 | Wiggins et al. | 358/406 |
| 4,326,258 | 4/1982 | de la Guardia | 358/464 |
| 4,395,700 | 7/1983 | McCubbrey et al. | 382/27 |
| 4,398,221 | 8/1983 | Yamaguchi | 358/410 |
| 4,410,916 | 10/1983 | Pratt et al. | 358/433 |
| 4,433,346 | 2/1984 | Stoffel et al. | 358/455 |
| 4,484,349 | 11/1984 | McCubbrey | 382/41 |
| 4,509,194 | 4/1985 | Harrington | 382/56 |
| 4,571,634 | 2/1986 | Caneschi et al. | 358/261.3 |
| 4,575,768 | 5/1986 | Sakai et al. | 358/464 |
| 4,597,016 | 6/1986 | Nakamura et al. | 358/261.1 |
| 4,652,935 | 3/1987 | Endoh et al. | 358/429 |
| 4,654,719 | 3/1987 | Tomita | 358/432 |
| 4,684,997 | 8/1987 | Romeo et al. | 358/408 |
| 4,688,100 | 8/1987 | Haganuma et al. | 358/261.1 |
| 4,716,471 | 12/1987 | Yokomizo | 358/296 |
| 4,719,514 | 1/1988 | Kurahayashi et al. | 358/431 |
| 4,888,812 | 12/1989 | Dinan et al. | 382/7 |
| 4,916,551 | 4/1990 | Lin et al. | 358/483 |
| 5,128,760 | 7/1992 | Chauvel | 358/140 |
| 5,163,100 | 11/1992 | Mathieu et al. | 382/41 |
| 5,287,416 | 2/1994 | Capo et al. | 382/27 |

Primary Examiner—Leo H. Boudreau
Assistant Examiner—Larry J. Prikockis
Attorney, Agent, or Firm—Elmer Wargo

[57] ABSTRACT

A system and method for processing image data from a document and for producing a compressed binarized version of the image data for transmission to or use by subsequent users. Processing of the image data is done in parallel after the scanning of the document is started but before the entire document is scanned. A splitter is used to divide a scan line of image data produced by an imager at the scan line into a plurality of channels, with each channel having at least one overlap area of pixels and with the overlap areas of pixels being used to avoid errors between channels. The number of channels is automatically determined by the system in accordance with input scanning and document parameters. Thresholding and compression are performed by each one of the channels in parallel. The compression is performed in a direction which is perpendicular to the direction of scanning and conforms to a standard compression algorithm like CCITT Group 4.

9 Claims, 41 Drawing Sheets

SCANNING LINE 14

SCANNER 18, (2 CHANNELS)

CHANNEL #1 - 0, 2, 4, 6, 8 ...

CHANNEL #2 - 1, 3, 5, 7, 9 ...

SCANNER 18-1, (4 CHANNELS)

CHANNEL #1 - 0, 4, 8, 12 ...

CHANNEL #2 - 1, 5, 9, 13 ...

CHANNEL #3 - 2, 6, 10, 14 ...

CHANNEL #4 - 3, 7, 11, 15 ...

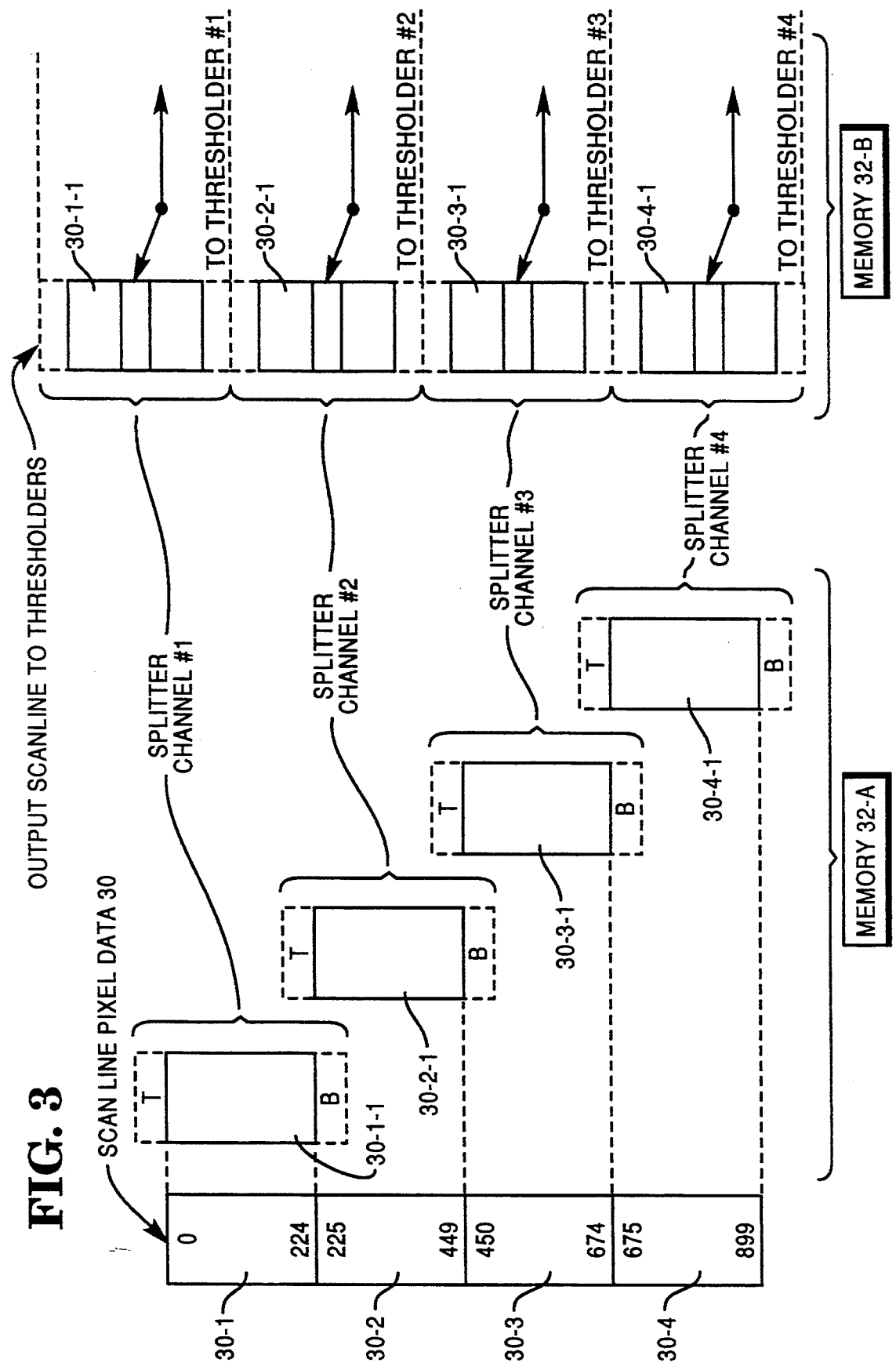

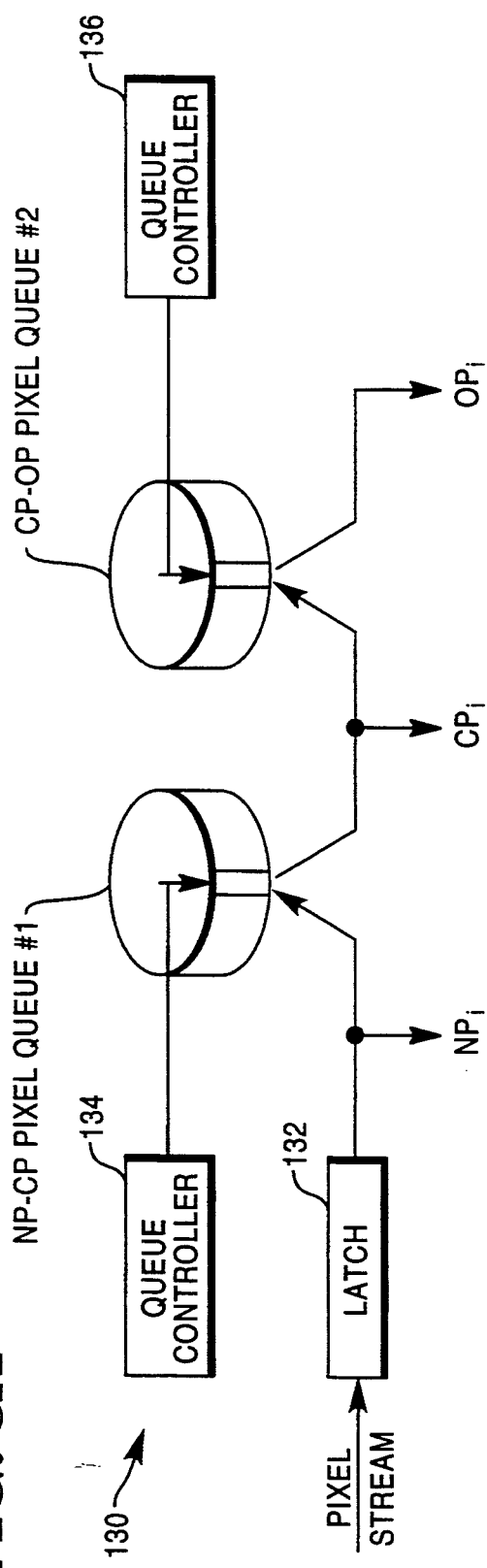
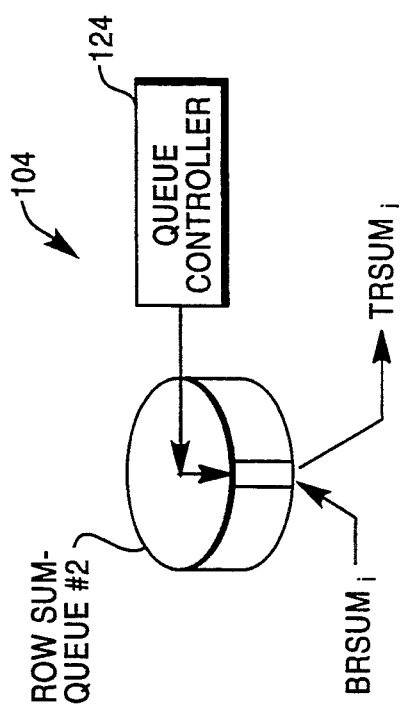
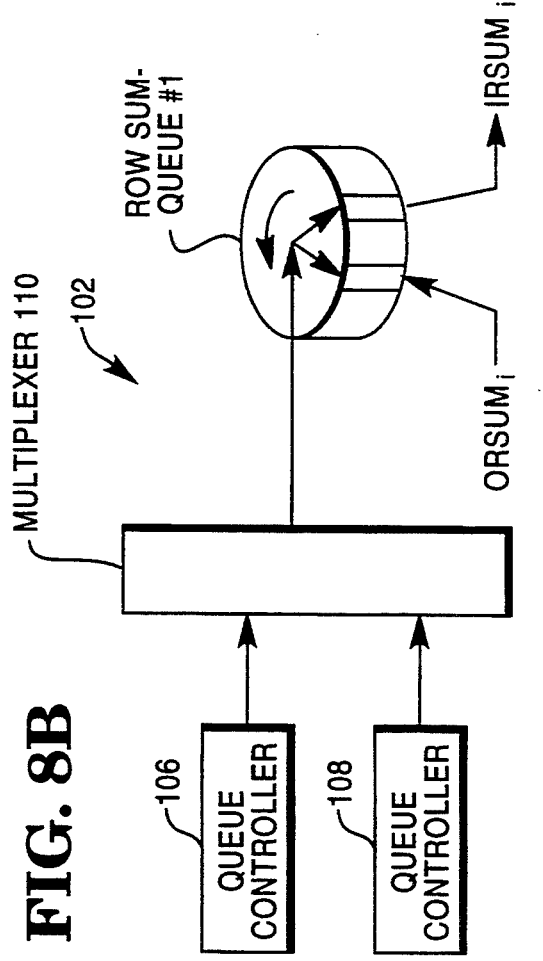
FIG. 8A
FIG. 8B
FIG. 8C

NO OFFSET
NO SCALING

OFFSET
NO SCALING

AVERAGE GRAY SCALE VALUE (6 BITS) = $\dfrac{\text{TOTAL ASUM}}{2^N * 2^F}$ ;
WHERE $0 < F < 1$ ; $1 < 2^F < 2$

OFFSET
AND
SCALING
(SHIFTED)

SCALED AVERAGE GRAY SCALE VALUE (BLOCK 56 IN FIG. 6 (6 BITS) = $\dfrac{\text{TOTAL ASUM}}{2^N}$

FIG. 19

| ROW | COLUMN #1 | COLUMN #2 | COLUMN #3 | COLUMN #4 |
|---|---|---|---|---|
| #1 | 1 0 0 0 0 0 0 0 / 1 (178, 176, 180) | $V_R(3)$ | (7) | 0000011 |
| #2 | 0 1 0 0 0 0 0 0 / 1 | $V_R(2)$ | (6) | 000011 |
| #3 | 0 0 1 0 0 0 0 0 / 1 | $V_R(1)$ | (5) | 011 |
| #4 | 0 0 0 1 0 0 0 0 / 1 | V(0) | (4) | 1 |
| #5 | 0 0 0 0 1 0 0 0 / 1 | $V_L(1)$ | (3) | 010 |
| #6 | 0 0 0 0 0 1 0 0 / 1 | $V_L(2)$ | (2) | 000010 |
| #7 | 0 0 0 0 0 0 1 0 / 1 | $V_L(3)$ | (1) | 0000010 |
| #8 | 1 0 0 0 0 0 0 X / 1 (222, 220) | H | | 001+<br>RUN LENGTH #1+<br>RUN LENGTH #2 |
| #9 | X X X 1 0 0 0 1 / 0 | P | | 0001 |

| BIT POSITION | | | | | | | |
|---|---|---|---|---|---|---|---|
| #7 | #6 | #5 | #4 | #3 | #2 | #1 | #0 |
| 1 | 1 | 1 | 0 | 1 | 0 | 1 | X |

BIT #7 — BITS #5,6 — BIT #4 — BITS #1-3

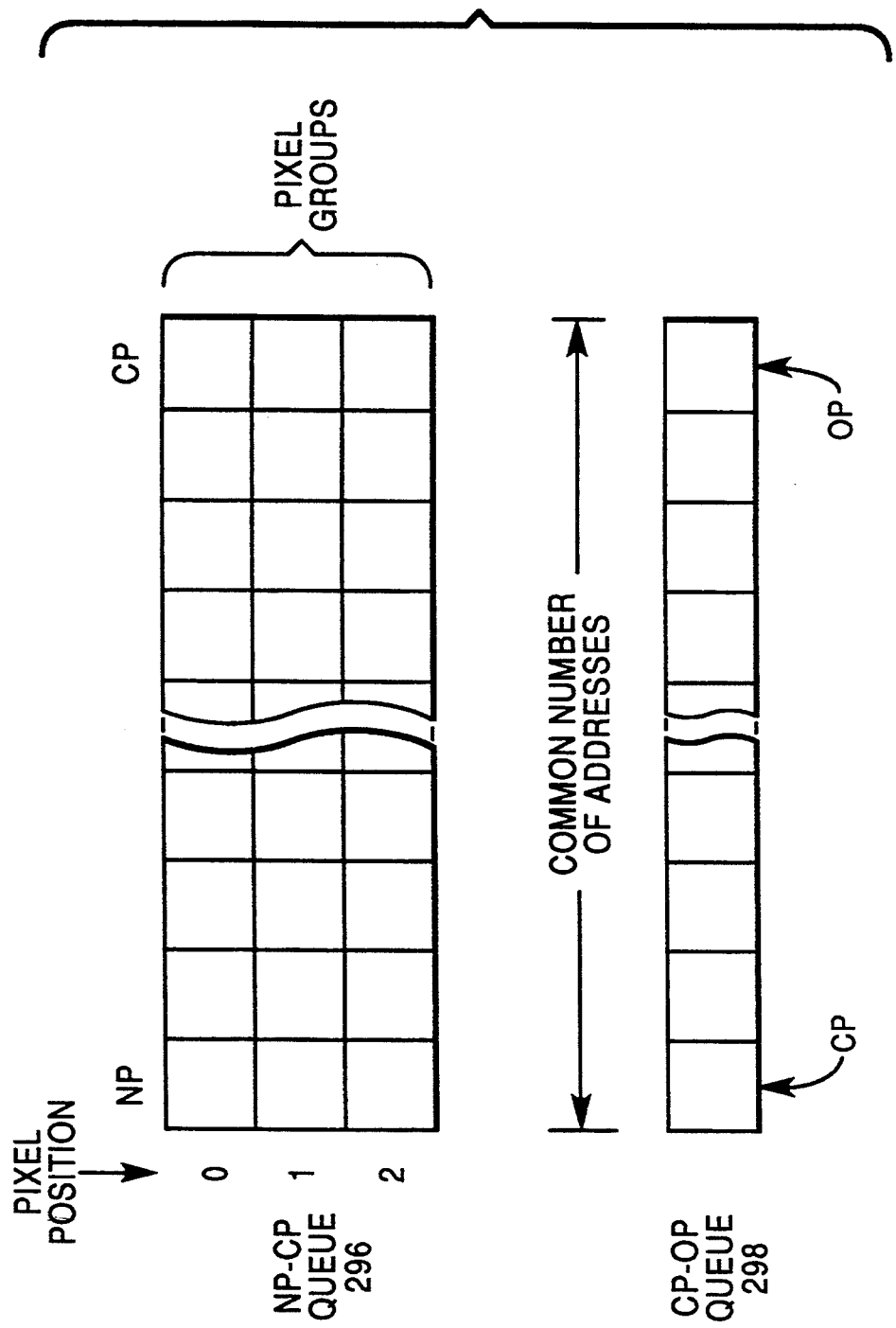

LOAD DISTRIBUTION LOOKUP TABLE:
(CHANNEL IMAGE HEIGHT FOR EACH CHANNEL)
NUMBER OF CHANNELS REQUIRED FOR APPLICATION (N)

| | 1 | 2 | 3 | 4 |
|---|---|---|---|---|
| 1 | FRAME HT. | $\dfrac{\text{FRAME HT.}}{2}$ | $\dfrac{\text{F.H.} + \left(\dfrac{KDY+1}{2}\right) + 1}{3}$ | $\dfrac{\text{F.H.} + (KDY+1) + 2}{4}$ |
| 2 | / | $\dfrac{\text{FRAME HT.}}{2}$ | $\dfrac{\text{F.H.} - \left(\dfrac{KDY+2}{2}\right) + 1}{3}$ | $\dfrac{\text{F.H.} - (KDY+1) - 2}{4}$ |
| 3 | / | / | $\dfrac{\text{F.H.} + \left(\dfrac{KDY-1}{2}\right) + 1}{3}$ | $\dfrac{\text{F.H.} - (KDY-1) - 2}{4}$ |
| 4 | / | / | / | $\dfrac{\text{F.H.} + (KDY-1) + 2}{4}$ |

FIG. 38

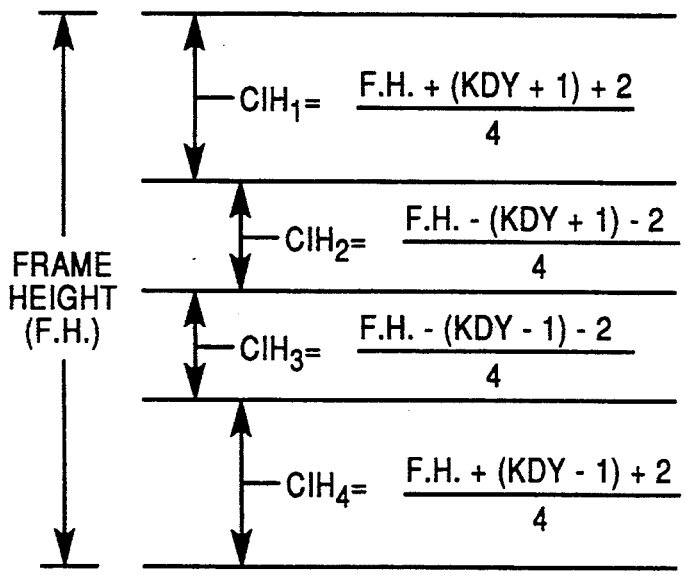

FRAME HEIGHT (F.H.)

$CIH_1 = \dfrac{\text{F.H.} + (KDY + 1) + 2}{4}$ $CIH_2 = \dfrac{\text{F.H.} - (KDY + 1) - 2}{4}$ $CIH_3 = \dfrac{\text{F.H.} - (KDY - 1) - 2}{4}$ $CIH_4 = \dfrac{\text{F.H.} + (KDY - 1) + 2}{4}$

OVERLAP REMOVAL PROCESS

METHOD FOR SPLITTING AND CONFIGURING A MULTI-CHANNEL IMAGE PROCESSING SYSTEM

CROSS REFERENCES TO RELATED APPLICATIONS

1. U.S. Ser. No. 07/772,893 for a Method And Modular System For High Speed Processing Of Item Images by Wayne M. Doran et al., filed Oct. 3, 1991, now U.S. Ser. No. 08/192937, filed Feb. 7, 1994.

2. U.S. Ser. No. 07/770,794 for a Method And System For Compressing Data In A Multi-Channel Image Processing System by John O. G. Vieth, filed Oct. 3, 1991, now U.S. Ser. No. 08/188365, filed Jan. 27, 1994.

3. U.S. Ser. No. 07/770,190 for a Method and Apparatus For Thresholding And Configuring A Multi-Channel Image Processing System by Charles K. Pope, now abandoned.

BACKGROUND OF THE INVENTION

This invention relates to a method and system for processing image data from an item, like a document, for example, and also for producing a compressed, binarized version of the image data for transmission to or use by subsequent users. In particular, this invention relates to a method for splitting and configuring a multi-channel image processing system.

In some financial systems, for example, documents, like checks and deposit slips, are scanned by an imager as the documents are moved along a document track by a document transport means. In general, the imager scans along a single scanning line as the document is moved past the imager. With this system, there may be 640 "pixels" or picture elements, for example, in a single scan, depending upon the size and resolution requirements of the system.

A pixel represents image data coming from a portion of the document at the scanning line. The pixel coming from the scanning line is generally an analog signal; however, it is converted, typically, to an eight bit byte of data by an analog/digital converter for further processing by the system. Successive scans of data are obtained as the document is moved past the imager.

The pixel data coming from imaging a document, as described, may be used, for example, to generate an image of the document on a video display or CRT. When so displayed, an operator viewing the image may perform data completion, for example, by entering the monetary amount, etc. (associated with the document) on a keyboard which is part of the financial system.

In recent years, efforts have been made to increase the throughput of documents by reducing the time required to process the image data.

SUMMARY OF THE INVENTION

The present invention is similarly related to reducing the time required to process image data. While the discussion of the invention may proceed with regard to a financial system for ease of explanation, it is apparent that this invention may be used, generally, where image data is to be processed, as, for example, in facsimile transmission.

One of the features of the present invention is that it provides an architecture which facilitates parallel processing of image data or pixels received from a scanning line. The parallel processing is effected by dividing the pixels at a scanning line into a plurality of processing channels.

The architecture mentioned supports direct migration from low to high speed applications by simply adding more processing channels in parallel.

Varying pixel densities at the scanning line, and varying item sizes to be scanned can be accommodated by adding more processing channels or by adding more memory space to a single processing channel.

Currently available imaging devices have one, two, four, and eight output channels, for example. The architecture of the present invention enables the number of output channels from the particular imaging device selected to be used in the system to be independent of the number of parallel processing channels used in the system. In other words, an imaging device having two output channels may be used in a system employing four processing channels.

The architecture of the present system permits the pixel data derived from a scanning line to be processed without intermediate storage, and it also permits identical processors to be used in the processing channels.

Another feature of this invention is that it is able to receive an input of 80,000,000 pixels per second, process them, and deliver them in a format which conforms to the CCITT compression algorithm. The input stated is a function of current technology, and it could be higher in the future.

While this invention is discussed in relation to compression of binarized data, the concepts discussed herein could also be applied to gray scale compression.

This invention relates to a method for splitting and configuring a multi-channel image processing system.

In a first aspect of this invention, there is provided a method of processing image data derived from scanning a document, with the image data presented in the form of successive scan lines of pixels, said method comprising the steps of:

(a) splitting each scan line of pixels into a plurality of processing channels, with a predetermined number of pixels being located within each of said processing channels; and (b) initiating processing of the pixels in said processing channels in parallel after a predetermined number of successive scan lines of pixels has been generated but before the entire document has been scanned;

said splitting being effected through using a split RAM bank for each one of said processing channels.

In another aspect of this invention, there is provided a method of configuring a system for processing image data derived from scanning a document, with the image data presented in the form of successive scan lines of pixels, said method comprising the steps of:

(a) using the number of pixels in a scan line of pixels to represent a Frame Height of pixels;

(b) splitting said Frame Height of pixels into a number of processing channels, with each processing channel having a Channel Image Height; and (c) adding at least one overlap group of pixels to each of said processing channels to arrive at a Channel Thresholder Height for each of said processing channels.

The above advantages and others will be more readily understood in connection with the following specification, claims, and drawing.

BRIEF DESCRIPTION OF THE DRAWING

FIG. 3 is a schematic diagram showing how a scan line of pixel data is divided into separate channels by the splitter shown in FIG. 1;

FIG. 8A is a schematic diagram showing certain data queues associated with the processing of data from an examining window;

FIG. 8B is a schematic diagram showing a row sum queue associated with the processing of data from an examining window;

FIG. 8C is a schematic diagram showing a second row sum queue associated with the processing of data from an examining window;

FIG. 19 is a chart showing various codes for different coding situations;

FIG. 32 is a schematic diagram showing an addressing scheme used with the second embodiment shown in FIG. 26;

FIGS. 33A and 33B, taken together, comprise a schematic diagram showing a circuit associated with the second embodiment shown in FIG. 26;

FIG. 37 is a Look-Up Table showing load distribution for different numbers of channels.

FIG. 38 is a schematic diagram showing the relationship of Channel Image Height (CIH) to frame height (F.H.).

FIG. 47 (on sheet with FIG. 42) is a look-up table associated certain overhead pixels used with the second embodiment of this invention.

DETAILED DESCRIPTION OF THE PREFERRED EMBODIMENTS

Figure 1:
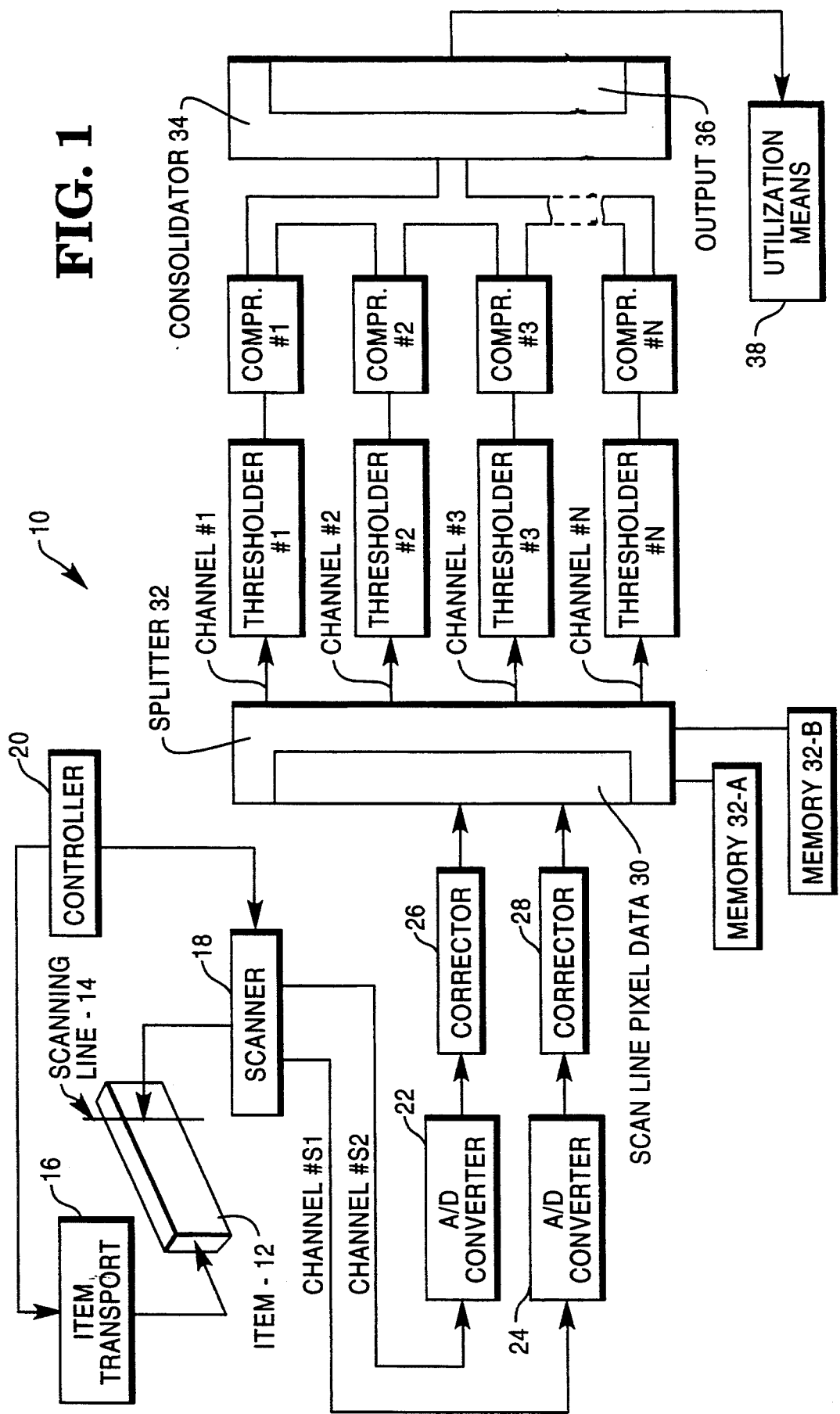
FIG. 1 is a general schematic diagram, in block form, of a preferred embodiment of a system made according to this invention.

FIG. 1 is a general schematic diagram, in block form, of a preferred embodiment of the system 10 made according to this invention. As stated earlier herein, the system 10 may be used, generally, wherever images of items are to be processed. For example, the images may be associated with facsimile transmission or the images may be associated with processing financial documents within a financial environment, to name just two general areas of application. For convenience, this invention will be illustrated with regard to the processing of documents.

When the imaging of items is to be effected, relative motion is provided between the item to be imaged and the imager or scanner. To simplify the discussion, the item 12 (which may be a document) is moved to an area referred to as a scanning line 14 by a conventional item transport 16 so as to bring the area to be imaged into operative relationship with a conventional imager or scanner 18. The scanner 18 includes all the necessary lighting, focussing systems, and sensors for obtaining pixel data about that portion of the item 12 which is positioned at the scanning line 14. A pixel is a picture element covering a generally square area of the document at the scanning line. There may be several hundred pixels obtained at the scanning line 14 depending upon the resolution requirements of the system 10 and the size of the documents to be imaged. After a scanning line of pixel data is obtained, the item transport 16 moves the item 12 so as to present a new area of the item 12 to obtain the next scanning line of pixel data. This process is repeated until the entire item is scanned. A suitable controller 20 is used to conventionally control the item transport 16 and the scanner 18 with suitable control signals and clocks.

The scanner 18 (FIG. 1) may be a conventional charge coupled device (CCD) scanner which includes a buffer (not shown) for each pixel of data obtained from the scanning line 14, with each buffer storing the analog value of the associated pixel. These CCD scanners are offered in a plurality of output channels, such as one, two, four, or eight or more output channels, for example. The particular scanner shown in FIG. 1 contains two output channels, namely channel #S1 and channel #S2. A first clock is used by the scanner 18 to output (over channel #S1) the analog value (stored in the associated buffer) of the first pixel from the scanning line 14; a second clock is used to output (over channel #S2) the analog value of the second pixel (stored in the associated buffer) in the scanning line 14; and, a first clock is used to output the analog value of the third pixel over channel #S1. This process is repeated until all the pixels associated with a scan line of data are outputted from the scanner 18. Successive scan lines of pixels are processed in the same manner.

As the analog data from the scanner 18 is outputted over channels #S1 and #S2 as described, the analog value of each pixel is converted to a six bit value of binary data by the analog/digital (A/D) converters 22 and 24, respectively. Each pixel of data represents one of 64 "shades" of gray, ranging from completely white to completely black, with each pixel of data being derived from the analog value of the associated pixel. These pixels or outputs of the A/D converters 22 and 24 are fed into correctors 26 and 28.

The function of the correctors 26 and 28 is to take the pixels as received, and balance them out according to different parameters. For example, the correctors 26 and 28 correct for differences in illumination which may occur at different portions of the scanning line 14. Generally, the light intensity illuminating the scanning line is greater at the center of the scanning line 14 than the intensity at the extremities of the scanning line 14. The correctors 26 and 28 also compensate for pixel sensitivity and other disturbances in the scanning process; these aspects will be covered in more detail hereinafter. As part of the correction process, each eight bit byte of pixel data is reduced to a six bit byte by simply retaining only the six most significant bits and dropping the two least significant bits. The correctors 26 and 28 also output their data so that the pixel data appears as a scan line of pixel data 30 when it is forwarded to the splitter 32.

The function of the splitter 32 is to take the scan line of pixel data 30 and to divide it into a plurality of individual processing channels which are processed in parallel. Naturally, the number of processing channels selected can be varied, and the number also depends upon a particular application. In the embodiment described, the number of processing channels shown is four, namely channel #1, channel #2, channel #3, and channel #N. Each of the processing channels just mentioned is identical in construction and receives an equal portion of the scan line of pixel data 30. For example, if the scanning line 14 contains 900 pixels, there would be 900 pixels of pixel data at the scan line 30, and accordingly, there would be 225 such pixels (excluding overlap pixels) being processed by each of the channels #1, #2, #3, and #N. By processing the scan line of pixel data 30 in parallel, the throughput of data can be greatly increased over single channel processing.

Figure 26:
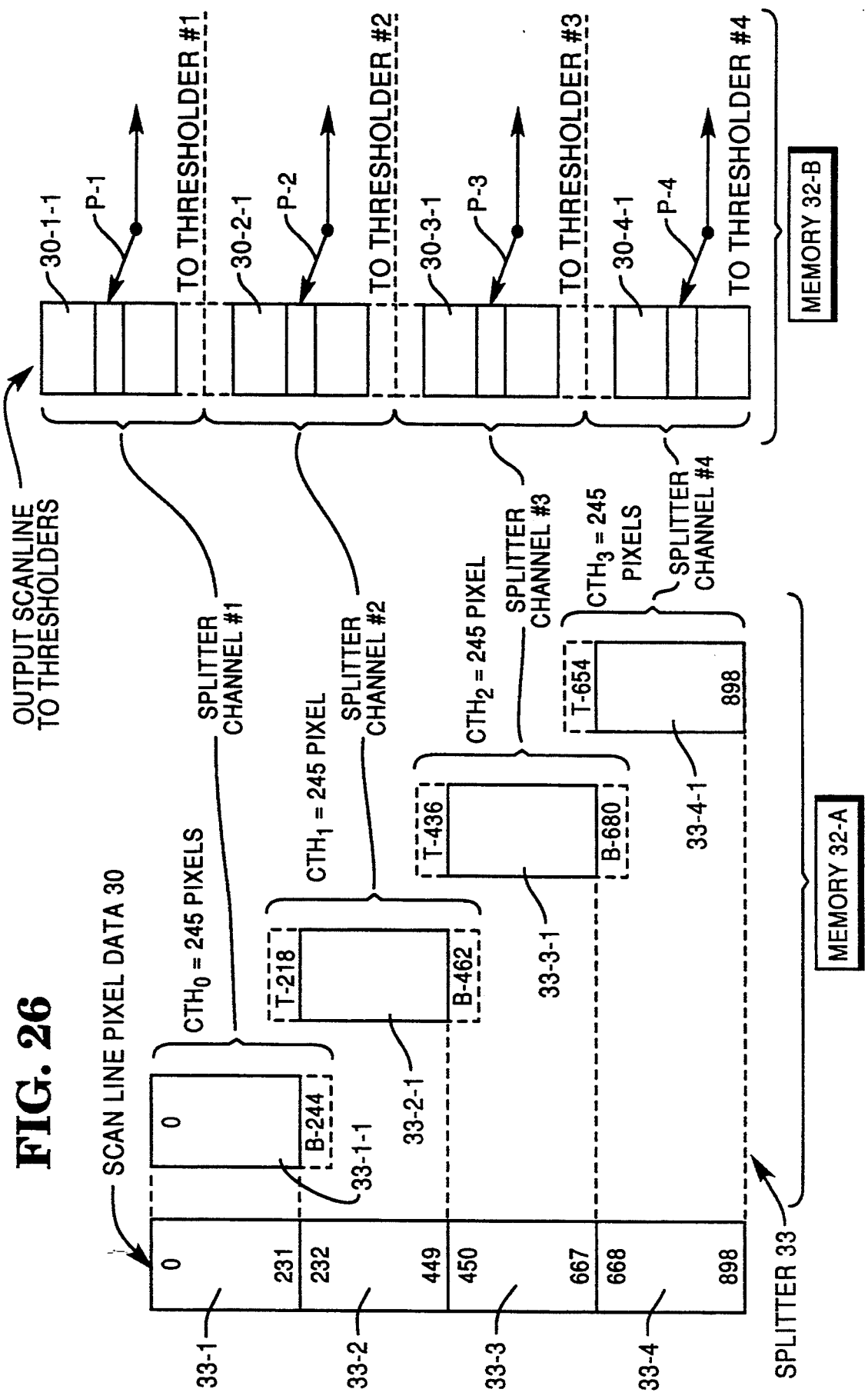
FIG. 26 is a schematic view showing how channels are divided in a second embodiment of the invention.

In a second embodiment, the goal of the splitter 33 shown in FIG. 26, for example, is to make each channel receive an equal number of pixels, including the overlaps. This aspect will become clearer during a discussion of FIG. 26.

Each of the processing channels #1, #2, #3, and #N contains a thresholder and a compressor. For example, channel #1 contains thresholder #1 and compressor #1, and correspondingly, channel #N contains thresholder #N and compressor #N. Because all the channels #1, #2, #3, and #N are identical, only a discussion of channel #1 will be given.

With regard to channel #1 (FIG. 1), the general function of the thresholder #1 is to reduce each six bit byte of pixel data included in the portion of the scan line of pixel data 30 assigned to it by the splitter 32 into a single binary bit. For example, a binary 0 may indicate a white pixel, and a binary 1 then would indicate a black pixel. To perform the thresholding operation, an "examining window" is used. The particular six bit byte of pixel data to be thresholded is positioned in the center of the examining window which may include, for example, a 3×3 matrix of pixel data from adjacent rows and columns of pixel data. The center pixel under consideration is then compared with the surrounding pixels in the examining window to decide whether the center pixel is to be made a binary 0 or a binary 1. This aspect will be discussed in more detail hereinafter.

The black and white pixels coming from the thresholder #1 for the portion of the scan line of pixel data 30 assigned to channel #1 are then compressed by the compressor #1. In the embodiment described, the compression technique utilized is referred to as CCITT Group 4 which is a standard technique used in facsimile transmission, for example.

Compressors #2, #3, and #N perform similar compression of data on their respective portions of the scan line of data assigned to them by the splitter 32. The outputs of each of the compressors #1, #2, #3, and #N are fed into a consolidator 34 shown in FIG. 1. The function of the consolidator 34 is to take the compressed data from the compressors just mentioned and to consolidate or to concatenate the compressed data for all the zones. This aspect will be discussed later herein. The output 36 of the consolidator 34 is then forwarded to a utilization means 38. The utilization means 38 may be a MODEM, for example, for transmission to a receiver, or it may be part of a financial system which utilizes the compressed data for further processing or displaying, for example. Naturally, the compressed data from the consolidator 34 has to be decompressed before it is converted into a binarized image of what was seen at the scanning line 14.

One of the features of the present invention is that while the parallel processing is effected by the plurality of channels #1–#N mentioned with regard to FIG. 1, there are no "seams" produced between adjacent channels #1–#N at the output 36 of the consolidator 34. A "seam" as used herein means possibly incorrect pixel data near the boundaries of adjacent channels #1–#N, with the incorrect pixel data being due to incorrect thresholding, for example. A "seam" in the pixel data could be detrimental in the processing of financial documents, for example, because the seam may occur at an area of the document where the monetary amount on the document, like a check, for example, appears.

Figures 2A, 2B, 2C:
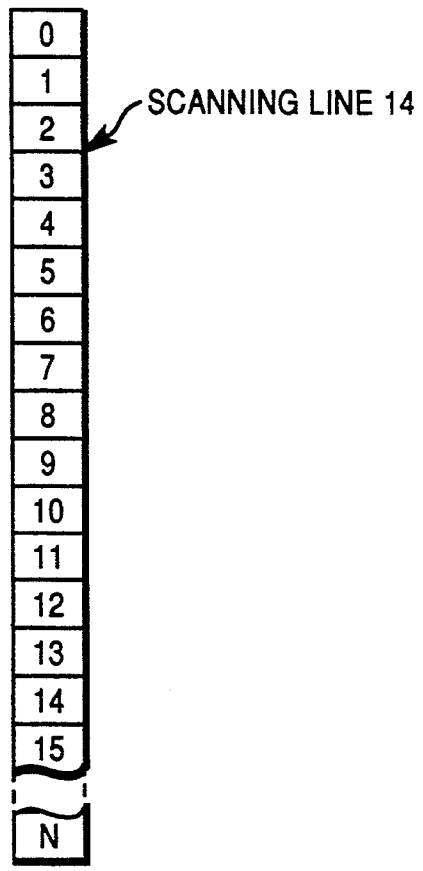
FIGS. 2A, 2B, and 2C are schematic diagrams which show certain relationships between the scanning line and the channels associated with the scanner shown in FIG. 1.

In order to explain how the seams are avoided, it is useful to explain, generally, how the splitter 32 performs its function. In this regard, FIGS. 2A, 2B, and 2C are schematic diagrams which show certain relationships between the scanning line 14 and the channels associated with the scanner 18. When the scanner 18 has 2 channels as shown in FIG. 1, the individual pixels of the scanning line 14 are divided between the channels #S1 and #S2 as shown in FIG. 2B. When the system 10 employs a scanner 18-1 (like 18) which has four channels, the individual pixels of the scanning line 14 will be divided among the channels #R1–#R4 as shown in FIG. 2C. It should be recalled that after processing by the A/D converters 22 and 24, and the correctors 26 and 28, the outputs from the channels #S1 and #S2 are combined to produce the scan line of pixel data 30 as shown in FIG. 1. Similarly, when the four channels #R1–#R4 are used in a scanner 18-1 (FIG. 2C), the outputs are similarly combined to produce the scan line of pixel data 30. The order of pixel data in the scan line 30 (at the splitter 32) corresponds to that of the scanning line 14 shown in FIG. 2A; however, in some situations, pixel sequence conversion may be necessary. While the scanning line 14 is shown as proceeding from the top to the bottom, in some applications it is advantageous to have the scanning proceed from the bottom of a document to the top thereof, as for example, when this invention is used with financial documents such as checks and deposit slips. These documents come in varying widths, but they all are positioned at the bottom of a track when being moved past the scanner 18. If the maximum height of a document at the scanning line 14 is four inches and some of the documents are only three inches high, it means that there will be useless information at the top of the scanning line 14. Proceeding from the bottom of the scanning line 14 for such an application enables one to eliminate the top one inch of image data (in the example being described) when displaying an image derived from the scanning line 14, for example. The background at the scanning line 14 is black so that when a document 12 appears at the scanning line 14, the change in color can be used to indicate the start of a document and where valuable data starts. For ease of illustration, the discussion hereinafter will proceed with the actual scanning starting at the top of the scanning line 14 and ending at the bottom thereof.

The scan line of pixel data 30 is divided (by the splitter 32) into the channels #1–#4 as shown in FIG. 3. While four channels are described in relation to FIG. 3, it should be understood that the number could be changed to accommodate different applications. For the application being discussed, assume that there are 900 pixels in the scan line of pixel data 30. Each channel to be created should have an equal number of pixels therein, and accordingly, there would be 225 pixels in each of the four channels 30-1 through 30-4. In addition to dividing the scan line of pixel data 30 as described, a predetermined number of "adjacent" pixels is added to each of the channels 30-1 through 30-4 as follows. If one is the predetermined number, there would be one pixel added to the top of channel 30-1 and one pixel would be added to the bottom of this channel to generate the zone 30-1-1 shown in FIG. 3. The terms "top" and "bottom" of each zone relate to how they are located in FIG. 3. The adjacent top pixel "T" for channel 30-1-1 comes from the top border of the scan line of pixel data 30, and the bottom pixel B of this zone comes from the top pixel of channel 30-2; in the embodiment described, the top pixel "T" is put in by the splitter 32, itself, and is a binary 0 or white pixel. Correspondingly, the top pixel T of zone 30-2-1 comes from the bottom pixel of zone 30-1 while the bottom pixel B of zone 30-2-1 comes from the top pixel of zone 30-3. The remaining zones 30-3-1 and 30-4-1 are similarly constructed with the bottom pixel B of zone 30-4-1 coming from the bottom border of the scan line of pixel data 30; in the embodiment described, this bottom pixel B (a binary 0) is put in by the splitter 32, itself. The predetermined number of adjacent pixels added, as described, is dependent upon the particular thresholding scheme utilized; this aspect will be discussed in more detail hereinafter. The pixels are shown, obviously, in greatly enlarged size in FIG. 3 to facilitate a showing thereof.

The zones 30-1-1, 30-2-1, and 30-3-1 just described in relation to FIG. 3 become the channels. #1 through #3, respectively, coming from the splitter 32 shown in FIG. 1, with channel #4 shown in FIG. 3 corresponding to channel #N shown in FIG. 1. The pixel data coming from the channel #1 in FIG. 3 is processed by the thresholder #1 and the compressor #1, and similarly, the pixel data coming from channels #2, #3, and #4 are handled by the combination of thresholder #2 and compressor #2, the combination of thresholder #3 and compressor #3, and the combination of thresholder #4 and compressor #4, respectively, to process the the scan line of pixel data 30 in parallel. The output from the combination of thresholder #1 and compressor #1 is fed into the consolidator 34 shown in FIG. 1 as previously described; the same is true for the combinations of thresholders and compressors #2 through #4 discussed in this paragraph.

The various zones and channels just described with regard to FIG. 3 are used in thresholding the six bit byte of data for each pixel in the scan line of pixel data 30 to reduce it to a binary 0 "white" or a binary 1 representing data or "black". Before discussing the thresholding operation in detail, it appears useful to describe the operation only generally. In this regard, the thresholding for each channel #1–#4 is performed by its associated thresholder #1–#4, respectively. The thresholding operation is performed by comparing the pixel to be thresholded with the surrounding pixels. To perform the comparison, an examining window is used.

Figure 4:
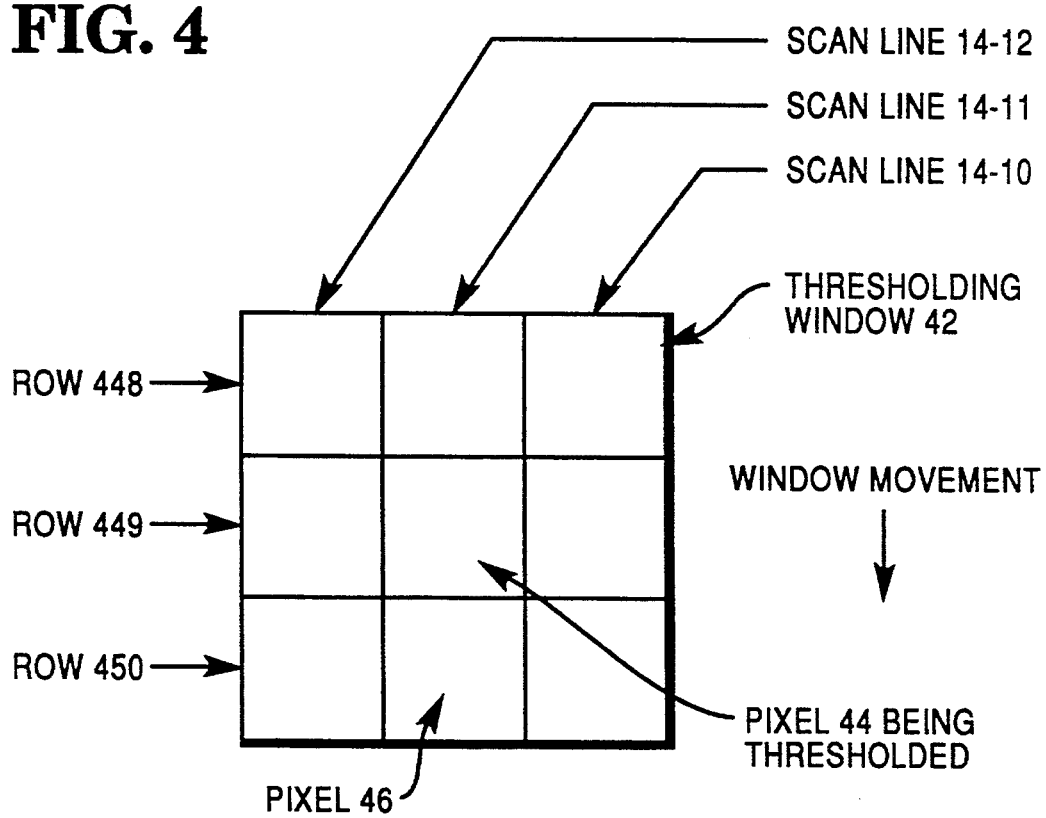
FIG. 4 is a schematic diagram of an examining window used for thresholding the pixel data.

A simplified examining or thresholding window 42 is shown in FIG. 4. In its simplest state, the examining window contains a matrix of nine pixels, with the pixel 44 to be thresholded being located in the center of the examining window 42. As an illustration, assume that the examining window 42 is positioned to cover the pixels coming from scan lines 14-10, 14-11, and 14-12, and rows 448, 449, and 450; these are the rows associated with the processing being performed by the thresholder #2 with regard to channel #2. The pixel in row 449 will also be used in the processing being performed by channel #3 in that it becomes the top pixel "T" for channel #3. The number of pixels in the scan line pixel data 30 is 900 as discussed earlier herein, with row 449 corresponding to the lowermost pixel in channel 30-2 (FIG. 3) in the example being described. Assume that pixel 44 (FIG. 4) is the last or lowermost pixel (row 449) in the channel 30-2 (FIG. 3) occurring in the scan line 14-11. Pixel 46 in the examining window 42 corresponds to the bottom pixel B in the zone 30-2-1 which is actually splitter channel #2. A point to be made here is that it is only the pixels in the zones like 30-1 and 30-2 that are thresholded. The pixels like T and B which are included in the zone 30-1-1 in FIG. 3 are used in the process of thresholding those pixels within the channel 30-1, but they are not actually thresholded as a part of channel 30-1; the pixels T and B may be considered as the overlap pixels. Notice also, that the bottommost pixel B in the zone 30-2-1 corresponds to the topmost pixel (row 450 in the example being described) of channel 30-3. This means that the pixel 46 (FIG. 4) coming from channel 30-3 is also used in thresholding the pixel 44 coming from the channel 30-2 when the processing associated with channel #2 is performed. This slight overlapping of pixels associated with different zones is what prevents the "seams" or incorrect thresholding between adjacent channels when parallel processing is performed. This is a feature of the present invention. While only one pixel, like B or T, is shown in the overlapping zones for ease of illustration, there may be more than one pixel in the overlapping zones.

Figure 5:
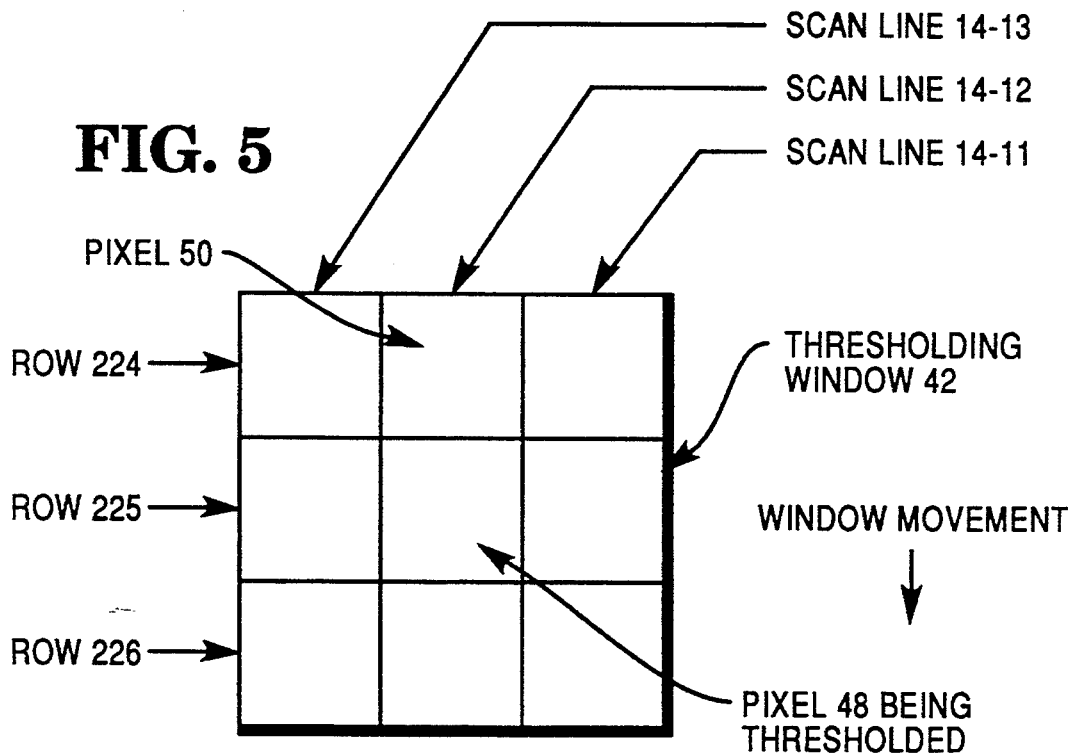
FIG. 5 is a schematic diagram showing the examining window in a different location from that shown in FIG. 4.

After the center pixel 44 to be thresholded is thresholded to a binary 1 or binary 0, the examining window 42, in the example being described, is moved downwardly, one row at a time, to repeat the process for the remaining pixels in scan line 14-11 in the example being described. The bottom pixel B used in the processing of the pixel in scan row #899 is a binary 0 as previously discussed and is entered as "border" data as previously discussed. After reaching the bottom of a scan, the thresholding window 42 is moved upwardly and to the left, for example, as viewed in FIG. 4. The column of pixels to be thresholded then becomes scan line 14-12. The pixel in Row 0 and scan line 14-12 becomes the first pixel to be thresholded with the top pixel T associated with zone 30-1-1 (FIG. 3) being a binary 0 to represent the top border of the document 14. After processing as described, the thresholding window 42 will be moved downwardly (as viewed in FIG. 5) so that the pixel 48 becomes the next pixel to be thresholded in the example being described. Notice that pixel 48 is located in scan line 14-12 and row 225, with scan row 225 being the topmost row in channel 30-2. When the thresholding window 42 is positioned as shown in FIG. 5, the center pixel 48 to be thresholded is compared with the surrounding pixels which include the pixel 50 which corresponds to lowermost pixel in channel 30-1 (FIG. 5). By this technique, the image processor 40-2 associated with the splitter channel #2 is able to use the pixel 50 to eliminate any seam which might occur between the channels 30-1 and 30-2 shown in FIG. 3.

Notice from FIGS. 4 and 5 that as the examining window 42 is moved to the left, data or pixels associated with scan line 14-10 are dropped off and data or pixels associated with scan line 14-13 are picked up. The scan lines, like 14-10 and 14-11 for example, represent successive scan lines of data coming from the scanning line 14 shown in FIG. 1. Moving the thresholding window 42 to the left, as described herein, is analogous to examining successive scan lines as the item 12 is moved to the right (as viewed in FIG. 1) relative to the scanning line 14.

The thresholding window 42 has a physical size which is approximately a one eighth inch square in the embodiment described. This size was experimentally determined to provide for optimum performance by the thresholders #1–#4. The number of pixels which is included in the thresholding window 42 is dependent upon the pixel density or the resolution afforded by the scanner 18. For example, if the scanner provides a resolution of 200 pixels per inch, a thresholding window 42 which is to cover a one eighth inch square at the scanning line 14 would include 25 pixels as measured along the scanning line. Naturally, in another application like imaging $8\frac{1}{2} \times 11$ inch documents, the window size may be larger. The window size may also be larger when imaging the back of an item 12 like a check when compared to the front of a check which contains important account and monetary data, for example.

Figure 6:
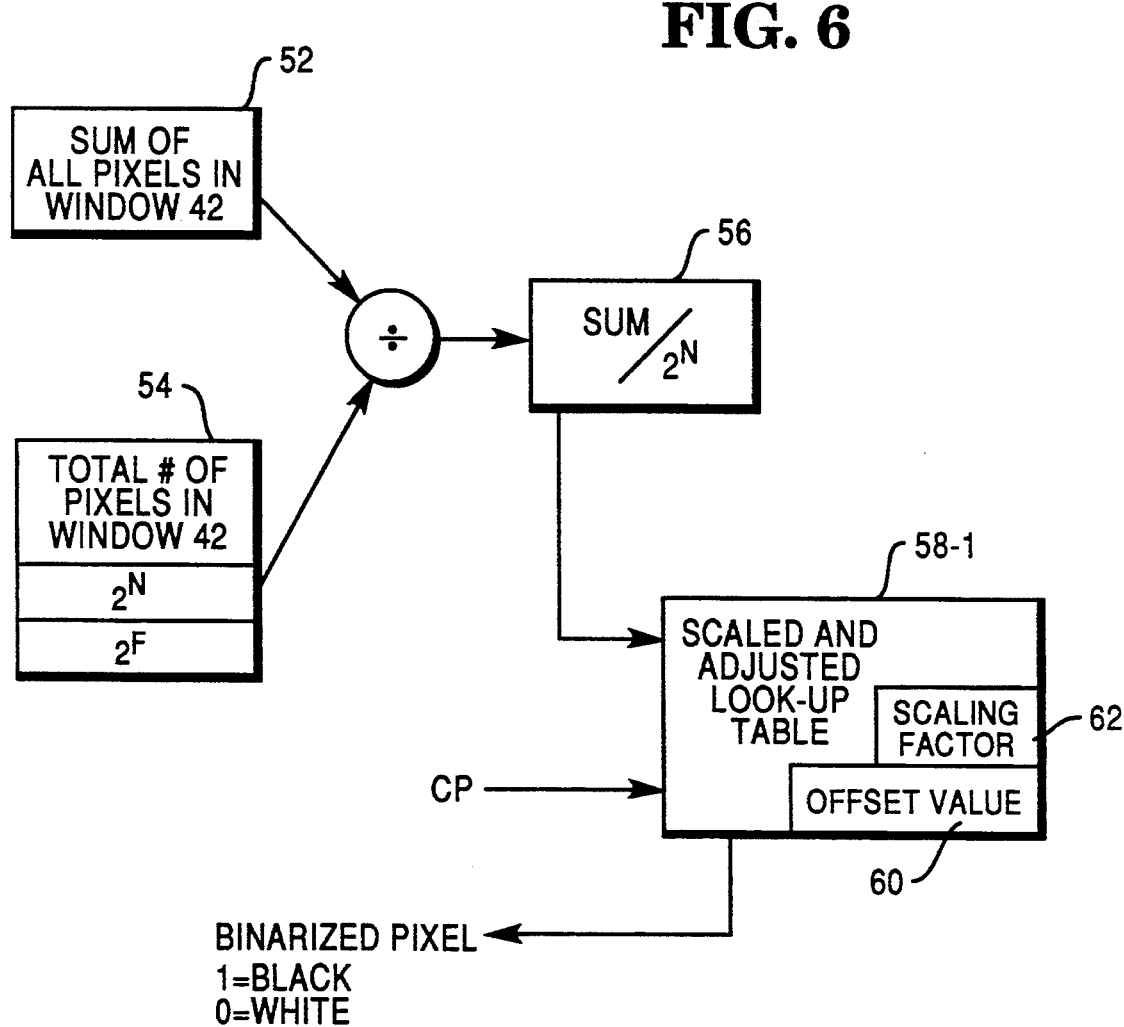
FIG. 6 is a schematic diagram showing how the thresholding is effected within the examining window.

The particular method of thresholding used with the thresholding window 42 (FIGS. 4 and 5) can be explained best in relation to FIG. 6. In this regard, it should be recalled that each of the individual pixels in the window 42 represents six bits of data (gray scale value) in the example being described. When the examining window is positioned over the pixels to be evaluated, the center pixel (CP), like pixel 44 in FIG. 4, is the pixel to be thresholded.

The first step in the thresholding procedure is to obtain a sum of all the gray scale values of the pixels within the window 42 as shown by the block 52 in FIG. 6; this sum also includes the center pixel. The next step is to obtain the number of pixels in window 42 as shown by block 54. In the embodiment described, there are 625 pixels within the window 42. The 625 pixels can be broken up into elements of $2^N$ and $2^F$, with the former term equal to 512 (when N=9). The term $2^F$ is incorporated in the look-up table 58-1 as a scaling factor 62 as will be described later herein in connection with Equation EQ. 11 and FIGS. 15 and 15A. In the embodiment described, $2^F$ is a value which is greater than one but less than two, with F being greater than zero but less than 1. For example, in the embodiment described, the scaling factor 62 is equal to 625 divided by 512. For the moment, it is sufficient to state that when the sum of all gray scale values of the pixels in the window 42 is divided by the term equal to $2^N$ as shown by block 56, that resulting value is used as an address along with the center pixel CP under consideration to the look-up table 58-1. The output of the look-up table 58-1 becomes the thresholded or binarized pixel as shown in FIG. 6. When designing the look-up table 58, an offset value (shown as block 60) is added to the value shown in block 56 to arrive at a scaled and adjusted gray scale level included in look-up table 58-1. The values from block 56 (gray level-six bits) and the center pixel CP (six bits) are then used as addresses to the look-up table 58-1 to threshold the center pixel CP into a binary one or a binary zero. In other words, the offset value 60 is already incorporated in the look-up table 58-1 and does not require a separate look-up operation in the look-up table 58-1 itself. This aspect will be explained in more detail in connection with Equation EQ. 11 as alluded to earlier herein.

Figure 9:
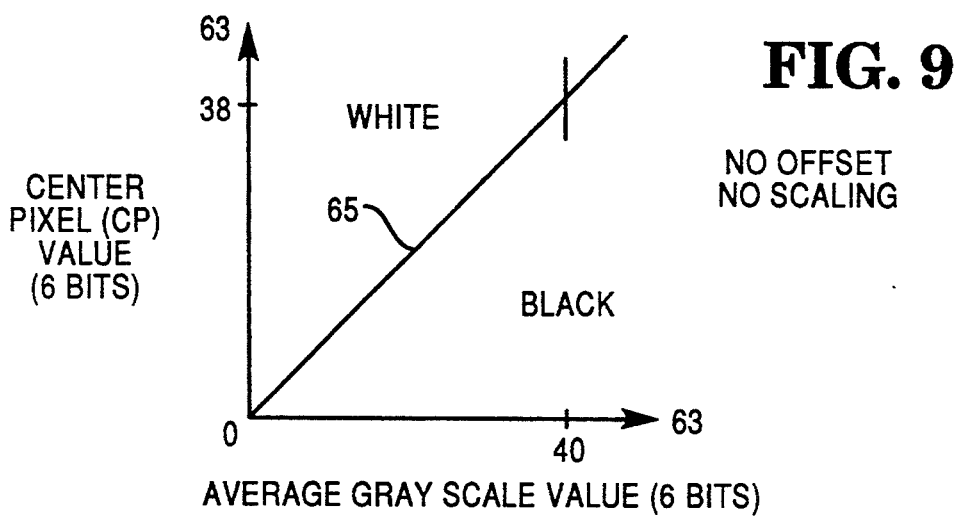
FIG. 9 is a graph showing the parameters of a look-up table used in thresholding.

FIG. 9 shows a graph for the parameters of a look-up table which does not have any offset value 60 as discussed in relation to FIG. 6, and consequently, the thresholding line 65 might look like that shown in FIG. 9. With regard to FIG. 9, the gray scale value (block 56 in FIG. 6) is used as one six bit address, and the center pixel value (CP) is used as the other six bit address to determine whether the center pixel (CP) will be thresholded as a binary 1 or a binary 0. There is no offset value associated with the thresholding line 65 shown in FIG. 9. Also, there is no scaling factor associated with the thresholding line 65; this occurs when the thresholding window, like 42, contains a number of pixels which is not a whole multiple of 2 raised to a whole number. When the window 42 contains 625 pixels as described, a scaling factor is needed. Continuing with FIG. 9, any center pixel value located above the thresholding line 65 is thresholded as a white pixel, and any center pixel value located below the thresholding line 65 is thresholded as a black pixel.

The offset value 60 alluded to with regard to FIG. 6 is determined experimentally by taking into consideration the characteristics of the scanner 18 used, the lighting on the scanning line 14, the type of documents being read, for example, and what kind of thresholding is expected from the system 10. For the moment, it is sufficient to state that the offset value is derived experimentally, and it tends to offset the thresholding line 65 shown in FIG. 9.

Figure 10:
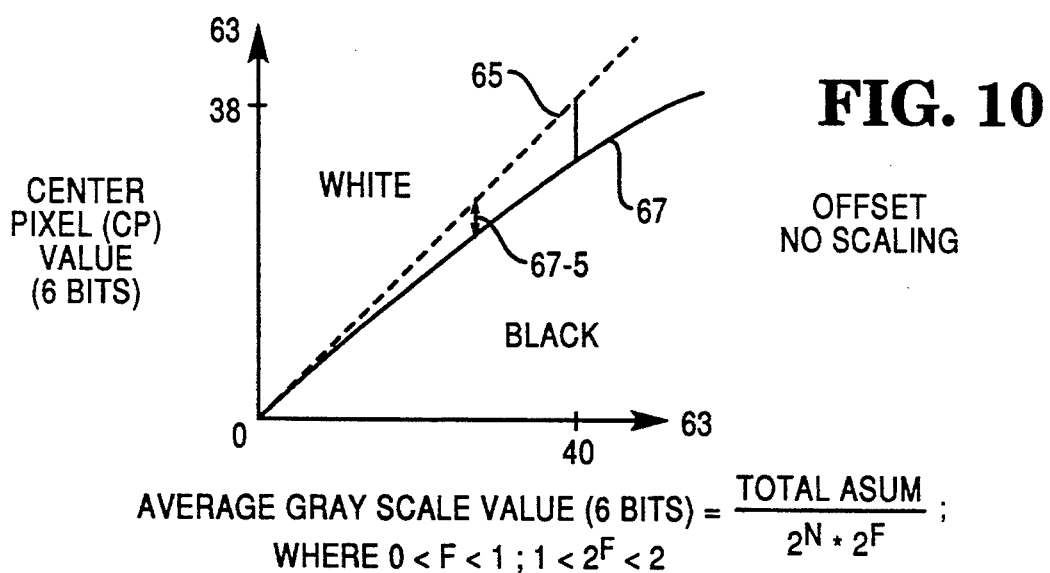
FIG. 10 is a graph showing the use of adjusted gray scale values in thresholding.

FIG. 10 is analogous to FIG. 9 just discussed; however, curve 67 represents the thresholding line which reflects the offset value 60 (FIG. 6). In effect, the look-up table 58-1 contains offset and adjusted or scaled gray scale values, while the gray scale value (block 56—six bits) and the center pixel CP (six bits) are used as an address to threshold the center pixel. In qualitative terms, the offset values are used to suppress certain background information on the document, for example. FIG. 10 includes a thresholding line 67 which is displaced from the thresholding line 65 shown in dashed outline so as to reflect the adjustment mentioned herein.

Figure 11:
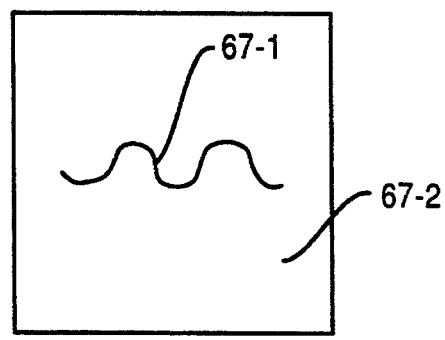
FIG. 11 is a diagram representing one situation in thresholding.
Figure 12:
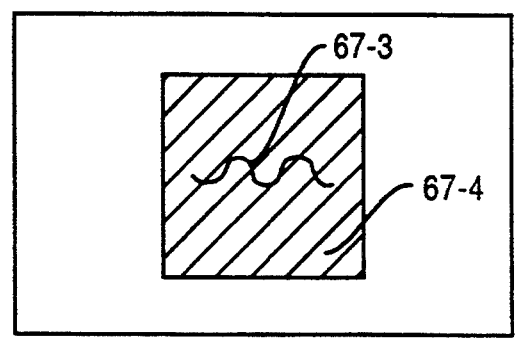
FIG. 12 is a diagram representing another situation in thresholding.

To illustrate how thresholding takes place, two fictional examples will be given. If the average gray scale value is 40 and the center pixel (CP) has a value of 38, the center pixel (CP) will be thresholded as a black pixel or binary 1 when using the thresholding line 65 shown in FIG. 9. If the gray scale value is 40 and the center pixel (CP) has a value of 38, the center pixel (CP) will be thresholded as a white pixel or binary 0 when using the thresholding line 67 shown in FIG. 10. In other words, as the background of a document gets lighter, a center pixel has to be considerably darker than the background in order to be thresholded as a black pixel or a binary 1; this is represented by a dark mark 67-1 on a white background 67-2 as shown in FIG. 11. As the background gets darker, a center pixel does not have to be too much darker than the associated background for the center pixel to be thresholded as a black pixel or a binary 1; this is represented by a dark mark 67-3 on a somewhat dark background 67-4. This latter situation relating to the dark background 67-4 is represented by the double arrow line 67-5 shown on FIG. 10. A point to be made here is that the values which appear in the look-up table 58-1 may be down loaded to suit particular applications.

Figure 10A:
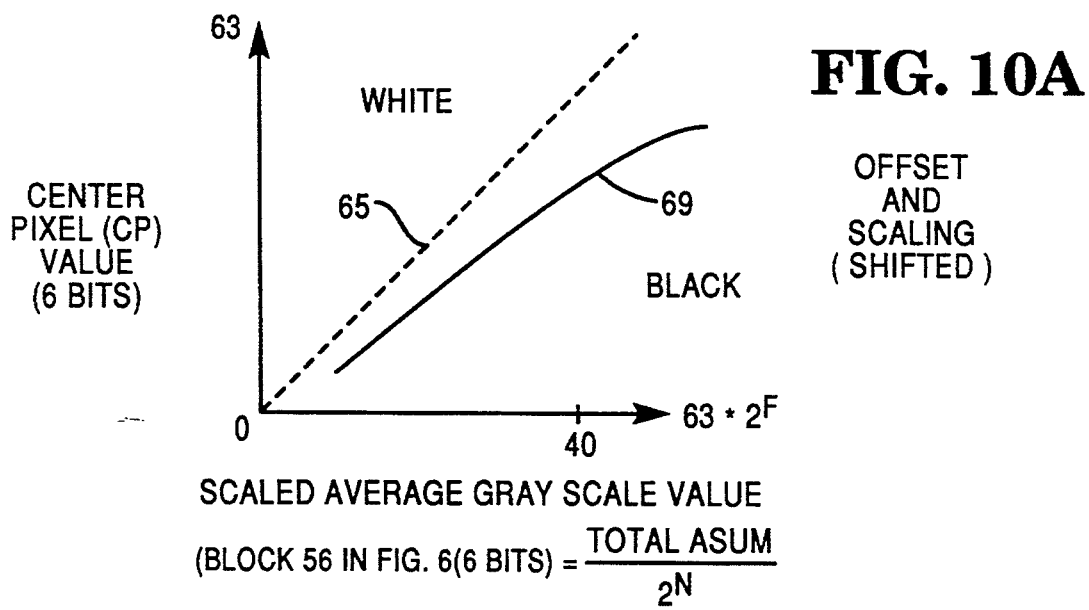
FIG. 10A is a graph showing offset and scaling features included in the look-up table shown in FIG. 6.

FIG. 10A is a graph to approximate what is in the look-up table 58-1 shown in FIG. 6. To recapitulate, FIG. 9 contained no offset and no scaling. FIG. 10 contains an offset (like 60 in FIG. 6) but no scaling factor, and FIG. 10A contains both an offset 60 and a scaling factor 62 as discussed earlier in relation to FIG. 6. In effect, the scaling factor 62 tends to shift the curve 67 in FIG. 10 to the right as viewed in FIG. 10A. This is shown by having the X axis multiplied by $2^F$ in FIG. 10A.

Figure 7:
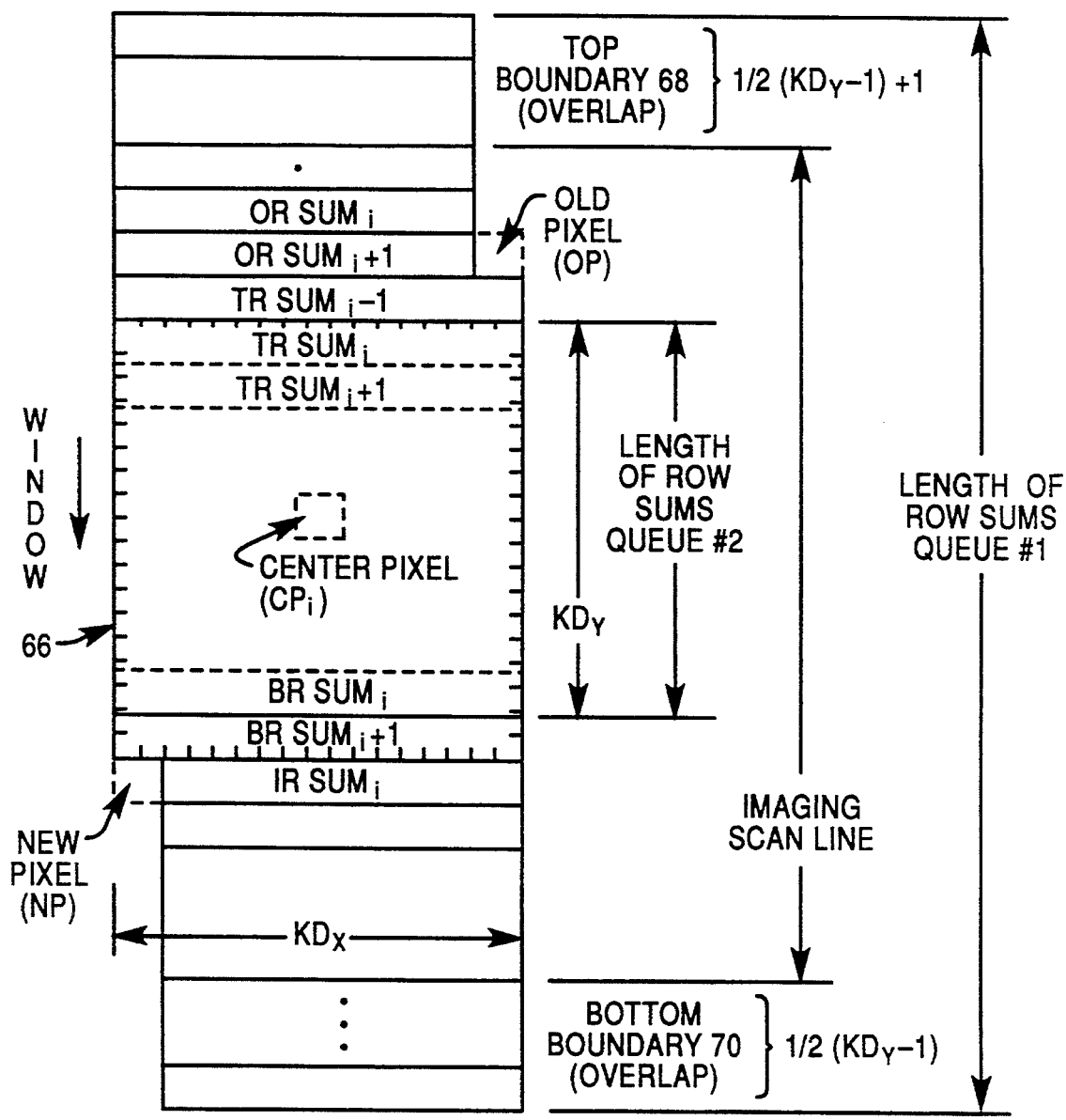
FIG. 7 is a schematic diagram showing certain parameters used in the thresholding process.

Continuing with the thresholding process, FIG. 7 is a schematic diagram (not drawn to scale) illustrating certain parameters used in the process. The examining window 66 has a height which is $KD_y$ and a width which is $KD_x$. As previously stated, one of the features of this invention is that the size of the examining window 66 can be configured to suit particular applications.

In the embodiment described, the examining window 66 (FIG. 7) has a height ($KD_y$) which is 25 pixels and a width ($KD_x$) which is also 25 pixels. $KD_y$ is equal to $KD_x$ to provide a square examining window. The top and bottom boundaries 68 and 70 (for the overlap mentioned earlier herein) are related to the size of the window 66 as follows. As shown in FIG. 7, there is a top boundary 68 and a bottom boundary 70. This means that for a window size of 25 pixels, there would be 13 rows of overlap at the top boundary 68, and there would be only 12 rows of overlap at the bottom boundary 70. The extra row of pixels at the top boundary 68 is needed as a reference line for the particular type of compression technique used in the compressors #1 through #N shown in FIG. 1. In other words, a reference line is needed prior to compressing a row of data, for example. A reference row is also needed for the top row in each zone, like row 225 (FIG. 3) for zone 30-2; this aspect will be discussed in detail hereinafter.

In continuing with a discussion of the thresholding technique discussed in relation to FIG. 7, it is useful to consider certain techniques used in association with the examining window. In this regard, FIG. 8A shows a memory queue #1 and a memory queue #2 used in association with the examining window 66. Memory queue #1 is referred to as the new pixel-center pixel (NP-CP) queue, and memory queue #2 is referred to as the center pixel-old pixel (CP-OP) queue. The memory queues #1 and #2 may be considered as circumferential memories with a predetermined number of stages therein. The stages are determined by parameters such as the maximum document height to be anticipated in the system 10, the resolution of the imager used, the number of channels being used for parallel processing, and the number of pixels in the examining window 66, for example. The number of pixels in the examining window 66 can be reflected by the dimensions of the window which can be stated as $KD_y = KD_x$. It is convenient to think of the NP-CP queue #1 as having a predetermined number of stages or pixels to enable a new pixel $NP_i$ (FIG. 7) to enter this queue and to be moved around the queue to reflect the movement of the examining window 66 as it processes successive columns of pixels. After a predetermined number of successive moves around the NP-CP queue #1, the center pixel $CP_i$ is outputted from the NP-CP queue #1 at the same time that a new pixel $NP_i$ enters this queue. The same center pixel $CP_i$ which is outputted from the NP-CP queue #1 is copied into the center pixel-old pixel (CP-OP) queue #2. After a predetermined number of moves around the CP-OP queue #2, this same center pixel $CP_i$ will become the old pixel $OP_i$ which is deleted from the examining window 66. The center pixel CP is extracted for the thresholding operation mentioned, and the new pixels NP and the old pixels OP are extracted to be used in the rows sums calculations associated with queues #1 and #2 shown in FIGS. 8B and 8C.

The relationships between the queues #1 and #2 shown in FIG. 8 can be stated as follows:

Total pixel memory = (EQ. 1)

The channel thresholder height = $NP - CP$ queue #1 + $CP - OP$ queue #2. (EQ. 2)

$$\frac{(\text{Max. Doc. Height}) \times (\text{resolution})}{\text{Number of channels}} + KD_y \text{ (pixels)} + D_1$$

The lengths of the pixel queues #1 and #2 shown in FIG. 8 are as follows:

$$NP - CP = \frac{[KD_x - 1 \times CTH]}{2} + 4 \, TRUNC \frac{[KD_y - 13]}{2} \quad \text{(EQ. 3)}$$

$$CP - OP = \frac{[KD_x - 1 \times CTH]}{2} + 4 \, TRUNC \frac{[KD_y - 13]}{2} \quad \text{(EQ. 4)}$$

wherein: $CTH$ = Channel thresholder height =

$$\frac{(\text{Max. Doc. Ht.}) \times (\text{Resolution})}{\text{Numbers of channels}} + KD_y + D_1.$$

The channel thresholder height is expressed in pixels. The equations EQ. 1 through EQ. 4 are associated with a reduction factor of one; these equations change slightly for different reduction factors. The changes for a second embodiment will be discussed later herein. The term "TRUNC" in the equations just relates to truncating certain numbers into whole numbers; this, also will be discussed later herein. When all the rows of pixels in a window, like 66 in FIG. 7, are used in calculating the average gray level as discussed in relation to FIG. 6, then a reduction factor of one is employed. If every third row of pixels is used in calculating the average gray scale level, then a reduction factor of three is employed. It should also be noted that the pixel Queues #1 and #2 shown in FIG. 8A are not circular memories; they simply represent addressing schemes used by the system 10 to effect loop-type memories. The terms $D_1$, $D_2$, and $D_3$ (read as "Delta") are used to influence the equations EQ. 2, EQ. 3, and EQ. 4 by design implementation dependencies such as:

1. The delay pipelines 78, 92, and 98 shown in FIG. 13, which are constant for all applications; and
2. The number of overhead pixels required for each scan line of a particular application. The overhead pixels will be discussed later herein. Notice from FIG. 7 that as the window 66 is moved downwardly, as viewed in FIG. 7, and after enough scans have accumulated to fill the window 66, a new pixel $NP_i$ is added to the NP-CP queue #1 and a center pixel $CP_i$ under consideration is removed therefrom. As previously stated, the center pixel $CP_i$ is copied into the CP-OP queue #2 and the old pixel $OP_i$ is removed therefrom.

Having described the processing associated with the examining window 66 (FIG. 7) in a general way, it now seems appropriate to discuss this processing in a detailed manner. Assume that the window 66 is full of pixels and that the processing begins at a time (t=i). At time (t=i), the data outputs from the various queues shown in FIG. 8A, 8B, and 8C are as follows:

Pixel Queue #1 = $CP_i$;
Pixel Queue #2 = $OP_i$;
Input Row Sum Queue #1 = $IRSUM_i$; and
Top Row Sum Queue #2 = $TRSUM_i$.

At the same time (t=i), the data inputs to the same queues mentioned are:

Pixel Queue #1 = $NP_i$;
Pixel Queue #2 = $CP_i$;
Output Row Sum Queue #1 = $ORSUM_i$; and
Bottom Row Sum Queue #2 = $BRSUM_i$.

There are several equations which are also used in processing the data with the window 66; these equations are for processing data at a time (t=i+1) as follows:

$$BRSUM_{i+2} = NP_i + IRSUM_i; \quad \text{EQ. 5}$$

$$ASUM_{i+1} = ASUM_i + BRSUM_{i+1} - TRSUM_i; \quad \text{EQ. 6}$$

and $$ORSUM_{i+1} = TRSUM_{i-2} - OP_i \quad \text{EQ. 7}$$

The equations EQ. 5, 6, and 7 are better understood in relation to FIG. 7. A technique is employed to facilitate the calculations of the pixels included in the examining window 66, with each pixel being six bits of data at this time. As the window 66 is moved downwardly (as viewed in FIG. 7) a row at a time, a new pixel (NP) is picked up and an old pixel (OP) is dropped off as previously explained. The bottom row sum $BRSUM_i$ at time (t=i) is included within the examining window 66. At time (t=i), the input row sum $IRSUM_i$ does not contain the new pixel (NP); however, after one clock period, the new pixel is added to the input row sum as indicated by equation (EQ. 5) to become a bottom row sum $BRSUM_{i+1}$ as shown in FIG. 7. This $BRSUM_{i+1}$ is then ready to be added to the total within the window 66, and after another clock, it becomes the bottommost row sum within the window 66.

There are transactions occurring at the top of the examining window which correspond to those just described in relation to the bottom of the window 66. At a time (t=i) the topmost row sum in the window 66 (FIG. 7) is $TRSUM_i$. The top row sum just prior to time (t=i) is $TRSUM_{i-1}$ as shown; in other words, it's outside the window 66, and it contains the old pixel (OP). At one clock later, the old pixel (OP) is subtracted from the top row sum (which is actually $TRSUM_{i-2}$) as indicated by equation (EQ. 7) to become the output row sum $ORSUM_{i+1}$. At time (t=i), the output row sum is $ORSUM_i$. From equation (EQ. 6), the sum of the pixels in the area bounded by the window 66 at time (t=i+1) is equal to the area sum $ASUM_i$ plus the pixels in the bottom row sum $BRSUM_{i+1}$ minus the top row sum $TRSUM_i$.

Figure 13:
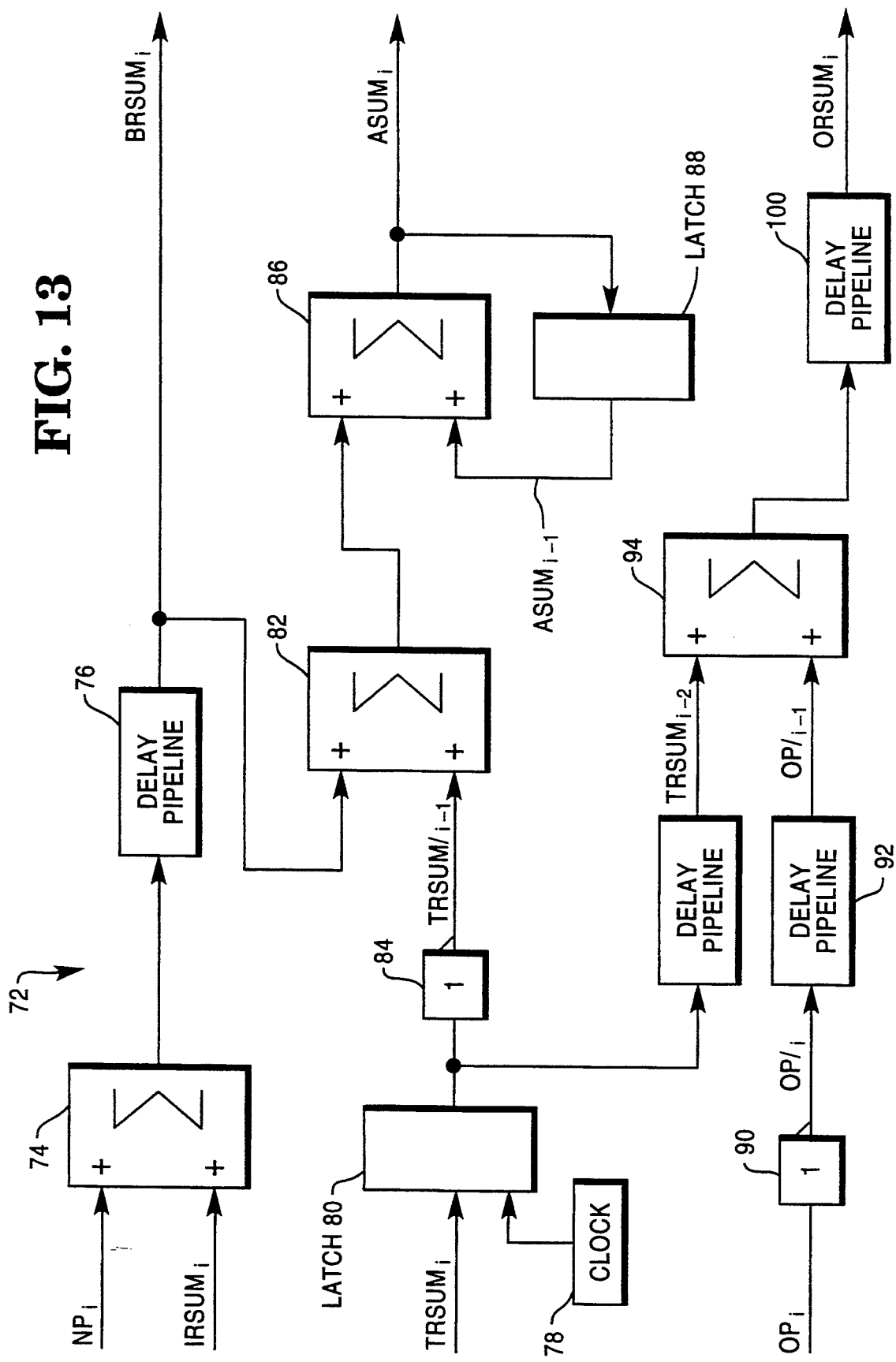
FIG. 13 is a schematic diagram showing how thresholding is effected for one of the thresholders shown in FIG. 1.

FIG. 13 is a schematic diagram which shows how the manipulation of data takes place in a circuit 72 included in a thresholder, like thresholder #1 associated with channel #1 shown in FIG. 1. The values used in the circuit 72 are for time (t=i). Accordingly, the equations (EQ. 8, 9, and 10) used for for time (t=1) are similar to equations (EQ. 5, 6, and 7). The equations are:

$$BRSUM_i = NP_{i-2} + IRSUM_{i-2}, \quad \text{EQ. 8}$$

$$ASUM_i = ASUM_{i-1} + (BRSUM_i - TRSUM_{i-1}), \quad \text{EQ. 9}$$

and $$ORSUM_i = TRSUM_{i-2} - OP_i. \quad \text{EQ. 10}$$

At time (t=i), the data going to and coming from all the queues shown in FIGS. 8A, 8B, and 8C all have the subscript "i" as shown.

With regard to FIG. 13, a new pixel $NP_i$ is added to the input row sum $IRSUM_i$ at adder or summer 74, and the output therefrom is delayed by a delay pipeline 76 to produce the bottom row sum $BRSUM_i$. The circuit 72 is clocked by a clock 78 which is coupled to the elements shown in FIG. 13 to step the data around the circuit; however, the clock 78 is connected only to a latch 80 to simplify this figure. From equation (EQ. 8), the bottom row sum $BRSUM_i$ is derived from a new pixel NP and an input row sum which occurred two clocks earlier relative to $BRSUM_i$. The output from the delay pipeline 78 is fed into a summer 82.

Summer 82 (FIG. 13) performs the function of providing a difference in sum between the bottom row sum $BRSUM_i$ and the top row sum $TRSUM_{i-1}$ as indicated by that portion of the equation (EQ. 9) which is included in parentheses. The top row sum $TRSUM_i$ is fed from the latch 80 and is inverted by an inverter 84 to generate $\overline{TRSUM}_{i-1}$, with the (/) symbol being used to indicate an inverted or "bar" condition; this value from the inverter 84 is "subtracted" from the $BRSUM_i$ sum by the summer 82. The output from the summer 82 is fed into another summer 86 where the final summing associated with equation (EQ. 9) is effected. The area sum $ASUM_{i-1}$ from a prior clock period, is stored in a latch 88 and is fed into the summer 86 upon the arrival of the output from the summer 82 thereto to generate the area sum $ASUM_i$ output as indicated by equation (EQ. 9).

The output row sum $ORSUM_i$ shown in FIG. 13 is derived from equation (EQ. 10) and is effected by the circuit 72 for the purpose of subtracting the old pixel OP from the output row sum. In this regard, the pixel $OP_i$ is inverted by an inverter 90 and is thereafter passed through a delay pipeline 92 to delay it by one clock to generate a signal $\overline{OP}_{i-1}$ which is fed into a summer 94. The top row sum $TRSUM_i$ coming from the output of the latch 80 is passed through a delay pipeline for two clocks to generate a signal $TRSUM_{i-2}$ which, in turn, is fed into the summer 94. The top row sum or signal $TRSUM_{i-2}$ really is equal to the output row $ORSUM_{i+1}$ plus the old pixel $OP_i$ shown in FIG. 7, and when this signal is delayed by one clock by a delay pipeline 100, the output row sum $ORSUM_i$ is obtained.

The inputs and outputs shown in FIG. 13 are utilized in the circuits shown in FIGS. 8B and 8C. There is a circuit 102 (shown in FIG. 8B) for each of the thresholders #1–#N shown in FIG. 1, and correspondingly, there is a circuit 104 for each of the named thresholders. The circuit 102 includes the queue controllers 106 and 108, a multiplexer 110, and the Row Sum Queue #1 already alluded to. The queue controllers 106 and 108 are identical in construction; accordingly, a discussion of only queue controller 106 will be given.

Figure 14:
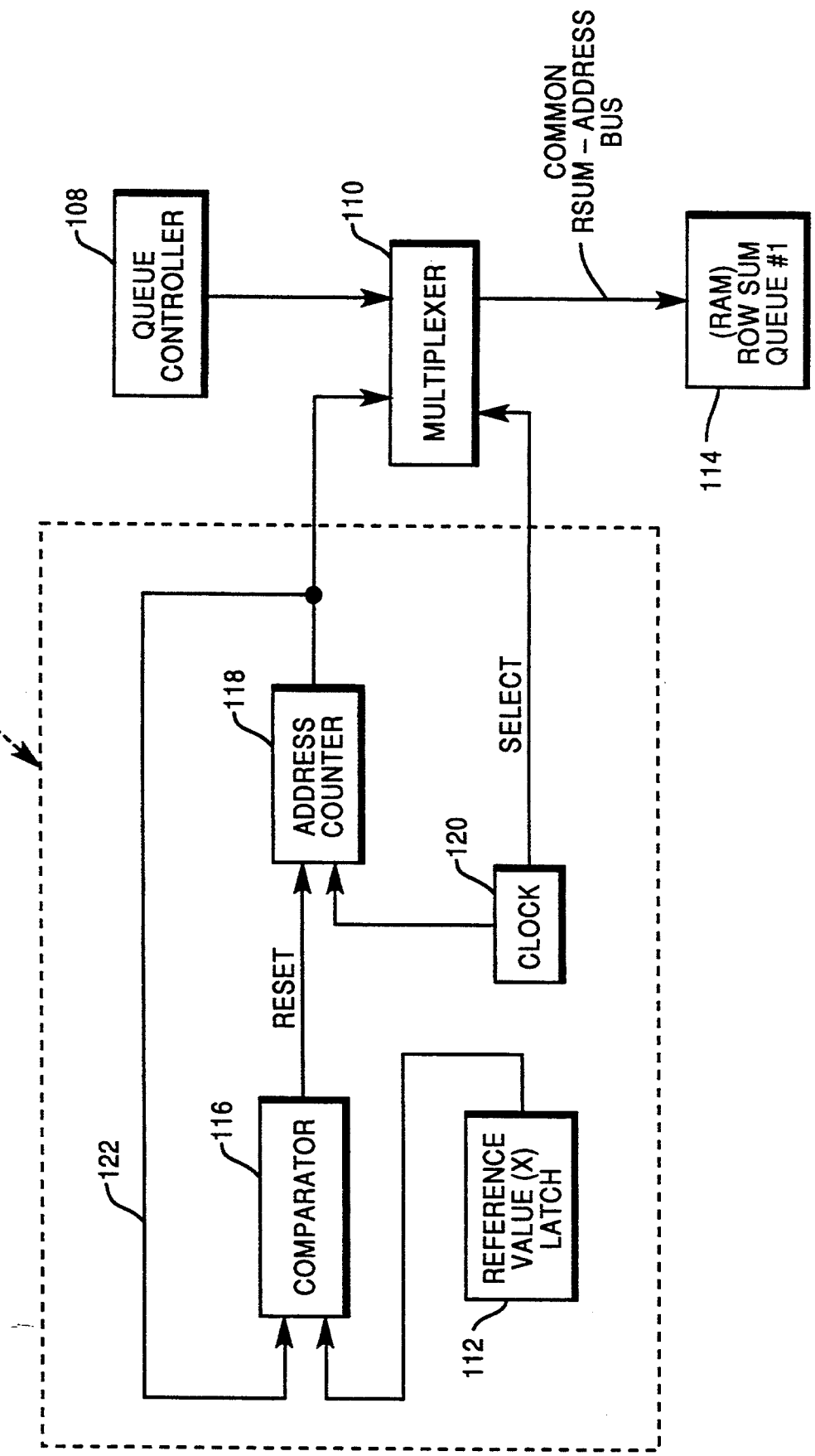
FIG. 14 is a schematic diagram showing details of a queue controller shown in FIGS. 8A, 8B, and 8C.

The function of the controller 106 (FIG. 14) is to provide the addresses for the locations where data is to be stored in the Row Sum Queue #1. The controller 106 includes a latch 112 in which a reference value (x) is stored. The reference value (x) represents the last usable address which is to be used in a RAM 114 of which the Row Sum Queue #1 is comprised, with a zero address being the starting address and with the length of this queue extending between the zero address and the last usable address or reference value (x). The reference value (x) is fed into a comparator 116, and the other input to the comparator 116 comes from the output of an address counter 118. Whenever the address counter 118 is reset, it outputs a zero to the comparator as the first input thereto. A strobe or clock 120 is used to increment the address counter 118 from its zero position towards the reference value (x) to provide the addresses to the Row Sum Queue #1 (RAM 114) via the multiplexer 110. As the address counter is incremented, the output thereof is fed to the comparator 116 via a line 122. When the output of the address counter 118 reaches the reference value (x), the comparator issues a reset signal to reset the address counter 118 to repeat the process of providing addresses to the Row Sum Queue #1 as described.

The queue controller 108 (FIGS. 8B and 14) functions in the same manner as the queue controller 106 just described. For functions, the queue controller 108 is used to control the address for the output row sum $ORSUM_i$ being read out of the Row Sum Queue #1, while the queue controller 106 controls the address of the input row sum $IRSUM_i$ being read into the Row Sum Queue Sum #1. The select signal for the multiplexer 110 is derived from the clock 120. The multiplexer 110 is needed because two different addresses are accessed during each summing operation associated with the window 66 shown in FIG. 7. In other words, the queue controller 106 points to an address for the input row sum $IRSUM_i$ which is to be added to the window 66, and the queue controller 108 points to an address for the output row sum $ORSUM_i$ which is to be deleted from the examining window 66.

The circuit 104, shown in FIG. 8C, includes a queue controller 124 which functions as an address pointer relative to the Row Sum Queue #2. The queue controller 124 functions conventionally as a single address pointer to provide an address where the old data ($TRSUM_i$) is read out of the Row Sum Queue #2 and the new data ($BRSUM_i$) is read therein. The queue controllers 134 and 136 function in the same manner as queue controller 124 in that they are used conventionally as pointers to point to a single address in their associated Queues #1 and #2 shown in FIG. 8A. For example, queue controller 134 points to a single address in the NP-CP Queue #1 from which the center pixel $CP_i$ is removed, and the new pixel $NP_i$ is inserted. At the next clock, the queue controller 134 points to a new address to repeat the process described.

For each one of the thresholders #1-#N, there is a "wrap around" portion for the associated channel. For example, if the rows of data shown in FIG. 7 are associated with channel #1, the top boundary 68 provides an overlap portion for the top border of a document or item 12, and the bottom boundary 70 comes from some overlap into the channel #2 as previously described. When the window 66 is moved downwardly from the position shown in FIG. 7 to a position in which the center pixel under examination is located at the lowermost row of the associated channel (row 224 in FIG. 3), the bottom 12 rows included in the window 66 are derived from the 12 topmost rows (rows 225-236) of channel #2, and the 13 top rows of window 66 are obtained from rows 212-224. This means that the pixels in row 224 were thresholded in relation to pixels within channel #1 and the overlapping rows 225-236 in channel #2. When the window 66 moves down one more row to locate the center pixel of the window at row 225 in FIG. 3, the window 66 begins to pick up the top row of the top boundary 68 in FIG. 7. This is because the overlapping for channel #1 is obtained by the top boundary 68 and the overlapping rows mentioned from channel #2. As far as each channel is concerned, the pixels within the overlapping areas themselves are not not thresholded but are merely used to provide the surrounding pixels to evaluate those pixels within a channel which come close to the extremities of each of the channels.

In a similar manner, the overlapping for channel #2 is obtained by the bottom 13 rows of channel #1 and the top 12 rows of channel #3. This process is repeated for the remaining channels #2-#4 shown in FIG. 3. It should be recalled that each of the channels #1-#4 has its own window 66. When the associated window 66 is lowered so that the center pixel is located at row 899 in the example being described, the window 66 (channel #4) would have included therein the bottom 12 rows of the bottom boundary 70 (FIG. 7). When the window 66 is "moved down" one more row in the example being discussed, the associated window 66 begins to include therein, the top row #675 of channel #4 due to the "wrap around" with each of the channels mentioned. At this point, the associated window 66 (channel #4) is moved over one column to the left (FIG. 7) so that a new scan line of data is presented to the window 66 to repeat the process of calculations being described. The procedure described in relation to FIG. 7 is then repeated for the new scan. While the processing is being performed for channels #1 and #4 as described, identical processing is being performed for the remaining channels #2 and #3, with all the channels #1-#4 operating from the same essential clock. In actuality, thresholder #1 and compressor #1 shown in FIG. 1 are located on a single board, and correspondingly, thresholders #2 and compressor #2 are also located on a separate board. The same is true for the remaining thresholders #3 and #N, and their associated compressors #3 and #N shown in FIG. 1. It is perhaps more correct to say that each combination, like thresholder #1 and compressor #1, has its own clock, but all the clocks for each of the combinations of thresholder and associated compressor mentioned operate at the same frequency. Providing each of these combinations with its own individual clock minimizes noise and static E.M.I. (Electro Magnetic Interference).

The circuit 130, shown in FIG. 8A and alluded to earlier herein, is utilized to obtain the new pixel $NP_i$, the center pixel $CP_i$, and the old pixel $OP_i$ which are utilized in the processing performed in association with the window 66 shown in FIG. 7. The circuit 130 includes a latch 132 to receive the pixel stream coming from the scanning line 14, with the pixels for individual channels coming from the splitter 32 (FIG. 1). The circuit 130 also includes queue controllers 134 and 136 which are used to control the assignment of addresses in the NP-CP Pixel Queue #1 and the CP-OP Pixel Queue #2, respectively. The queue controllers 134 and 136 are identical to the controller 106 (FIG. 14) and perform generally as previously discussed.

To review, FIG. 7 shows how the window 66 is moved along the various scan lines and rows and how the various sums like $IRSUM_i$ and $ORSUM_i$ are used in relation to the window 66. It should be recalled that there is a window like 66 for each of the channels #1-#4 being discussed. FIGS. 8A, 8B, and 8C show how the various data used in the processing associated with window 66 is stored. And FIG. 13 shows how some of the data associated with the processing associated with window 66 is derived. As alluded to earlier herein, the actual thresholding of a center pixel CP in relation to its surrounding pixels included in the window 42 was described, generally, in relation to FIG. 6.

Figure 15:
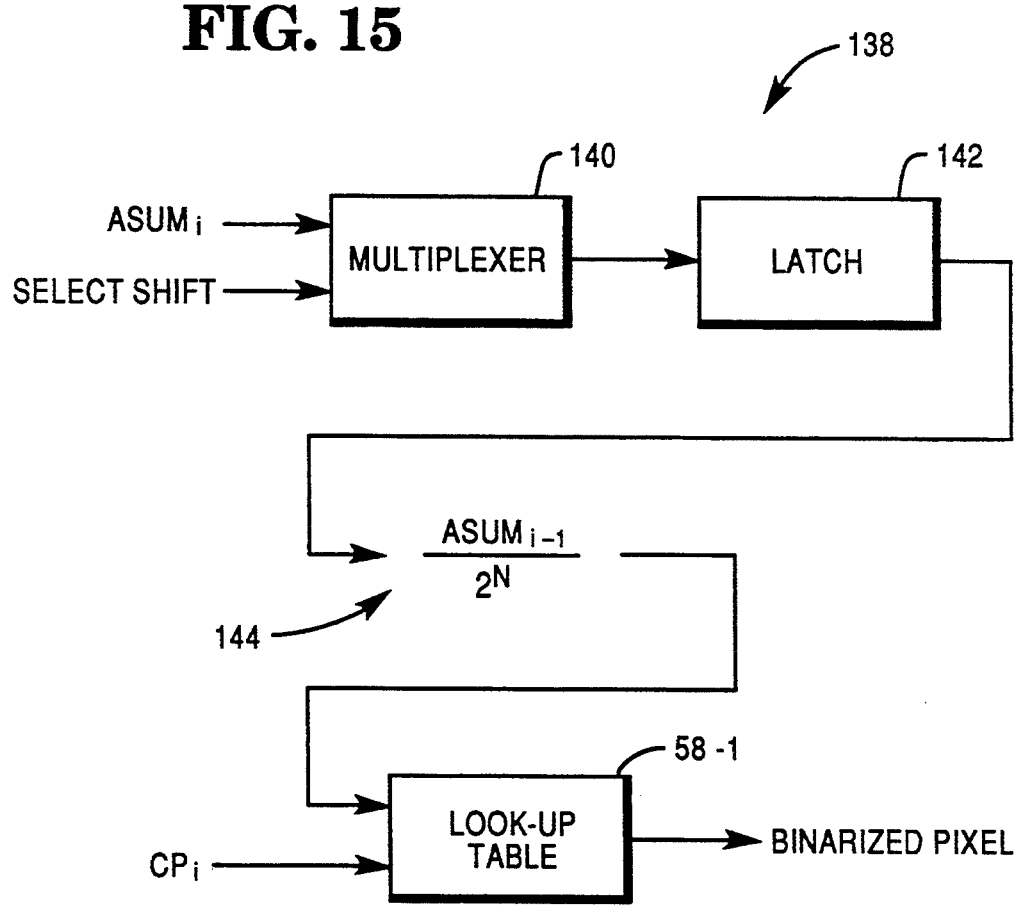
FIG. 15 is a schematic diagram showing a process used for calculating an average gray scale value included in the examining window shown in FIG. 7.

It should be recalled that the average gray level 56 included in the window 42 (FIG. 6) was derived by summing all the gray scale values for the pixels included in the window 42 and dividing that sum by the number of pixels included in the window 42. FIG. 15 shows a circuit 138 which is used to calculate the average gray scale value, with the calculations being performed in relation to the window 66 shown in FIG. 7.

Before discussing the circuit 138 (FIG. 15), it seems appropriate to discuss the mathematics involved as they relate to the window 66 shown in FIG. 7. The window 66 contains 25 pixels along the row direction and contains 25 pixels along the column direction, making a total of 625 pixels included in the window 66. The average gray scale value within the window 66 is given by equation EQ. 11.

$$\frac{\text{Total Gray Scale Value of Window 66}}{\text{Total Number of Pixels Within the Window 66}} = \frac{\text{Total Gray Scale Value of Window 66}}{2^x} = \frac{\text{Total Gray Scale Value of Window 66}}{2^n \cdot 2^f} \quad \text{(EQ. 11)}$$

In the embodiment described, the number of pixels within the window 66 is 625. In equation EQ. 11, the n in the denominator is really the 9th power of 2 which is equal to 512, and 2 to the f power is the fractional part (which relates to 625 divided by 512 = the fractional value of 1.22) which is also incorporated into the look-up table 58 (FIG. 6). The log of 1.22 to the base 2 is greater than 0 but less than 1.

If the window 66 were of a size which equalled a binary multiple, there would be no "remainder" or fractional value of 1.22 to contend with. However, in the embodiment described, this remainder portion is included in the look-up table 58 as previously discussed in relation to FIGS. 6 and 10, for example. The remainder portion just discussed is included in a "scaled and adjusted look-up table" 58-1 shown in FIG. 15A. The center pixel under consideration $CP_i$ and the total gray scale value divided by $2^N$ are used as addresses to the look-up table 58-1, with the output therefrom being the binarized pixel.

Figure 15A:
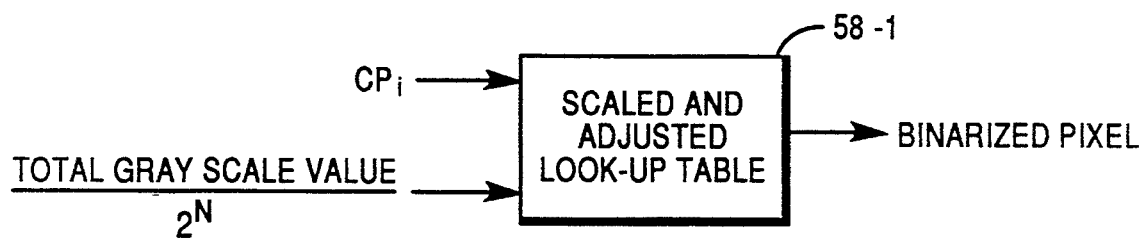
FIG. 15A is a schematic diagram showing a look-up table used in thresholding a center pixel in the examining window.

The look-up table 58-1 shown in FIG. 15A is equivalent to the adjusted look-up table embodied in the graph shown in FIG. 10, but it is rescaled along the X axis by the factor of $2^F$ discussed in the previous paragraph. This rescaling automatically completes the division process embodied in Equation EQ. 11 when the two inputs shown in FIG. 15A are applied as addresses to the look-up table 58-1.

In order to perform the division relative to equation EQ. 11, the circuit 138 shown in FIG. 15 is used. The circuit 138 includes a multiplexer 140 which receives the area sum $ASUM_i$ (for window 66) from the summer 86 shown in FIG. 13. For the embodiment described, the sum of all the gray scale values included in the window 66 is a value about 20 bits wide. Dividing this sum (20 bits wide) by "n" (as discussed in relation to equation EQ. 11) when using the multiplexer 140, amounts to "removing 9 of the least significant bits of data". Removing 9 bits in this manner results in a value which is 11 bits long, and the value represents the average gray scale value included in the window 66; this value is stored in a latch 142, and it is shown by reference numeral 144 in FIG. 15. It should be recalled that the $2^F$ portion mentioned in the denominator of equation EQ. 11 is included in the look-up table 58. The average gray scale value for the window 66 (shown by reference numeral 144 in FIG. 15 and by box 56 in FIG. 6) and the center pixel $CP_i$ (coming from NP-CP Queue #1 in FIG. 8A) are then applied as addresses to the look-up table 58-1 to threshold the center pixel into a binary 1 or 0 as previously discussed. Again, there is one such circuit 138 provided for each of the channels associated with the system 10.

After having described how the thresholding is effected in the system 10, it appears appropriate to discuss how compression is used in this system. As previously stated, there is one compressor, like compressor #1, associated with each thresholder shown in FIG. 1. For example, thresholder #1 is used to process the pixels ranging from pixel #0 through pixel #224 as discussed in relation to FIG. 3. The output from thresholder #1, for example, is a binarized version which is outputted from the associated look-up table 58 as discussed in relation to FIG. 15 to compressor #1.

One of the features of the present invention is that the data at the scanning line 14 is scanned in a vertical direction (as viewed in FIG. 1) so as to produce a plurality of successive columns of data, and the compression is done on a plurality of rows of data for each of the channels #1–#N shown in FIG. 1. For example, a typical prior art application for the CCITT coding is to scan data along rows of an 8½×11 inch document and to do the compression along rows of the document. As stated earlier herein, the compression technique which is used is the CCITT Group 4 method or scheme which is a relative address coding method in that it utilizes an interrelation between a pixel on a current coding or target line and a pixel on the preceding scan or reference line. This particular technique requires a reference line for use in compressing the data on the target line.

As discussed in relation to FIG. 7, the top boundary 68 has one more row therein than does the bottom boundary 70. One of the reasons for this is that by this technique, there will always be a reference row or line to be used when compressing the data for a particular channel. For example, when compressing the top row #225 of channel 30-2 shown in FIG. 3, the bottom row #224 of channel 30-1 will be used as the reference line. Correspondingly, when the top row 0 of channel 30-1 is to be compressed, the bottom row of the top boundary 68 (FIG. 7) will be used as the reference line. When row #1 of channel #1 is to be compressed, row #0 of channel #1 is used as the reference line. By this technique, each compressor #1–#N, shown in FIG. 1, can operate independently and in parallel on the particular data assigned to it.

Figure 16:
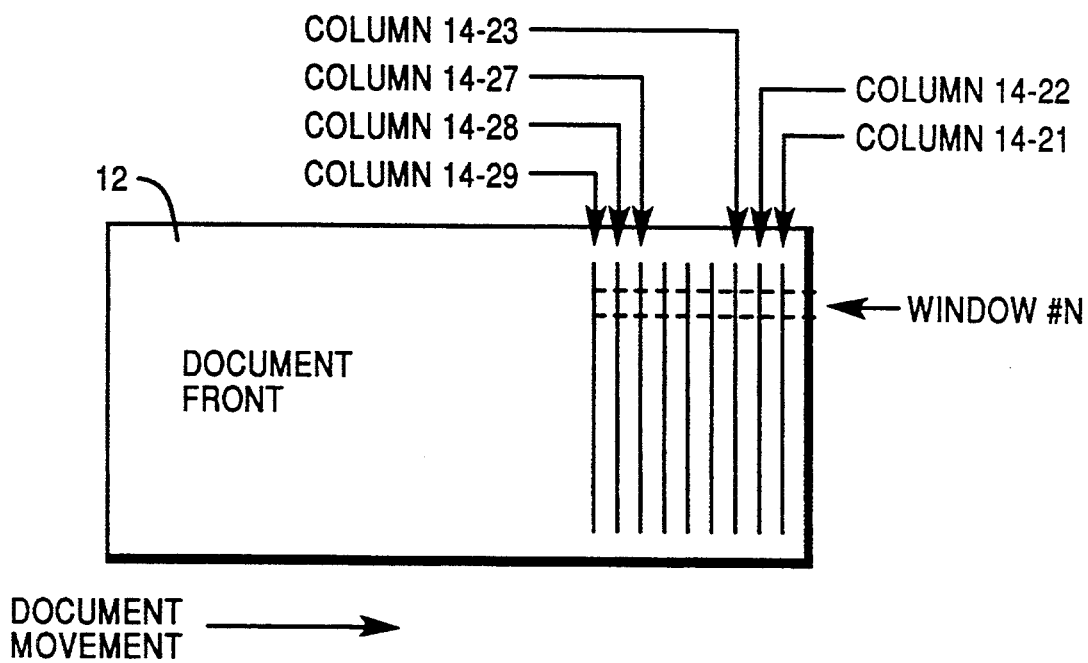
FIG. 16 is a schematic view of the front of item 12 shown in FIG. 1, showing various scanning columns thereon.
Figure 17:
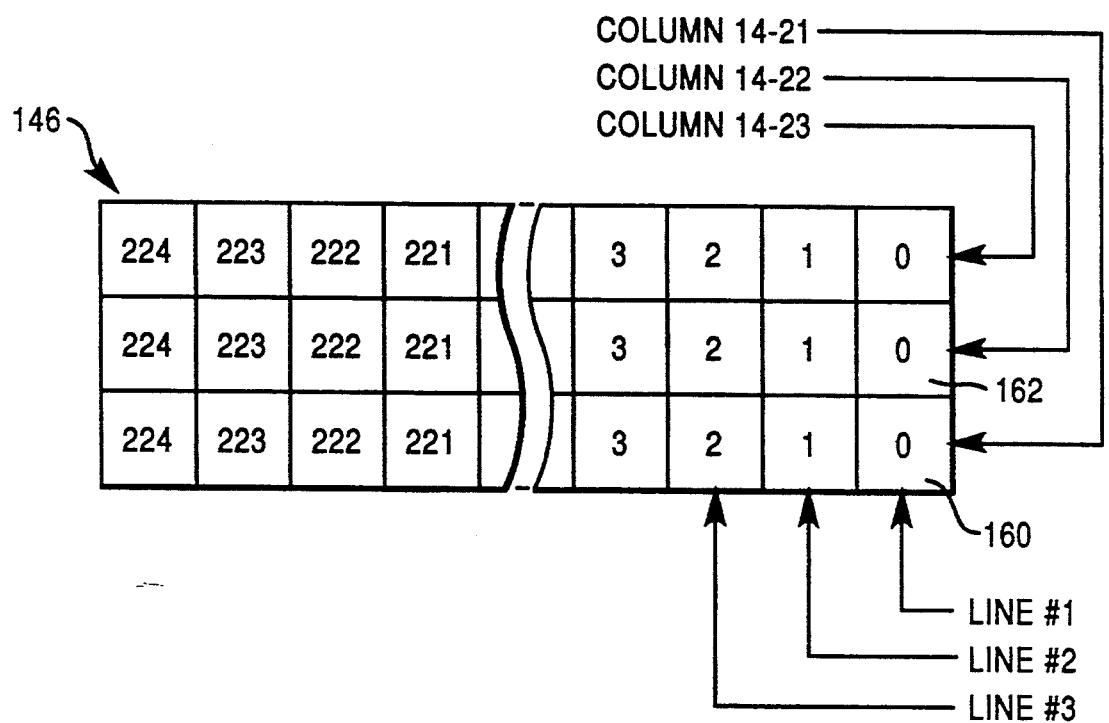
FIG. 17 is a schematic view of a memory, showing how the thresholded binary data coming from an associated thresholder in FIG. 1 is placed in memory to begin the compression associated with the compressors shown in FIG. 1.

As stated previously, the scanning is done in a vertical direction or along columns and the compression is done along a horizontal or row direction in the embodiment described. In this regard, FIG. 16 shows a document 12 being scanned along successive columns 14-21, 14-22, and 14-23, for example. FIG. 17 shows how several consecutive columns of data from FIG. 16 are placed in a memory 146, with one such memory being provided for each of the compressors #1–#N in the system 10. The numbers 0-224 for each column, like 14-21, relate to the particular pixel locations for each of the scan lines in the first channel 30-1 shown in FIG. 1. The data within each of the locations shown in FIG. 17 would be already thresholded to a binary one or a binary zero at this time. The data is compressed along rows of data which are shown as Line #1, Line #2, and the like, although the data is received in sequence along columns. This is a feature of the present invention. Assume that the scanning is done from the top to the bottom as viewed in FIG. 16, and the scanning proceeds from right to left as viewed in this figure. When using the CCITT coding mentioned, seven bits of data are examined in a window designated as window #N in FIG. 16. When the window #N is at the very top of the data (FIG. 16), the first 7 columns of data (columns 14-21 through 14-27) are examined and compressed; this corresponds to Line #1 shown in FIG. 17. The window #N is then moved down one row position as viewed in FIG. 16 to examine and compress the data in columns 14-21 through 14-27; this corresponds to Line #2 shown in FIG. 17. This process is repeated until the window #N reaches the row 224 (FIG. 3) which represents the end of channel #1 in the example being described. Thereafter, the window #N is moved over one column to the left (as viewed in FIG. 16) to start at the top of the document; this action drops off the data associated with column #14-21 and picks up the data associated with column #14-28 for Line #1 (FIG. 17. This process is repeated until all the data on the document 12 is compacted.

It would be useful to describe how the coding is effected, generally, when using the CCITT coding mentioned. The coding method generally provides for coding a "change of color" bit under consideration in a target line (like Line #1, Line #2 etc. in FIG. 17) with change of color bits in a reference line. The change of color bits will be referred to hereinafter as "COC" bits. FIG. 17 can be viewed as the format for the memory organization when receiving the thresholded pixels from the thresholders #1–#N (FIG. 1) and also as the format for the COC bits which are derived from the thresholded pixels. In this regard, a thresholded pixel is compared with its immediately prior thresholded pixel to determine whether or not there is a change in color. If there is a change in color, a COC bit of binary 1 is assigned to the thresholded pixel under consideration. If there is no change in color (i.e. both black or both white), a binary 0 is assigned to the thresholded pixel under consideration. Essentially, an Exclusive OR gate is used to obtain the COC bits; this aspect will be described hereinafter.

Figure 18:
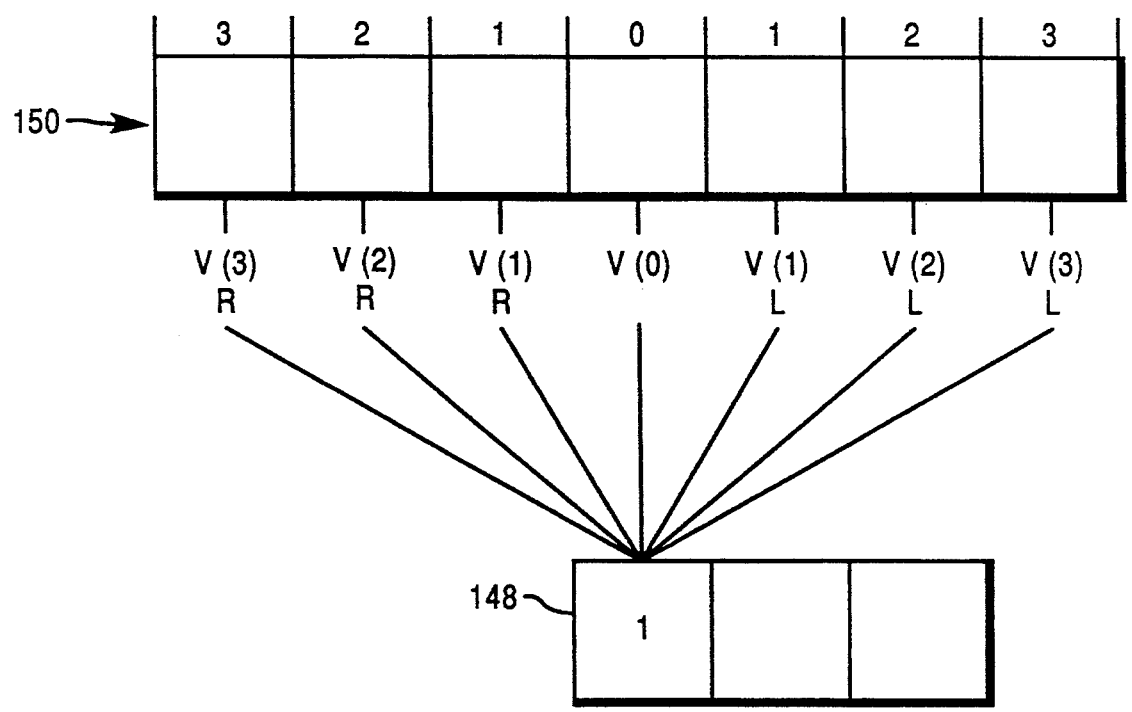
FIG. 18 is a schematic diagram showing how compaction coding is effected.

FIG. 18 is a schematic drawing showing how a COC bit under consideration is referenced to some prior COC bits by a code. For example, COC bit 148 is the bit under consideration in the target row, and row 150 is the reference row. As previously stated, a binary 1 as used in the coding indicates that there is a change in the color of the pixels in the row; that is, it changes from White to black or from black to white. A binary 0 indicates that there is no change in color in the reference row. A binary 1 for the pixel under consideration indicates also that there is a change in the color of pixels in the target row at that location. Similarly, a binary 0 for the pixel under consideration indicates that there in no change from the prior pixel in the target row. As a review at this point, the thresholded data coming from thresholders #1–#N is in the form of a binary 1 or 0, with a binary 1 indicating the presence of data. The thresholded data is processed by a circuit shown in FIG. 20 (to be later described herein) to arrive at the COC bits in the reference and target rows as described previously in this paragraph.

In FIG. 18, the comparing is done from left to right, and the various codes shown thereon relate to the COC bit 148 under consideration. For example, when the change in color appears at position 3 (to the left of position 0) in the reference line 150 and there is a change in color at the COC bit 148 under consideration, the positional coding for this situation is represented by $V_R(3)$; this coding relationship is shown in Column #1 at Row #1 of Chart #1 of FIG. 19. The "R" in the positional coding means that the pixel 148 under consideration is to the "right" of the change in pixel color which occurred in the reference row 150. The "V" in the positional coding refers to "vertical" or the prior row. When the change of color in the reference row 150 occurs at position 0, the positional coding for this relationship is represented by $V(0)$ as shown in Column #1 at Row #4 of Chart #1. If the change in pixel color occurs at position 2 (to the right of position 0) in FIG. 18, the positional relationship is represented by $V_L(2)$; this situation is shown in Row #6 of Chart #1. This situation also means that the COC bit 148 under consideration is located to the "left" of the reference position in the reference row 150. If all the bits in the reference row 150 were binary "1"s, it would mean that the reference row is like a checkerboard, in that white and dark pixels would alternate along the length of the reference row. If there are all "0"s in the reference row, it means that all the pixels in that portion of the row are all either white or they are all black.

Basically what is shown in FIG. 18 is a quick and efficient way of encoding the thresholded pixels coming from the thresholders #1–#N. If the COC bits do not fit into one of the patterns or codings shown in FIG. 18, the system resorts to horizontal encoding which is like "run length" encoding.

Continuing with Chart #1, Column #2 therein contains the reference designations discussed relative to FIG. 18. Column #3 in Chart #1 represents a new way of coding the designations occurring in Column #2. For example, the positional coding $V_R(3)$ is represented by (7), and the positional coding $V_L(3)$ is represented by (1); this way of coding reduces the memory requirements of the system 10. Row #8 in FIG. 19 represents a type of "run length encoding" and Row #9 represents a "pass" situation; these two situations will be discussed hereinafter.

Figure 20A:
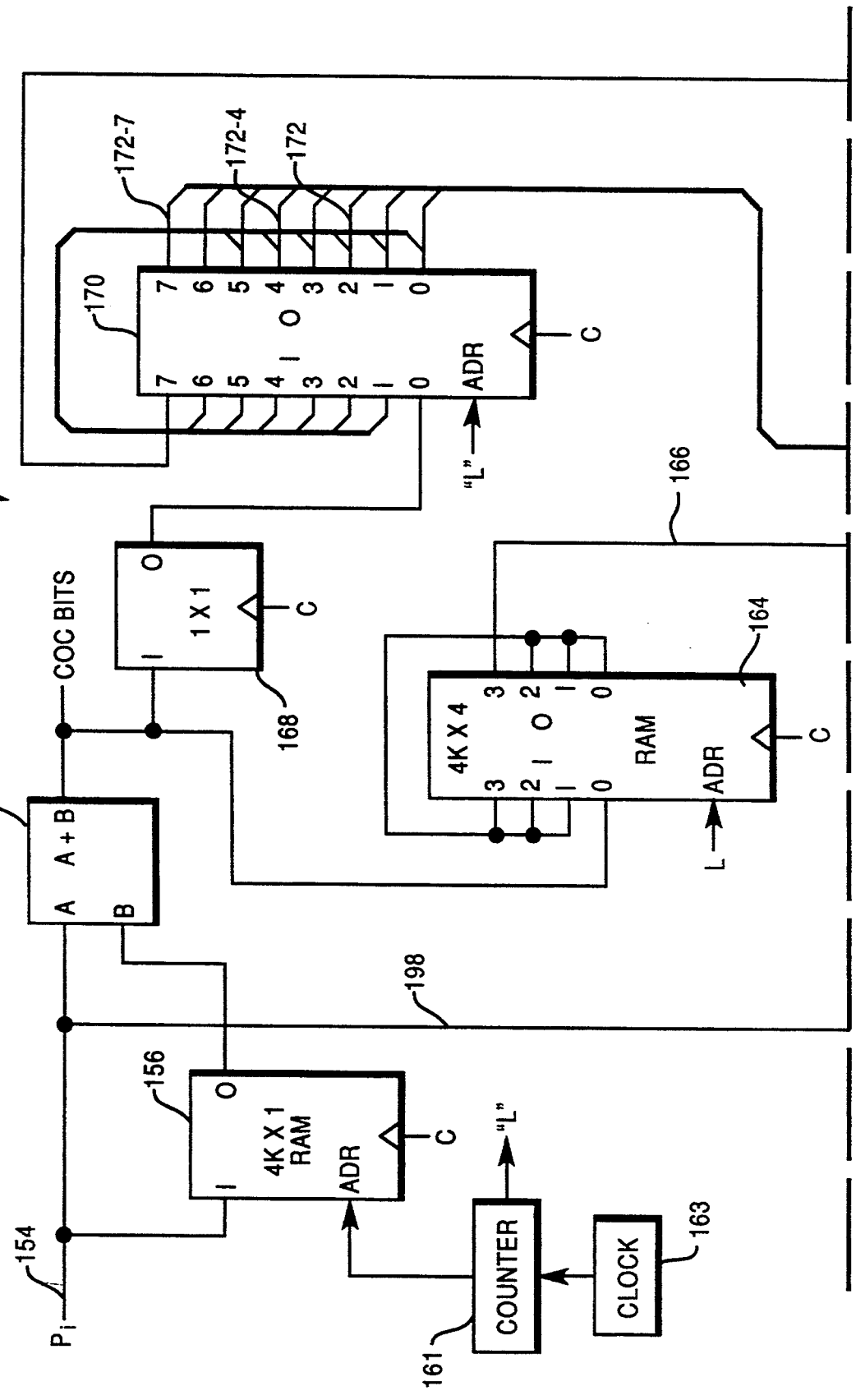
FIGS. 20A and 20B, taken together, show a circuit to effect the coding mentioned with regard to FIG. 19.
Figure 20B:
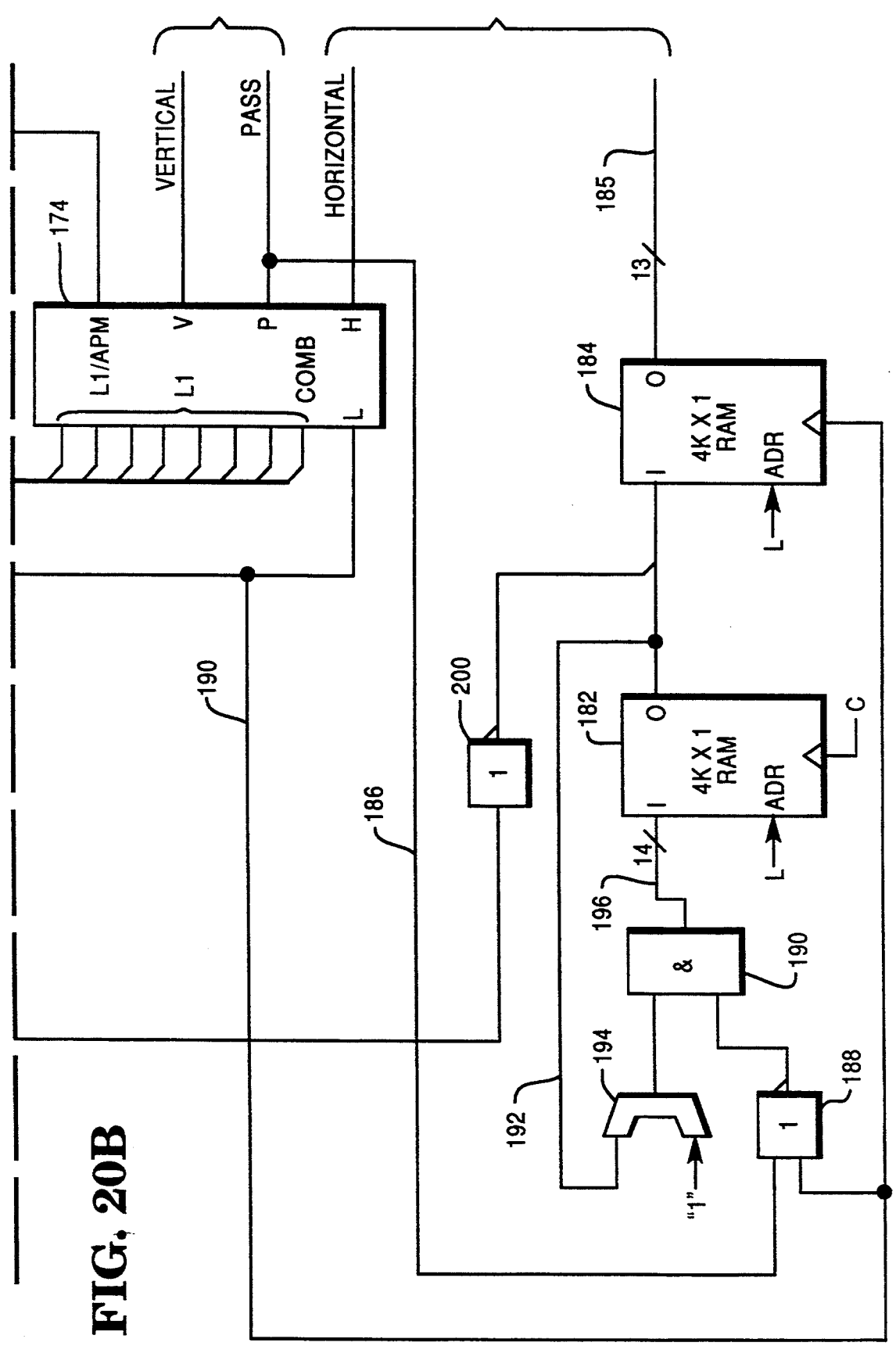

FIGS. 20A and 20B show a circuit diagram 152 which may be used to effect the coding mentioned. There is one such circuit for each of the channels shown in FIG. 1 as previously discussed. Assume that circuit 152 processes the data coming from thresholder #1; this means that the pixels which are thresholded will be those coming from pixels 0 through 224 as shown in FIG. 3. The binarized pixels for channel #1 come from the associated look up table 58 as discussed in relation to FIG. 15.

Continuing with a discussion of FIG. 20A, the binarized pixels, like $P_i$, from the associated look up table 58 are fed as a serial stream over conductor 154 to a RAM 156 in such a manner as to present one continuous string of pixels as shown by Line #1 in FIG. 17. The RAM 156 stores just one column of pixels for the associated channel, and as pixels from the second column of pixels arrive at the RAM 156, the first column of pixels will be outputted therefrom. In other words, as pixel 0 from column 14-22 (Line #2 in FIG. 17) arrives at the RAM 156, pixel 0 from column 14-21 (Line #1 in FIG. 17) leaves the output 0 of RAM 156 and is fed into the B input of an Exclusive OR gate 158. The incoming pixel $P_i$ on conductor 154 is also fed into the A input of Exclusive OR gate 158. Whenever there is a difference at the inputs of the Exclusive OR gate 158, the output thereof will have a binary "1" thereon. What this means is that there is a change in pixel color between the first pixel in column 14-21 and the first pixel in column 14-22. With reference to FIG. 17, whenever there is a change in color between the pixel in location 160 in Line #1 and the pixel in location 162 in Line #1, the output of Exclusive OR gate 158 will be a binary "1"; if there is no difference, the output will be a binary "0". The changes in color are referred to as "change of color bits" ("COC") as previously explained. Notice from what has been just said that while the scanning is done on a column by column basis, as shown in FIG. 16, the actual comparison of COC bits is done on a row by row basis as shown in FIG. 17. When looking at FIG. 17, the columns (from FIG. 16) appear as horizontal entries, while the rows (Lines #1, #2, etc.) appear as vertical entries. Comparing the COC bits on a row by row basis is one of the features of this invention.

Continuing with a discussion of FIGS. 20A and 20B, the addresses for the RAM 156 are provided by a counter 161 which counts from 0 through 224 to provide the correct addresses for the RAM 156 prior to being reset to repeat the process of providing addresses for the next column of pixels to be processed. The addresses to the RAM 156 are provided over address lines which are shown simply as line "L". The address "L" represents a row number as viewed in FIG. 16 or a Line number (FIG. 17) to which the pixel being processed belongs. A clock 163 is used to increment the counter 161, with the channels #1 through #N (FIG. 1) operating at the same clock frequency with one clock per pixel input.

The next step in processing (FIG. 20A) is to take the output from the Exclusive OR gate 158 and propagate this output through a four bit wide RAM 164. The COC bits from Exclusive OR 158 for Line #1 (FIG. 7), for example, are fed into the 0 input of the RAM 64 at addresses "L", supplied by the counter 160. The "0" output of the RAM 164 is coupled to the "1" input of this RAM as is conventionally done; the "1" output of the RAM 164 is coupled to the "2" input of this RAM; "2 out is connected to 3 in"; and the "3" output of the RAM appears on conductor 166. In effect, the output coming from the RAM 164 is delayed by four columns (as viewed in FIG. 16) relative to the output from the Exclusive OR gate 158, and, as column 14-22 of COC bits is entering the "0" input of this RAM, column 14-21 of COC bits is available at the output of this RAM. The change of color bits coming from the output of the Exclusive OR gate 158 are delayed by one Line in passing through the flip flop 168 prior to being fed into the "0" input of a RAM 170, thus effecting a delay of one row (as viewed in FIG. 16). The "0" output from the RAM 170 is fed into the "1" input thereof so as to provide a delay as discussed in relation to RAM 164. The output of the RAM 170 appears on conductors designated generally as 172 which are fed into a comparator 174. To summarize what is happening, as a column of COC bits associated with column 14-28 (FIG. 16) is entering the "zero" input of the RAM 170, the COC bits associated with columns 14-21 through 14-27 are available at the outputs "0" through "7", respectively, of the RAM 170. The eight COC bits coming out of the RAM 170 are similar to eight bits which would appear in Line #1, for example. Other examples of 8 COC bits appear in Rows #1-#7, for example, under Column #1 shown in FIG. 19. The COC bit 176 (FIG. 19) comes out of the RAM 170 on conductor 172-4 which represents a fourth earlier COC bit in the row, whereas the COC bit 178 represents a seventh earlier bit and bit 178 would come out of the RAM 170 on conductor 172-7. The COC bit 180 (FIG. 19) is the COC bit under consideration, and it is fed out of the RAM 164 on conductor 166 to the comparator 174. This is the point at which the CCITT coding mentioned takes place. The situation shown in Column #1 and Row #1 in FIG. 19 would be coded as shown under Column #2 as $V_R$ (3) as previously discussed. In other words, the COC bit 180 under consideration is three positions to the right of the bit 178 shown in FIG. 19. For those situations which do not fit into the positional coding shown under column #2 in FIG. 19, "run length encoding" is used.

Run length encoding is effected by a portion of the circuit 152 which is grouped around RAMs 182 and 184 shown in FIG. 20B, and it is initiated whenever a "horizontal" code is issued from the comparator 174. This means that the particular coding being developed is such that it does not fit into the positional coding shown in Rows #1-#7 shown in FIG. 19. In other words, there are strings of pixels in a particular row "n" (like Line #2 in FIG. 17, for example) in which there is no change in the color of the pixels in that row which occur within +/−3 pixel positions of similar changes within the row "n-1". The RAMs 182 and 184 are 4K×16 bit RAMs in the embodiment described; these RAMs have addresses (L) which are supplied from the counter 161, and the data is clocked into the RAMs by a clock "c".

Continuing with the run length encoding being described, assume that an output other than "PASS" is obtained from the comparator 174 over conductor 186. This binary one is fed into one input of a NOR gate 188, with the remaining input to this gate coming from the output of the RAM 164 via conductor 190 which is connected to conductor 166. It should be recalled that conductor 166 contains the COC bit under consideration as discussed earlier herein. A binary one on conductor 186 (coming from comparator 174) causes the output of NOR gate 188 to generate a binary "1" which is fed into one input of an AND gate 190. Normally, the change of color bit on conductor 190 is a binary 0. Assume that the output of the RAM 182 is a binary 0 at this time; this output is fed over conductor 192 to one input of an adder 194 whose other input is hardwired to receive a binary 1 thereon. The output of the RAM 182 is then fed back through the adder 194 to accumulate a count on the adder 194, with this count passing over a 14 bit bus 192 and being stored in a location in the RAM 182, with the row or Line # being determined by the L input to this RAM. In this way, the number of pixels of the same color in a given row "n" is accumulating at a location "L" in the RAM 182. When there is a change in pixel color or a transition, a binary 1 coming over the conductor 190 is used to clock the count in the RAM 182 into the RAM 184. At this time, the actual color of the run of consecutive pixels of the same color is also clocked into the RAM 184. The actual pixel color is obtained over conductor 198 and inverter 200. The output of RAM 184 is used for the CCITT coding of a horizontal "run" of a length equal to the number of pixels accumulated in RAM 182 at location L since the occurrence of the last change of color bit "1" on conductor 190 for row "n".

Figure 21:
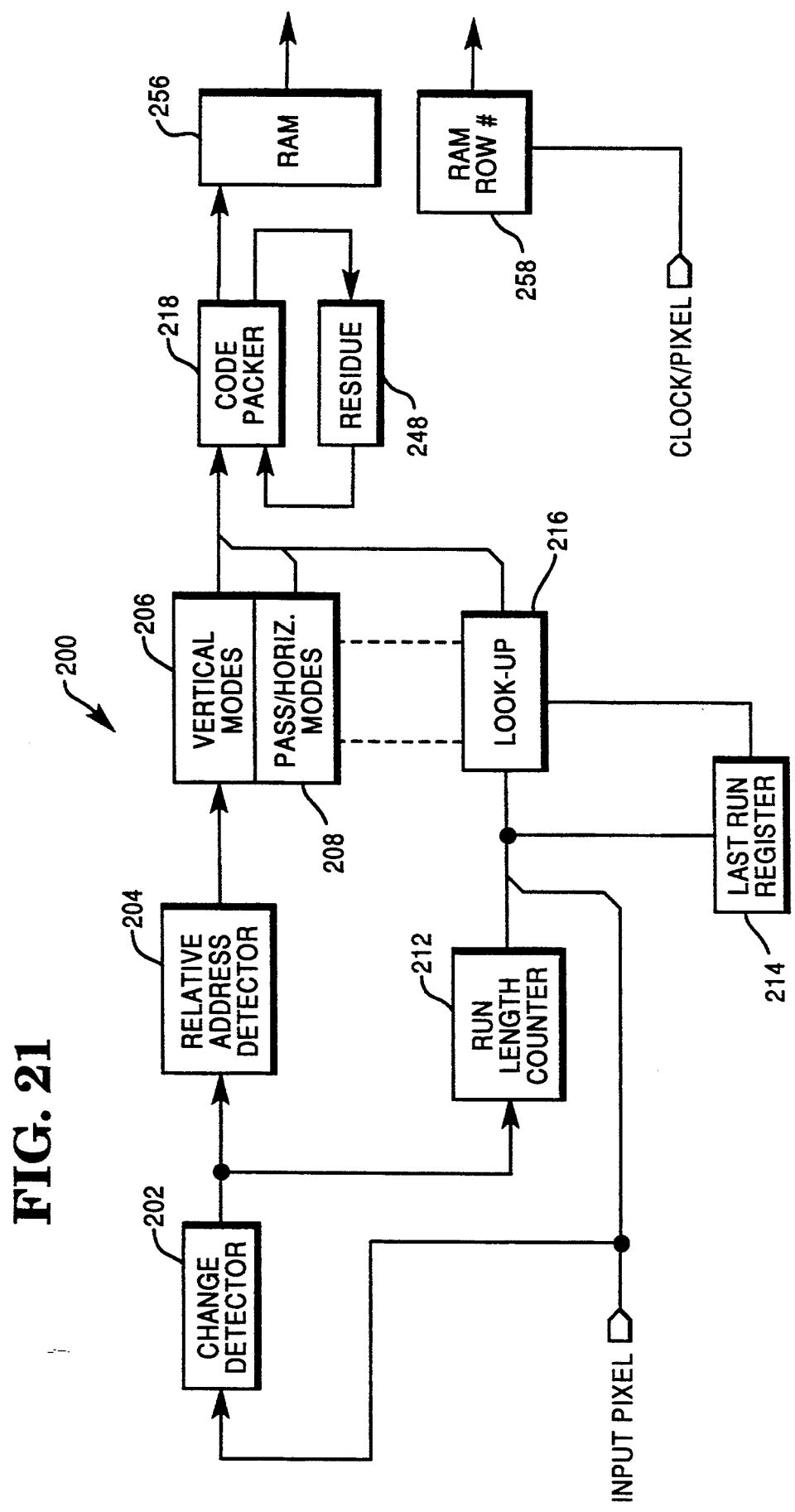
FIG. 21 is a general schematic diagram showing an overall view of a compressor used in the system shown in FIG. 1, with one such compressor being provided for each channel shown in FIG. 1.

FIG. 21 is a general schematic diagram of a compressor 200, with one such compressor being provided for each of the compressors #1-#N shown in FIG. 1. The circuit diagram 150 (FIGS. 20A and 20B) is part of the compressor 200, and it is useful to utilize FIG. 21 to summarize what has been explained relative to FIGS. 20A and 20B. As previously stated, the input to the compressor 200 (like compressor #1 shown in FIG. 1) is serial single bit pixels from the associated thresholder (like thresholder #1 shown in FIG. 1), with the pixels coming in one column at a time, and with the compression being done along rows of pixels as formed when the columns are arranged side by side.

The first stage in the process involves comparison of the next column pixel received to the previous pixel in that row. The output of the change detector 202 (FIG. 21) indicates that the color of the pixels in a row has changed on the pixel point just after the change. The RAM 156 and the Exclusive OR gate 158 (FIG. 20A) are part of the change detector 202.

The next stage of processing in the compressor 200 (FIG. 21) compares the pixel location of changes in the current or target row with changes in the prior or reference row within the range of three pixels ahead and three pixels behind the pixel under consideration. It should be recalled that the comparing is done with COC bits corresponding to the thresholded pixels. The comparing is done as described in association with FIG. 19. This comparing is accomplished by shifting the output from the change detector 202 through the relative address detector 204 which includes the RAMs 164 and 170 (FIG. 20A) and the comparator 174. The output of a previous row or Line (FIG. 17) is shifted through the seven bit RAM 170 while the output for the current row is delayed by four pixels by shifting through the RAM 164. The outputs of the RAMs 164 and 170 are compared in the comparator 174 to indicate one of seven Vertical modes as discussed in relation to FIG. 19. The comparator 174 is conventional, and it includes logic circuitry to determine the codes discussed in relation to FIG. 19. The outputs from the comparator 174 include the Vertical modes 206 and the Pass and Horizontal modes 208. If two COC bits in a previous or reference row have shifted through without a corresponding COC bit in the current row, a Pass mode is indicated and the changes are erased. A Pass mode is indicated by a single code (0001) as indicated under Column #4 of Row #9 of FIG. 19 This mode means in effect, "Skip the two COC bits in the reference line or row and begin coding at the next COC bit". Should pixel color changes shift through without qualifying for Vertical or Pass modes, a Horizontal mode will be indicated.

In the case of a Horizontal mode, previously referred to as run length encoding, the length and color of the runs must be known. In this regard, the run length counter 212 is always active. The run length counter 212 includes the adder 194 and the RAM 182 shown in FIG. 20B, and the color of the run is received over conductor 198. Whenever there is a change in the COC bit, a count begins to accrue on the RAM 182 as previously explained. The count on the RAM 182 continues to accrue as long as there is no change in the COC bit. As soon a next change occurs, the count which is presently on the RAM 182 is transferred to the last run register 214 (which corresponds to the RAM 184 shown in FIG. 20B) along with the color of the "run" of pixels. After the count is transferred, a new count begins to accrue on the RAM 182. The outputs of the relative address detector 204 (FIG. 21) and the run length counter 212 are coupled to a look-up table 216. When Vertical or Pass modes are detected, the output of the RAM 184 is ignored, and look up depends on the output of comparator 174 only. In the horizontal mode, the output of the RAM 184 drives the look-up table 216. The output of the look-up table 216 represents the appropriate Modified Relative Address (RE-AD) code (specified in CCITT Group 4 convention) for the selected mode and context. The RE-AD codes are of varying bit lengths; they are generated in a consolidated form with the leading zeros omitted. Each code has an associated word length in a separate field. The codes from the look-up table 216 enter a code packer 218 which uses the word length in the separate field to construct the full code for the selected mode and justify it immediately following the previous code for the row. This aspect will be described in more detail hereinafter.

Some additional comments appear in order for the examples shown in FIG. 19. As previously stated, the vertical coding of the pixel or the associated COC bit in the target row applies to seven pixels in the prior or reference row. The seven pixels include the three pixels before and the three pixels after the COC bit plus the pixel directly above the COC bit under consideration in the target row. In FIG. 19, those COC bits 176 and 178 are located in the reference row and can also be referred to as residing in an N-1 row, whereas the COC bit 180 is located in the target row or the N row. The examples in Rows #1-#7 in FIG. 19 cover those situations in which the COC bit in the target or N row can be referenced to a COC bit which is a binary 1 in the reference or N-1 row. Notice that there is no COC bit in the reference row shown in Row #8 in FIG. 19. This means that the COC bit 220 cannot be referenced to a COC bit in the reference row 222. In other words, the arrangement shown in Row #8 in FIG. 19 cannot be expressed by one of the V or Vertical mode code situations shown in Rows #1-#7 or the Pass or P shown in Row #9; this is referred to as a Horizontal coding situation. The Horizontal coding situation means that the system will resort to run length encoding to encode the COC bits in the target row as discussed with regard to the run length counter 212. The code words according to the CCITT coding for the various V codes are shown under column #4 in FIG. 19. For example, the code word for the V code shown under column #2 of Row #5 is "010". These code words are stored in the Look-up table 216 and become the output therefrom when accessed as will be described hereinafter.

Figure 22:
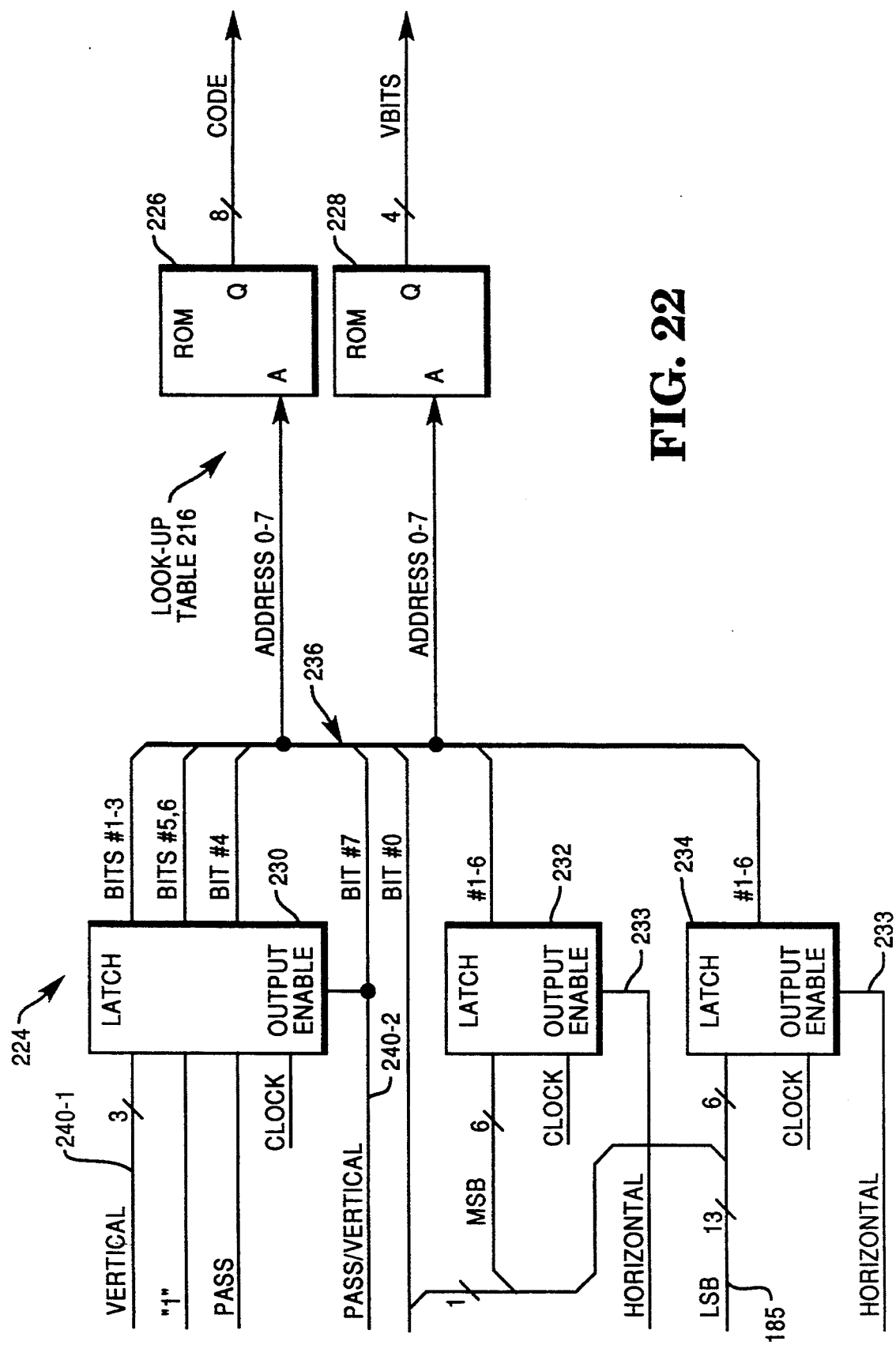
FIG. 22 is a schematic diagram showing a circuit which performs the function of translating the output of a comparator shown in FIG. 20 into CCITT Group 4 codes.

FIG. 22 is a schematic diagram of a circuit 224 which includes the look-up table 216 discussed in relation to FIG. 21. The inputs to the circuit 224 come from the outputs of the comparator 174 and the RAM 184 shown in FIG. 20B. The look-up table 216 is comprised of ROMs 226 and 228, and these ROMs are used to generate the CCITT codes mentioned earlier herein; these codes are the ones shown under Column #4 in FIG. 19 and the Run length codes mentioned.

As alluded to, the circuit 224 in FIG. 22 performs the function of translating the output of the comparator 174 and the output of the RAM 184 into the CCITT codes mentioned. A latch 230 accepts the outputs of the comparator 174 shown in FIG. 20, and similarly, latches 232 and 234 accept the output of the RAM 184 (FIG. 20B) when a Horizontal mode is detected. There are 13 conductors in the bus 185 leaving the RAM 184 and entering the circuit 224. Six bits, the most significant bits (MSB), enter the latch 232, and the six least significant bits (LSB) enter the latch 234. The "color" bit is carried as one of the 13 conductors in the bus 185. With regard to latch 230, the output of the comparator 174 is fed thereto via the Vertical, Pass and Horizontal conductors as previously described. An example will make the various outputs more readily understandable.

Figures 22A, 22B:
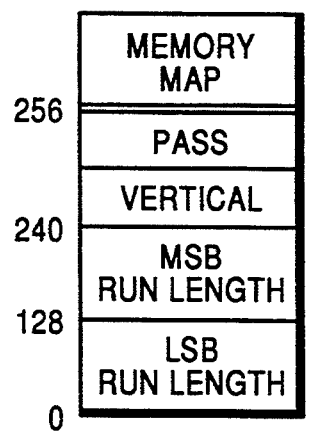
FIG. 22A is a chart showing various bit positions are used to address a Look-up table shown in FIG. 21.
FIG. 22B is a memory map showing the organization of data in the ROMs shown in FIG. 22.

FIG. 22A shows a chart 238 indicating what data is on the address bus 236 (FIG. 22) leading to the Look-up table 216. For example, if the coding process indicates a $V_R(1)$ code situation as shown under Column #2 in Row #3 of FIG. 19, the shorthand coding indicates a (5) under Column #3, and the desired code output from the Look-up table 216 is "011" which is shown under Column #4. From the data under Column #3, it is apparent that three binary bit positions are adequate to express the data. In the example being described, the (5) mentioned is coded as a binary "101" and occupies bits #1-#3 in chart 238; these three bits enter the latch 224 (FIG. 22) via bus 240-1. Bit position #0 is a color bit; however, when utilizing the V codes mentioned, it becomes a "don't care" bit. This is because the same Vertical or V codes are used for black or white binarized data under the conventional coding mentioned; however, this bit position becomes important when the horizontal encoding is employed. Bit position #4 becomes a "1" or true when a Pass mode is indicated by the comparator 174 shown in FIG. 20B; otherwise, it is "0" when a V code is generated. Bits #5 and #6 coming from the output of latch 230 are each forced to a binary "1" whenever a pass or a V code appears on conductor 240-2 which becomes bit position #7. In the embodiment described, a "1" on conductor 240-2 is used to enable the latch 230. In other words, latch 230 is enabled to handle the V codes and the pass code, while the latches 232 and 234 are enabled to handle the horizontal codes. Bits #5 and #6 are used to indicate the number of valid bits in the V codes, and in the example being described, the number of valid bits is three, requiring only two binary bit positions. A "0" on conductor 240-2 disables the latch 224.

When a "horizontal" mode is generated by the comparator 174 in FIG. 20B, the output of the RAM 184 is latched in the latches 232 and 234 shown in FIG. 22 by a signal appearing on conductor 233. It should be recalled that the bottom half of the circuit 152 in FIG. 20B, including the RAM 184, is that portion of this circuit which generates the horizontal codes for a string of black pixels or a string of white pixels. The strings of pixels can vary in length from three to over 100, for example. The output of the RAM 184 in FIG. 20B is carried on a 13 conductor bus 185, with the six MSB (bits) being directed to latch 232 (FIG. 22) and the six LSB (bits) being directed to latch 234. The 13th bit or the color bit is shown as "Color" in FIG. 22; it becomes Bit #0 for addressing the ROMs 226 and 228. After the data is latched in the latches 232 and 234, two clock cycles are used to create the full code for the run length coding in the horizontal mode. The first clock is used to apply the MSB #1–6 to the ROM 226, and the second clock is used to apply the LSB #1–6 to the ROM 228. With regard to bit positions for addressing the ROMs 226 and 228, FIG. 22A may be consulted. Bit #0 contains the "color" bit, and Bit #4 would contain a "1", indicating that this particular address is for the Horizontal coding. Bits #1–3 and Bits #5–7 are used for the MSB #1–6 on the first clock cycle for addressing the ROM 226, and similarly, these same bit positions (FIG. 22A) are used for the LSB #1–6 on the second clock cycle for addressing the ROM 228.

FIG. 22B is a memory map which shows how data is stored in the ROMs 226 and 228. With regard to the CCITT Group 4 codes mentioned, these particular codes are divided into three segments. They are: 1) The LSB run lengths or "Terminator" codes; 2) The MSB run lengths or "Makeup" codes; and 3) The Vertical/Pass/Horizontal codes as shown. An important feature of this invention is that these codes fit into a 256 byte ROM.

Notice from the coding shown in FIG. 19 that the code words shown under Column #4 vary in length from one bit (as shown in Row #4) to seven bits (as shown in Row #1). In order to save on memory space and to reduce processing time, ROM 226 in FIG. 22 stores eight bits of data, and ROM 228 stores four bits of data. The least significant bits (which vary in length from one to seven) are stored in the ROM 226, and the four bits in the ROM 228 are used to indicate the length of the valid bits within the ROM 226. The function of saving memory space is effected by the code packer 218 shown in FIG. 21.

Figure 23:
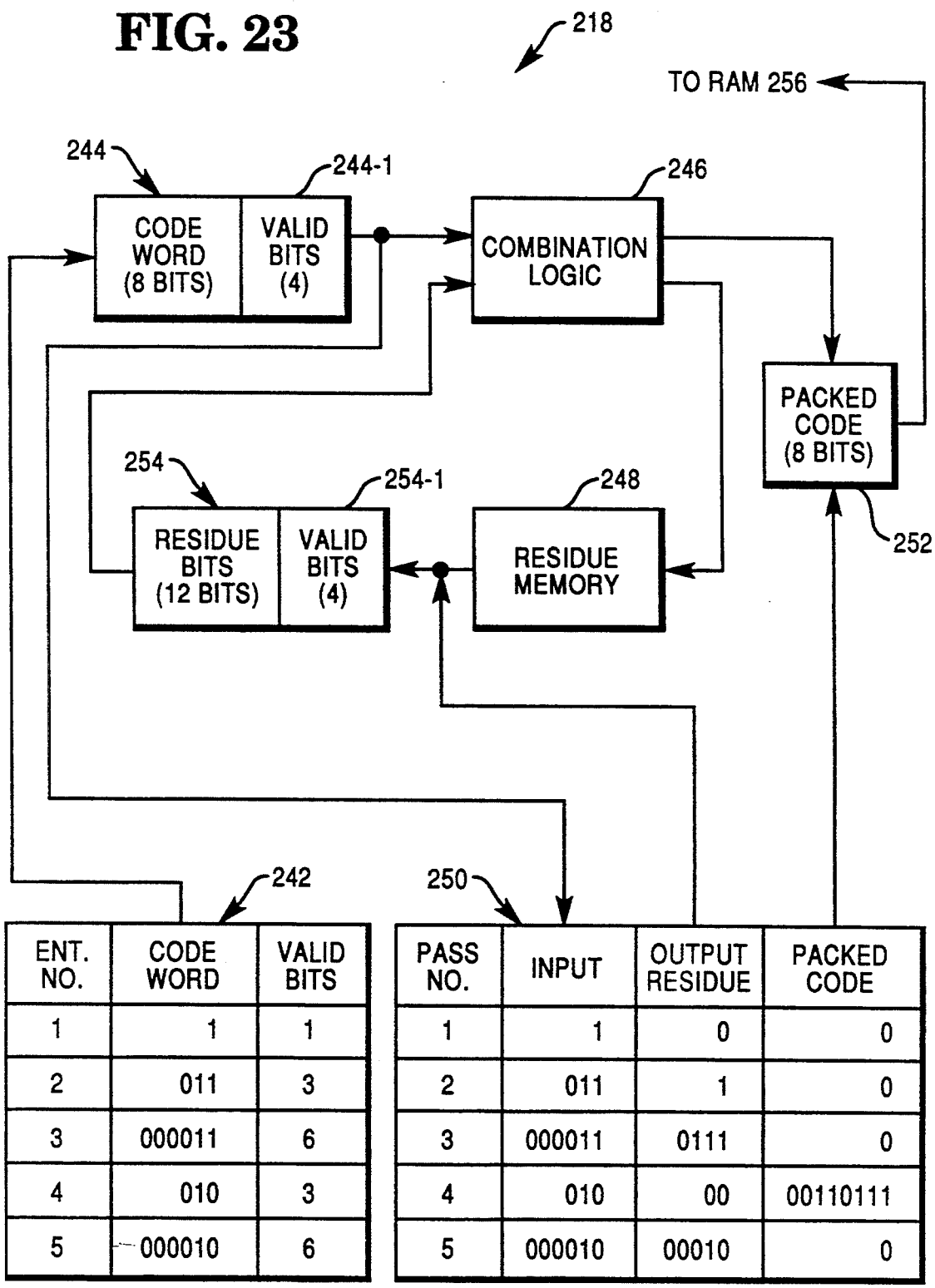
FIG. 23 is a schematic diagram showing how the code packer shown in FIG. 21 functions.

To explain the operation of the code packer 218, it is useful to refer to FIG. 23 which is a schematic diagram showing how the code packer 218 functions. As previously stated, the individual entries coming from the Look-up table 216 in FIG. 21, may be comprised of a variety of code words. For example, the Table 242 in FIG. 23 contains columns for: Entry Number (Ent. No.); Code Word; and Valid Bits. The entry numbers 1–5 relate to sample entries. The code words relate to the code words shown shown under column #4 in FIG. 19; these are the CCITT code words ranging from 1–7 bits. The valid bits in Table 242 give an indication as to how many of the Least Significant Bits (LSB) in the code words are valid bits. Block 244 in FIG. 23 shows that eight bits are provided for the code word and four bits are provided for the associated code words. For example, entry #1 in Table 242 indicates a code word of "1", and the valid bits section 244-1 of block 244 would indicate a "1", showing that there is only one valid bit in the code word. Entry #3 in Table 142 has a code word of "000011" and its associated valid bits column indicates (6); this means that the block 244-1 would have a binary representation of a "6" or "0110". A function of the code packer 218 is to take the code words, which can vary in length as seen in the few examples given, and pack the code words into eight bit bytes.

The code packer 218 includes combination logic 246 and a residue memory 248 shown in FIG. 23. Table 250 is utilized to show how code words of varying length are packed into eight bit bytes. Naturally, the packing could be done into 16 bit words or other lengths if necessary or desirable. Table 250 has columns which are entitled: Pass Number (Pass No.); Input; Output Residue; and Packed Code. Assume that the entries 1–5 from Table 242 are the consecutive entries to be packed; these entries correspond to the inputs #1–#5 shown in Table 250. On Pass #1, code word for Ent. No. 1 enters the combination logic 246; at this time, there in no output under Output Residue, and there is no output under Packed Code because there is just one and not eight bits to fill the packed code shown as block 252. On Pass #2, the code word "011" from Entry No. 2 enters the combinational logic 246; at this time, there is an Output Residue of "1" from the residue memory 248, and there is no output under Packed Code. A point to be made here is that as code words are added during the "packing" process being described, the valid bits are "added" to the partially packed code appearing in the residue block 254. For example, at the third pass shown in Table 250, the residue bits are "0111"; the valid bits appearing in block 254-1 would be a binary "0100" or a "four" which is obtained by adding a "1" valid bit from Entry No. 1 and "3" valid bits from Entry No. 2. At the fourth pass shown in Table 250, the output residue of "0111" is packed or combined with the four rightmost bits of the "000011" input from pass #3 to arrive at the packed code of "00110111"; this is the first packed code which is outputted from the code packer 218. As seen from Pass No. 4 in Table 250, the output residue for Pass No. 4 is "00"; this represents the two left most bits of the input from Pass No. 3. The valid bits appearing in block 254-1 would be adjusted to reflect the fact that eight bits have been packed and outputted; therefore, the number of valid bits remaining in block 454-1 would be a binary "2", corresponding to the output residue of "00" appearing for Pass No. 4 in Table 250 in the example being described.

To review, the code packer 218 (FIGS. 21 and 23) takes the code words discussed in relation to column #4 in FIG. 19 and appends them, one after another, to fit into an series of eight bit bytes. In effect, a series of consecutive codes is provided, with these codes representing the change of pixel color (black/white) within a row as one progresses across a series of columns of data. The packed codes coming from the code packer 218 are sent to a RAM memory 256 (FIG. 21), and the row numbers for the codes are stored in the RAM memory 258.

Figure 24:
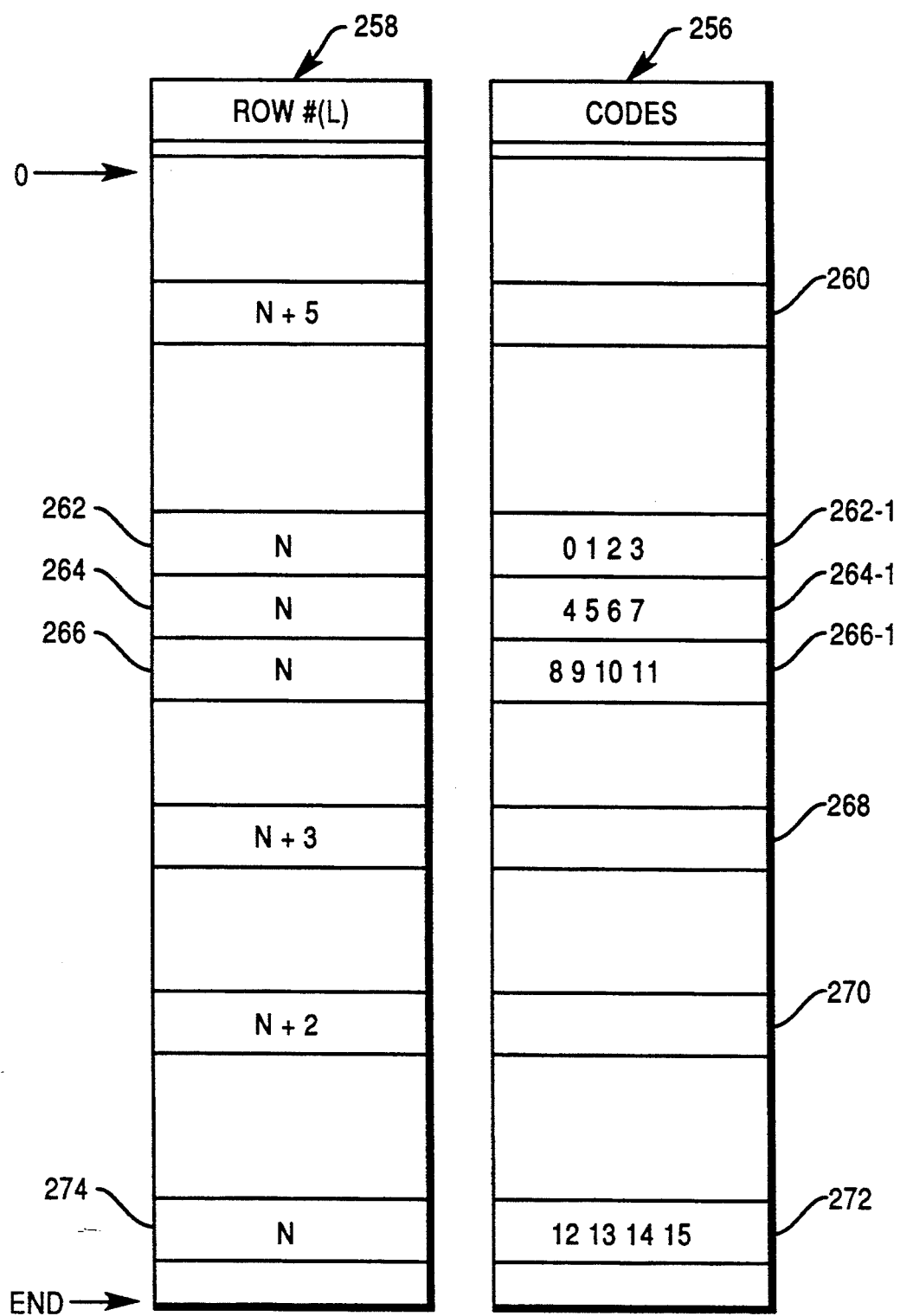
FIG. 24 is a schematic diagram showing the memory organization for certain memories shown in FIG. 21.

FIG. 24 shows the memory organization for the memory 256 and memory 258. One of the points to mention here is that the codes which are packed at block 252 in FIG. 23 do not necessarily come out in nice neat eight bit bytes which are associated with a window position as shown for window N in FIG. 16. In other words, the code word for a window position may be very short as shown under Column #4 in FIG. 19 for the V (0) situation shown therein. This means there would be no output or packed eight bit byte for this row position and window. The evaluation for the coding associated with FIG. 19 would then proceed to next lower window position, as viewed in FIG. 16, where evaluation would be continued. Assume that the first packed code from block 252 in FIG. 23 occurs for row N+5 as shown in FIG. 24. Because this is the first output from block 252 in the example being discussed, the N+5 entry would be positioned close to the start of the memory 258, with the start being indicated by a "0" and with the end of the memory 258 being indicated by "end". Also, for every address in memory 258, there is a corresponding address in memory 256 where the associated codes are stored. The memory address is "L" which is generated as previously discussed in relation to FIGS. 20A and 20B. To review, these are the code words shown in Column #4 in FIG. 19.

In the example being described, the code words associated with the N+5 entry would be placed in block 260 in FIG. 24. Next, assume that there are several entries for row N as shown by blocks 262, 264, and 266, along with their associated entries shown in blocks 262-1, 264-1, and 266-1, respectively. Thereafter, there are entries associated with rows N+3, N+2, and N as shown in FIG. 24, along with their associated codes positioned in blocks 268, 270, and 272, respectively, with the actual codes being left out of these blocks. From what has been described, it follows that the entries for a particular row "N" may be located in several places in the memory 258. It is also conceivable that one might have one coding for the entire first row, for example, if all the columns starting at column 14-21 and ending at the extreme left of the document 12 (as viewed in FIG. 16) were white (i.e. no change in color). In this situation, the coding for the entire first row might be positioned near the bottom of the memory 258. A general way of looking at this procedure is that the storing is done as the window #N is FIG. 16 is moved downwardly and is then shifted over one column to the left; this process is repeated until the window reaches the left side of the document 12.

The data which is in the memory 256 in FIG. 24 comprises the compressed coding for the image of the document 12, with the row numbers for this data being located in the memory 258. As the codes are completed, they are placed in the memory 256 as previously indicated. Notice that the first entry for row #N is positioned at block 262, and the associated code words are positioned in block 262-1. The code words in block 262-1 are simply numbered consecutively to show continuity of the codes as developed; the same is true of blocks 264-1, 266-1, and 272.

It should be recalled that while the discussion has progressed relative to compressor #1 as viewed in FIG. 1, the remaining compressors in the system 10 are performing compression as described. Because the data from the scanning line 14 was divided into four channels in the example being described, it is necessary to consolidate or concatenate the outputs from each of the channels. This function is performed by the consolidator 34 as discussed in relation to FIG. 1. The actual concatenation process can be implemented in either hardware or software.

The concatenation is effected by searching memory 258 (FIG. 24) for all the addresses which are associated with row #1 or row #N in the example being described. This searching is effected by starting at the beginning of the memory 258 and working towards the end thereof. In this regard, the codes for #N row would be concatenated by adding together or "stringing out" the codes which appear in blocks 262-1, 264-1, 266-1 and 272 in that order. Next, the codes for #N 1, #N+2, #N+3, etc. would be concatenated until all the rows for this channel are processed. For channel #1 being described, these are rows #0-#224 as seen from FIG. 3.

The data from compressors #2, #3, #N shown in FIG. 1 are concatenated as just described in relation to channel #1. Once the data from each of the channels is concatenated, this data is grouped into one file or stream of data. In other words, after the data for row #224 from channel #1 is concatenated, the data for row #225 (FIG. 3) is grouped thereafter so that all the rows of data from #0 through #899 in the embodiment being described are grouped. This means that the rows of data are now in a format to enable the data to be sent to a utilization means 38 as discussed in relation to FIG. 1. When the data is sent from the consolidator 34 to the utilization means 38, there are also some conventional codes which are sent at the start of the transmission. The codes may include, for example, the number of pixels in a row and the number of columns of data which are present; these numbers are the same for each of the channels #1-#N. Once the data is in the format described, there are conventional algorithms which handle the processing of data according to the CCITT coding mentioned. Because this aspect is conventional, it need not be discussed any further.

Some of the additional advantages of this invention are as follows:

1). It minimizes the data at the "output" of the system 10 so that more conventional transmission means can be used for transmission.

2). Large amounts of internal memory are not required to process the images.

3). Because the pixel data for a document 12 are not all accumulated before processing begins, the latency from input to output for the system 10 is minimized.

Figure 25:
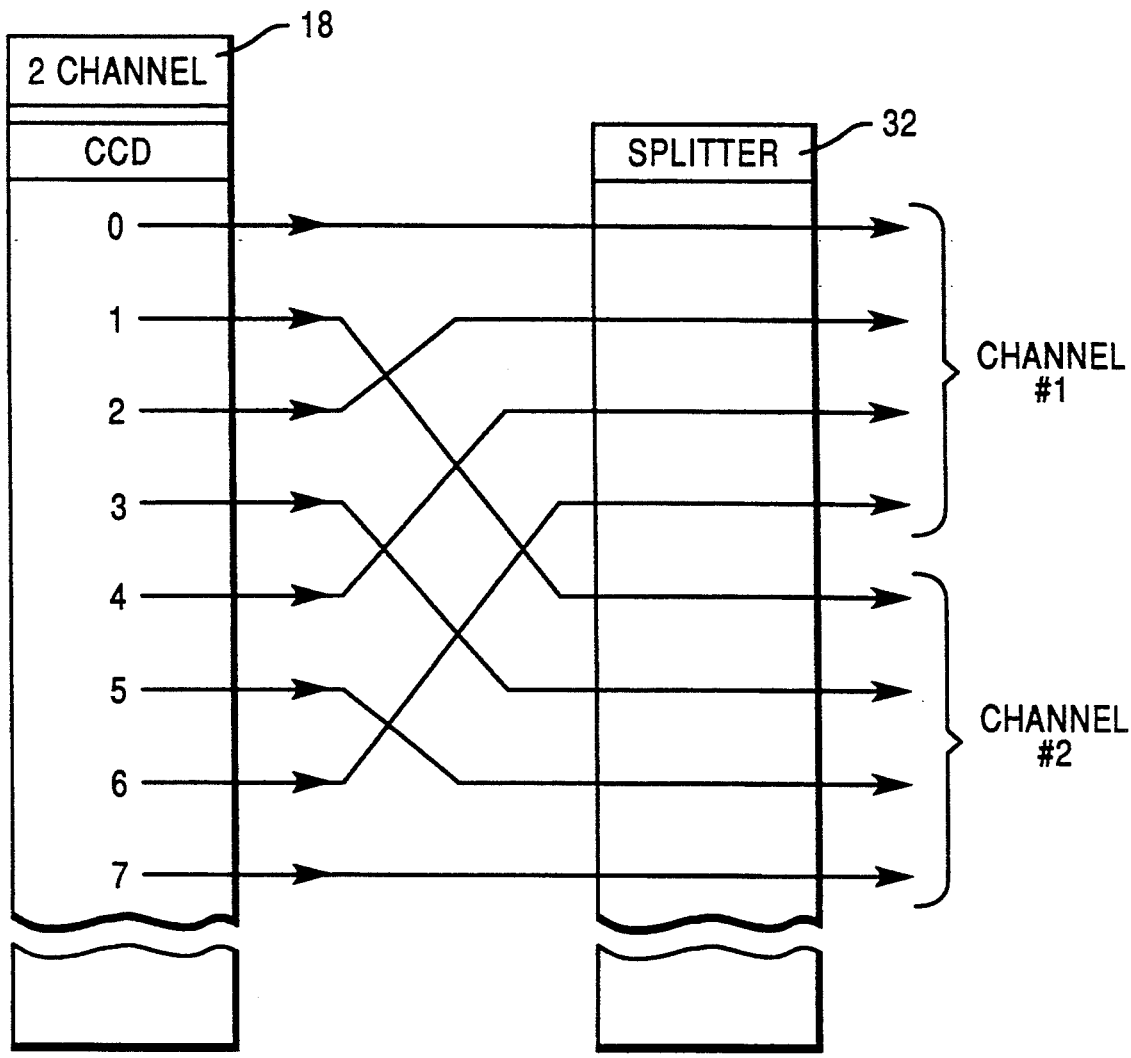
FIG. 25 is a schematic view showing how individual pixels in a scan line are organized prior to going to the splitter shown in FIG. 1.

It seems appropriate to discuss additional details related to the splitter 32 alluded to earlier herein in relation to FIG. 1. The function of the splitter 32 is to take the scan line of pixel data 30 and to divide it into a plurality of individual processing channels which are processed in parallel as discussed herein. In this regard, FIG. 25 shows, schematically, how a two channel charge coupled device (CCD) in the scanner 18 is utilized to provide Channels #1 and Channel #2 for parallel processing with two channels. The breakdown in FIG. 25 is consistent with that shown in FIG. 2B; however, only pixels 0 through 7 are shown in FIG. 25, with pixels 8-900 in the embodiment described being deleted from the figure.

Figure 25A:
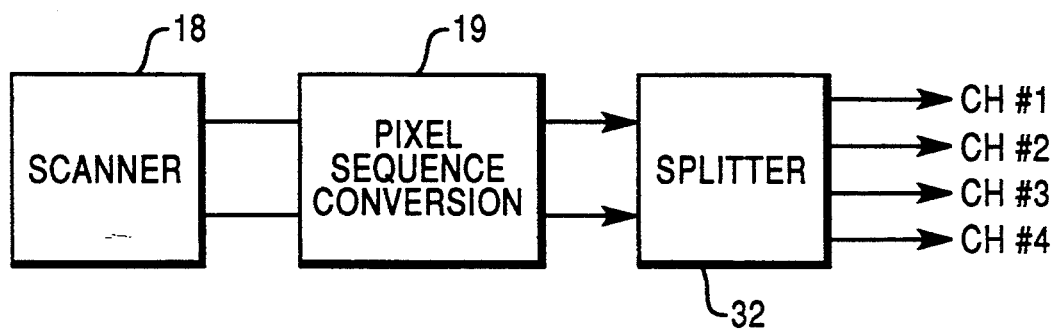
FIG. 25A is a schematic diagram showing a pixel sequence conversion circuit.

When four channels are to be provided, the breakdown of pixels included in each of the channels is as shown in FIG. 2C, with the pixels included in a channel being divided as shown by the technique discussed in relation to FIG. 25. The splitter 32 does not re-arrange the pixel sequencing coming from the scanner 18. The splitter must always receive the data from the scanner 18 in a sequential fashion. If, for example, the scan line of data is transmitted to the splitter 32 four pixels at a time, then at time t₁, pixels 0, 1, 2, and 3 are transmitted to the splitter 32; at time t₂, pixels 4, 5, 6, and 7 are transmitted to the splitter 32, and so forth. FIG. 25A shows a pixel sequence conversion circuit 19 which is shown between the scanner 18 and the splitter 32 for performing pixel sequence conversion as alluded to earlier herein. One of the features of this invention is that the number of processing channels which are used in the system 10 can be selected so as to achieve a certain throughput or pixel processing rate.

The pixel processing rate demanded or needed for a particular application or use is dependent upon several factors. These factors include: the document transport speed; the document height to be imaged with the document height generally being consistent with a single camera scan line; the horizontal (X direction imager resolution); and the vertical or (Y) camera resolution. These factors can be expressed mathematically as:

Application pixel rate=pixels/scan line×scan lines/second.

The application pixel rate also=transport speed×document height×pixel resolution×scan resolution.

In the embodiment described, each of the processing channels like #1-#N in FIG. 1 is designed to support a pixel processing rate of 20 Megapixels per second (MPPS). However, due to processing pixels in the overlap areas as discussed in relation to FIG. 3, the processing rate is less than the maximum processing rate mentioned. The effective maximum pixel rate (EMPR) is given by the following equation.

$$EMPR = \frac{N \times CH. \text{ Pixel Processing Rate}}{1 + \frac{(N-1)(KDY+2) + N*4}{\text{Document Height * Resolution}}} \quad (EQ. 11)$$

In EQ. 11: N=Number of Channels;
KDY=Vertical Dimension, in pixels, of the thresholding window 66 (FIG. 7); Document height in inches; and P1 Resolution=Pixels/inch at Scanning Line 14.

The above EQ. 11 relates to an embodiment which eliminates the top and bottom border information which resides on a document or item 12. With regard to FIG. 3, this top and border information relates to T associated with channel 30-1-1 and B associated with channel 30-4-1. This aspect will become clearer hereinafter.

The border information on an item 12, as discussed in the previous paragraph, does not contain pertinent information; therefore, if it is eliminated, such elimination will increase the performance of the system 10. What this does is to redistribute some of the load associated with the top and bottom border information among the processing channels. This aspect is shown in FIG. 26.

FIG. 26 is a schematic view showing a second embodiment of the splitter (designated as 33) as it relates to the splitter 32 shown in FIG. 1. The second embodiment developed out of an effort to reduce the amount of data to be processed. Earlier herein, it was stated that the window 66 shown in FIG. 7 utilized a reduction factor of "one", which means that all the rows of data within the window are used in thresholding the center pixel shown. Earlier herein it was also stated that a reduction factor of "three" could be utilized in thresholding the center pixel within the window 66; this meant that only every third row of data within the window 66 would be used in thresholding the center pixel. One of the problems with this technique was that completely good "seams" of data were not developed at the overlaps of the channels as discussed in relation to FIG. 3. When an increase in the overlap at the channels was tried, the performance of the channels tended to decrease the performance of the system 10. When the overlap at the channels was increased, the memory requirements of the system 10 also increased.

In an effort to again increase the throughput of the system 10, an effort was made to eliminate the overlap portions which appear at the top and bottom of a document, with these portions appearing in the border of the document or item 12. When the top and bottom overlap portions were eliminated for the border portions of an item 12, and when the load among the channels was redistributed, the overall performance of the system went up again. An important feature of this change was that it simplified the design of the various channels because all the circuitry was essentially the same. In other words, when looking at channels #1-#4 in FIG. 3, all these channels would process data in essentially the same way, regardless of whether a channel was a channel which contained a border of an item 12, like channels #1 and #4, or was an interior channel, like channels #2 and #3.

In this regard, FIG. 26 shows the second embodiment of the splitter which is designated generally as 33. In this embodiment, the pixels from 0 through 898 are the ones which are used in the scanning line 30; however, the pixels within the scanning line are grouped into different channels as shown in FIG. 26. Notice that Channel #1 includes pixels 0 through 231; Channel #2 includes pixels 232 through 449; Channel #3 includes pixels 450 through 667; and Channel #4 includes pixels 668 through 898. These can be compared with the groupings shown in FIG. 3. With the overlap portions, channel 33-1-1 includes the pixels from #0 through B-244 (no top (T) overlap); channel 33-2-1 includes the pixels from T-218 through B-462; channel 33-3-1 includes the pixels from T-436 through B-680; and channel 33-4-1 includes the pixels from T-654 through 898, with no bottom pixels (B) being included in the bottom border as shown.

The number of pixels contained in each of the channels #1-#4 in FIG. 26 is 245, 245, 245, and 245, respectively. When considering a reduction factor of three for thresholding as discussed earlier herein, it is necessary to have a whole multiple of three in order to have all the channels work out properly from the standpoint of parallel processing and thresholding. That multiple, in the embodiment described, is 83; this means that each of the channels in FIG. 26 should include 249 pixels (249 divided by 3=82) with the top and bottom overlaps (and overlap pixels) included. Notice that Channels #1, #2, #3, and #4 in FIG. 26 have 245 pixels; this means that two alignment pixels are added at the bottom of each of Channels #1, #2, #3, and #4 in addition to the End Of Scan (EOS) overhead pixels. This aspect will become clearer with a discussion of FIGS. 28 and 29, for example. The top (T) overlap for each of the Channels #2, #3, and #4 is equal to 14 pixels. For example, between and including the pixels numbered 218 and 231, there are 14 pixels. Any pixels which are needed to arrive at the number of 249 pixels are added to the bottom of the associated channel. For example, Channel #1 of the splitter 33, has two alignment pixels added in the bottom overlap area, with these added pixels being pixels #244 and #245 as well as the two EOS overhead pixels. Another way of looking at this feature is that the splitter 33 adds two alignment pixels to each of the channels, and it is up to the subsequent associated thresholder to use 0, 1, or 2 of the alignment pixels. Because these added pixels occur in the bottom overlap area (next to B-244), they are used only for providing background pixels within the examining window, like 66 in FIG. 7, and they do not cause any error in the "seams" between the channels as discussed earlier herein. In other words, it is only pixels 0 through 231 which are thresholded for Channel #1, and when these pixels are thresholded by thresholder #1, the results are sent to compressor #1. When the pixel under consideration is in an overlap area and also lies within an examining window, like 66, even though it may thresholded, the thresholded output is not forwarded to the associated compressor. For example, a simple counter and decoder (not shown) are used to transfer the thresholded pixels #0 through #231 to the compressor #1 in the embodiment described. The thresholded outputs for pixels like #232 and #233, for example, which lie in the bottom overlap area for Channel #1 would not be forwarded to compressor #1. The thresholded outputs for pixels #231 and #232, when considering Channel #2, would be forwarded to compressor #2 because these two pixels are a part of Channel #2.

Some additional considerations are necessary when discussing the second embodiment of the splitter 33 shown in FIG. 26. The considerations relate to the reduction factor discussed earlier herein. It should be recalled that equations (EQ. 3) and (EQ. 4) discussed earlier herein relate to a general case or that employing a reduction factor of 1; these equations are reproduced here for ease of illustration. When a reduction factor of 3 was utilized, it was necessary to increase the overlap areas when using an examining window of the type shown in FIG. 7. Initially, the overlap included 13 rows for the top overlap and 12 rows for the bottom overlap. With the second embodiment, there is one row added to the top and one row added to the bottom, making a total of 14 rows for the top overlap and 13 rows for the bottom overlap. The equations for the first embodiment are repeated here for comparison.

$$NP - CP \text{ (Pixels)} = \frac{[KD_x + 1 \times CTH]}{2} + \frac{KD_y - 1}{2}, + D_2 \text{ and} \quad \text{(EQ. 3)}$$

$$CP - OP \text{ (Pixels)} = \frac{[KD_x - 1 \times CTH]}{2} - \frac{KD_y - 1}{2}, + D_3; \quad \text{(EQ. 4)}$$

wherein: $CTH$ = Channel thresholder height =

$$\frac{(\text{Max. Doc. Ht.}) \times (\text{Resolution})}{\text{Number of channels}} + KD_y + D_1.$$

The equations for the second embodiment of the thresholder are as follows:

$$\frac{NP - CP}{\text{(Pixel Groups)}} = \frac{[(KD_x + 1)]}{2} \times \frac{CTH}{\text{Pixel Group}} \text{ Size} + D_2 \text{ and} \quad \text{(EQ. 3-1)}$$

$$\frac{CP - OP}{\text{(Pixel Groups)}} = \frac{[(KD_x - 1)]}{2} \times \frac{CTH}{\text{Pixel Group}} \text{ Size} + D_3 \quad \text{(EQ. 4-1)}$$

wherein: CTH=Channel thresholder height, and $D_2$ and $D_3$ are the same length. Notice that the equations (EQ. 3-1) and (EQ. 4-1) are the same, whereas the equations (EQ. 3) and (EQ. 4) are different. What this means, essentially, is that the distance in pixel groups from the new pixel NP to the center pixel CP is the same as the pixel group distance from the center pixel CP to the old pixel OP. The pixel group size is equal to the reduction factor used. In other words, with a reduction equal to three, the group size is equal to three. The above equations are utilized in association with the various controllers and queues shown in FIGS. 8A, 8B, and 8C. The outputs from the thresholders utilizing the equations for the second embodiment are forwarded to the associated compressors where the outputs are processed as previously discussed.

Some additional points are necessary with regard to a memory swapping technique associated with the splitter 33 shown in FIG. 26 and the splitter 32 shown in FIG. 3. It should be recalled that the scanner 18 shown in FIG. 1 may have two channels as discussed in relation to FIG. 2B, or it may have four channels as discussed in relation to FIG. 2C, for example. The outputs from the scanning channels are routed to the scan line of pixel data 30 in the splitter 32. As seen from FIG. 1, there are two memory units 32-A and 32-B associated with the splitters 32 and 33 (FIGS. 3 and 26). Memory unit 32-A may be used for successive odd scans of data, while memory unit 32-B may be used for successive even scans of data. For example, at scan #0, there would be no data in either memory unit 32-A or 32-B. As soon as pixel data from the scan line 30 for scan #0 begins to arrive, the data is put into the memory unit 32-B as divided up into the four channels shown in FIGS. 3 and 26. When the last pixel for scan #0 for the scan line 30 arrives, the data in memory unit 32-B is transferred to each of the thresholders #1–#4 as previously described. The pixel data coming in for scan #1, in the example being described, is put into memory 32-A and is divided up into the four channels shown. When the last pixel data for scan line #1 arrives, the data in memory unit 32-A is transferred to each of the thresholders #1–#4 as previously described, and the pixel data for scan line #2 is put into memory 32-B. This process is repeated until all the scans for the item 12 are obtained. The pointers, like P-1, P-2, P-3, and P-4 in FIG. 26 point to the same pixel within the respective channel. For example, all the pointers mentioned in FIG. 26 point to the 100th pixel with each of the channels.

Figure 27:
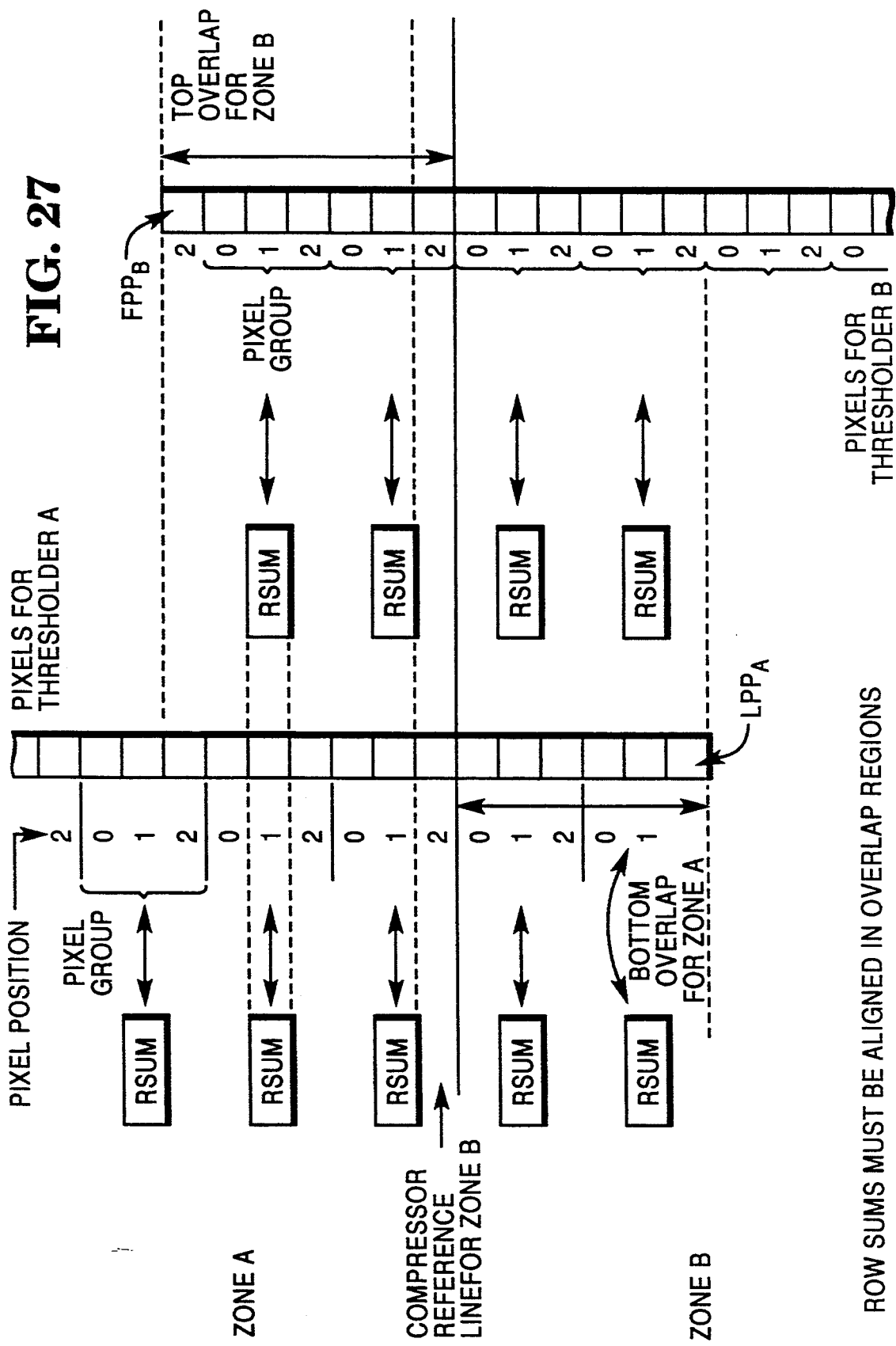
FIG. 27 is a schematic diagram showing the assignment of pixel groups and row sums associated with the second embodiment shown in FIG. 26.

Having described, generally, the second embodiment 33 shown in FIG. 26, it appears useful to discuss it in more detail. In this regard, FIG. 27 is a schematic diagram which shows how pixels are grouped into groups of three pixels per group so as to minimize the amount of processing of data within an examining window. For example, with the first embodiment shown in FIG. 7, there is a row sum calculated for each row which exists within the examining window 66. With the embodiment 33 shown in FIG. 26, there is a row sum calculated for groups of three pixels as shown in FIG. 27. In other words, within a window, there would be a row sum for the pixels marked "1" within a group of pixels. Notice that the row sum is taken for the pixel which is marked #1 for the pixels in the group of three pixels. The significance of this is that, basically, an average value of one third of the row sums within an examining window is used for thresholding, whereas in the first embodiment, all the row sums within an examining window were used for the thresholding process. Naturally, there would be more than one row sum marked "0", marked "1", and marked "2" (FIG. 27) in an examining window in the second embodiment being described, although the number is dependent upon a particular application.

Figures 28, 29:
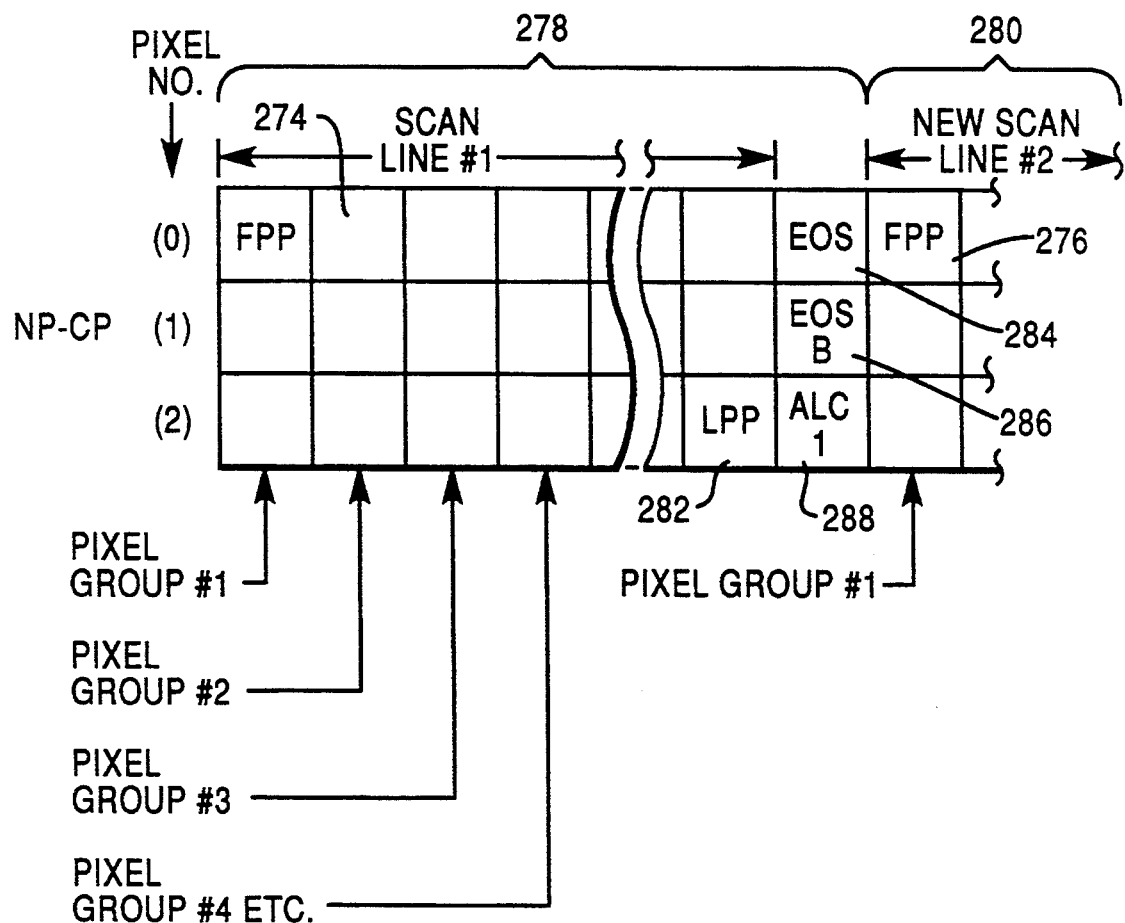
FIG. 28 is a schematic diagram showing the arrangement of memory data associated with the second embodiment shown in FIG. 26.
FIG. 29 is a look-up table used with the second embodiment shown in FIG. 26.

The groups of pixels for a particular scan line are placed in a memory (like the NP-CP Pixel Queue #1 shown in FIG. 8A) with the arrangement shown in FIG. 28. In the embodiment described, the pixels are arranged in groups of three, with the pixel numbers being shown in FIG. 28 as "0", "1", and "2". The first pixel position is marked as "FPP" and "0", and the fourth pixel in the scan line is marked as 274; it would also be marked as pixel "0" in Pixel Group #2 as for as the group of three pixels is concerned.

Because the number of pixels in a channel can vary as discussed in relation to splitter 33 (FIG. 26), there are certain "overhead" pixels which are included in each scan line. These are included so as to enable the first pixel for a new scan line #2 to start at the same position; this is illustrated by FPP which is also marked as 276 (FIG. 28). The FPP (marked 276) is part of Pixel Group #1 for a new or second scan line #2 in the example being described. The memory arrangement shown in FIG. 28 represents a circular memory. That which is shown in bracket 278 represents data associated with the first scan #1, and that data shown in bracket 280 is associated with scan line #2. The number of scan lines to be included in the memory is dependent upon the size of the examining window; in the embodiment described, there would be 25 scan lines included therein.

Returning to the overhead pixels being discussed, the pixel LPP (also marked 282) is the last pixel position for the scan line #1. The pixels marked 284, 286, and 288, also marked EOS, EOS B, and ALC 1, respectively, are inserted as "dummy" pixels to enable the first pixel position (FPP) to always occur at the same position with the group of three pixels. It is not necessary that all channels always start out as pixel number "0" within the group of three pixels; however, for any channel, it is necessary that all the scan lines within that channel start out in the same pixel position within the group of three pixels. Because the last pixel can start in any one of the three positions within the group of three pixels, there are up to four pixels which may be added. Of the added pixels, there is always an End Of Scan (EOS) pixel, always an End Of Scan B (EOS B) pixel, and 0, 1, or 2 Alignment pixels (ALC 1, or ALC 2). The EOS pixel and the EOS B pixel can be referred to as EOS overhead pixels, and the Alignment pixels ALC 1 and ALC 2 are referred to as Alignment overhead pixels. The group of four pixels (EOS, EOS B, ALC 1, and ALC 2) may be referred to, generally, as overhead pixels. FIG. 29 shows a look-up table 290 which is used for determining the number of alignment pixels to be added for a particular channel, when the number of pixels in a channel varies as discussed in relation to FIG. 26. For example, considering the arrangement shown in FIG. 28, the first pixel position (FPP) is Pixel #0 in the group of three pixels; this 0 is used to select the vertical column in FIG. 29. In FIG. 28, the last pixel (LPP), which is also marked 282, occurs at Pixel Position #2; this 2 is used as the address for LPP in FIG. 29. Combining the FPP and LPP addresses of "0" and "2", respectively, in the example being described, the output of look-up table 290 is "1". This means that one alignment pixel, shown as pixel 288 in FIG. 28, completes the Pixel Group of three pixels to enable the FPP (276) to start at Pixel Position 0 for the new scan line #2 shown in FIG. 28.

Figure 30:
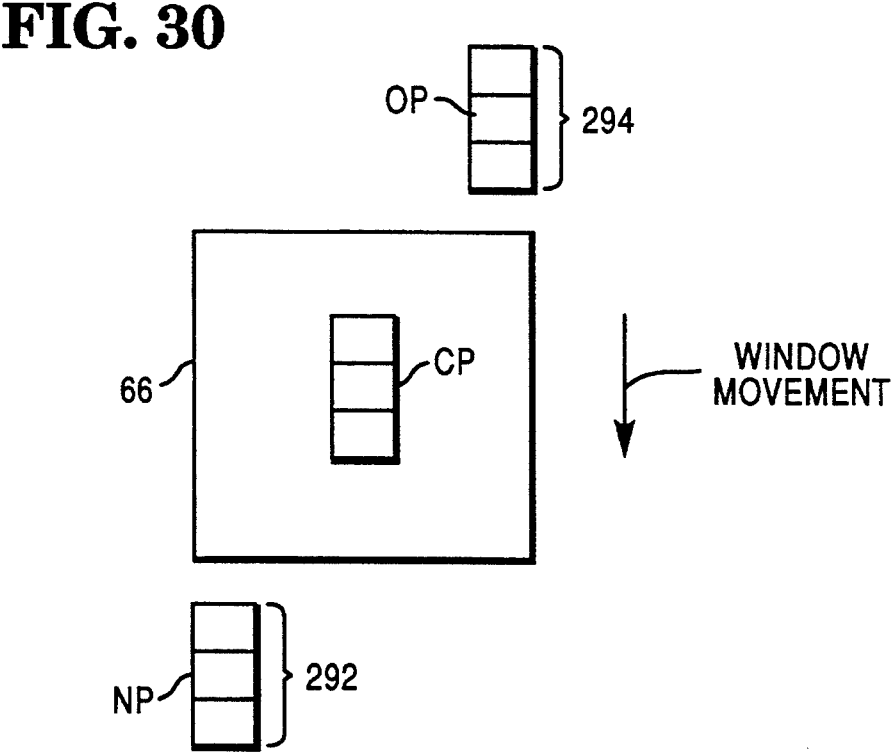
FIG. 30 is a schematic diagram showing different pixel groups associated with the second embodiment shown in FIG. 26.

Continuing with the processing of a group of three pixels, FIG. 30 is a schematic diagram which shows the relationship of a new pixel (NP), a center pixel (CP), and an old pixel (OP) as they relate to the window, like 66 in FIG. 7. The group of three pixels which are to be thresholded are centered within the window 66. A point to be made here is that each of the pixels in the group of three within the window 66 will be thresholded; however, it is only the middle pixel within the group of three pixels which is used to contribute to row sum data. In other words, for the group of three pixels in bracket 292, only the middle pixel marked NP will be used to update (add to) the new row sums, and correspondingly, only the middle pixel marked OP of the group of three included in bracket 294 will be used to update (delete from) the old row sums.

Figure 31:
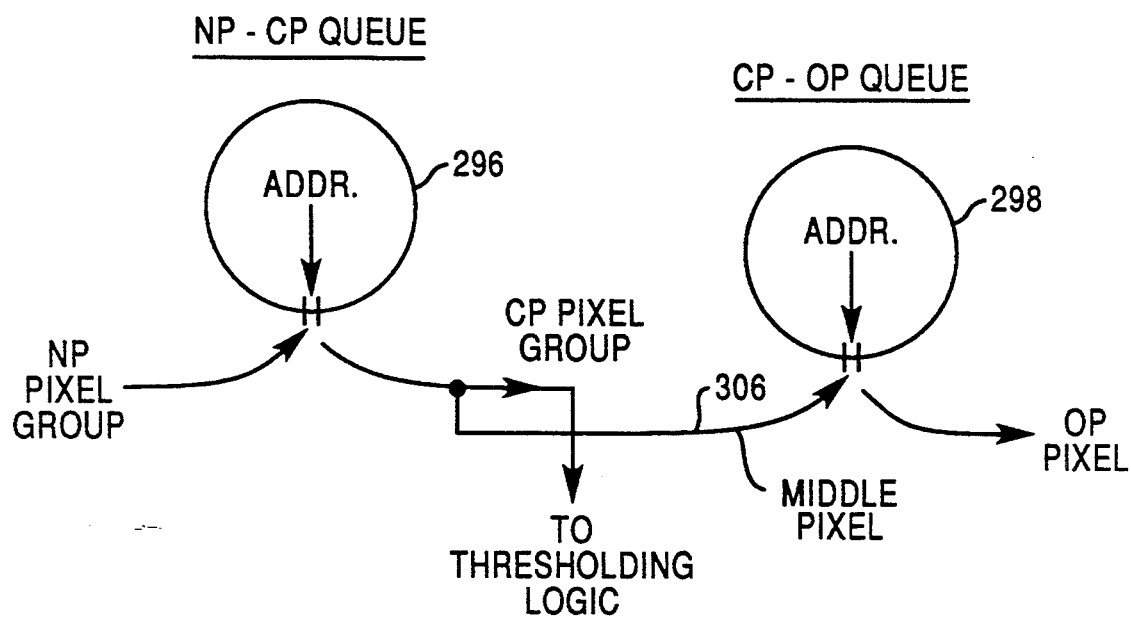
FIG. 31 is a schematic diagram showing certain pixel queues associated with the second embodiment.

FIG. 31 shows a new pixel-center pixel (NP-CP) queue 296 and a center pixel-old pixel (CP-OP) queue 298 which are used in the second embodiment of the splitter 33. The NP-CP queue 296 stores three pixels per group, as shown in FIG. 32, while the CP-OP queue 298 stores the center pixels which eventually become the old pixels as the pixels progress through the window movement shown schematically in FIG. 30. A feature, here, is that one address pointer can be used to point to the desired pixels in each queue as shown in FIG. 32 by the common number of addresses between the queues 296 and 298.

Figure 33A:
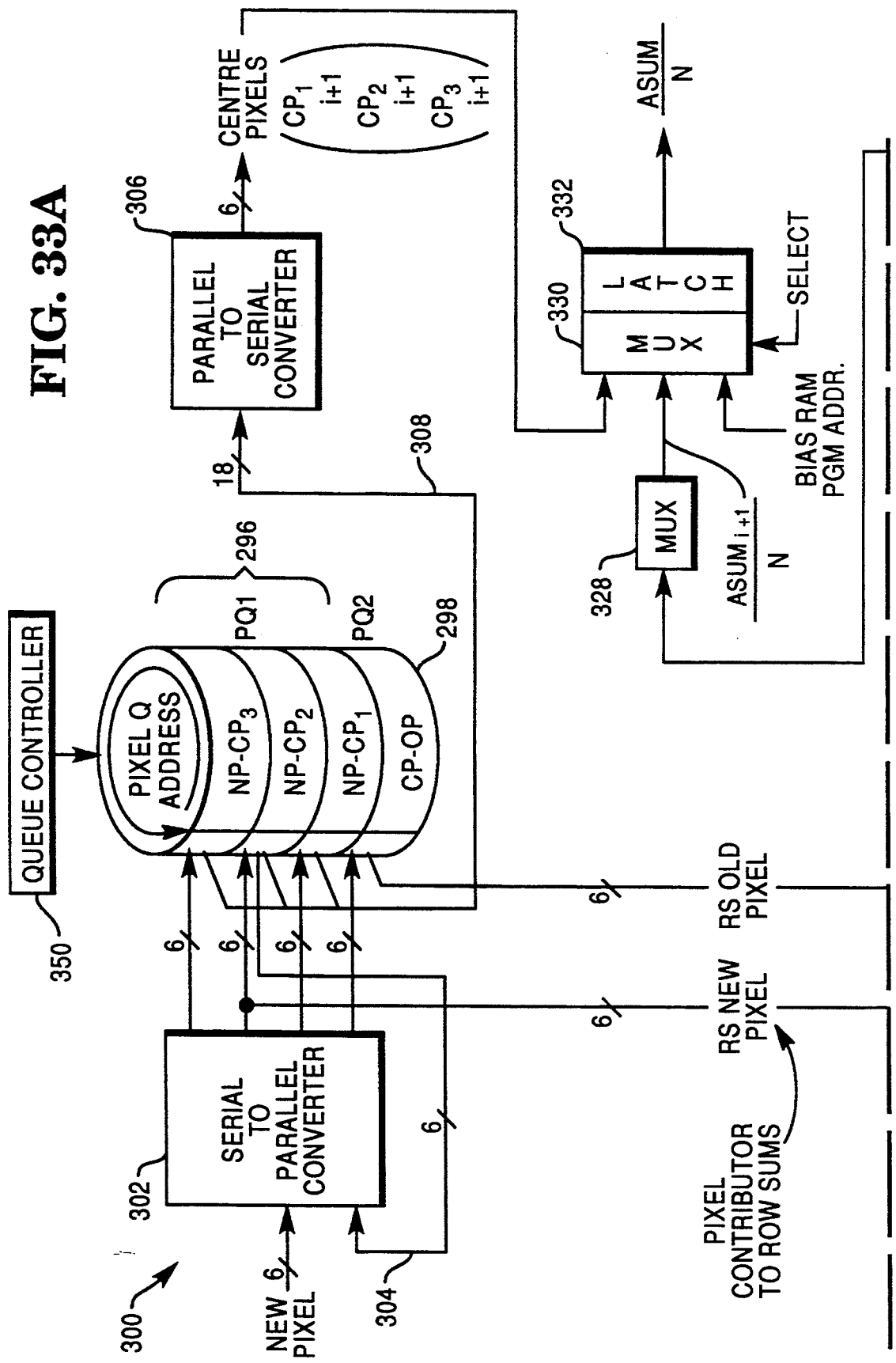
Figure 33B:
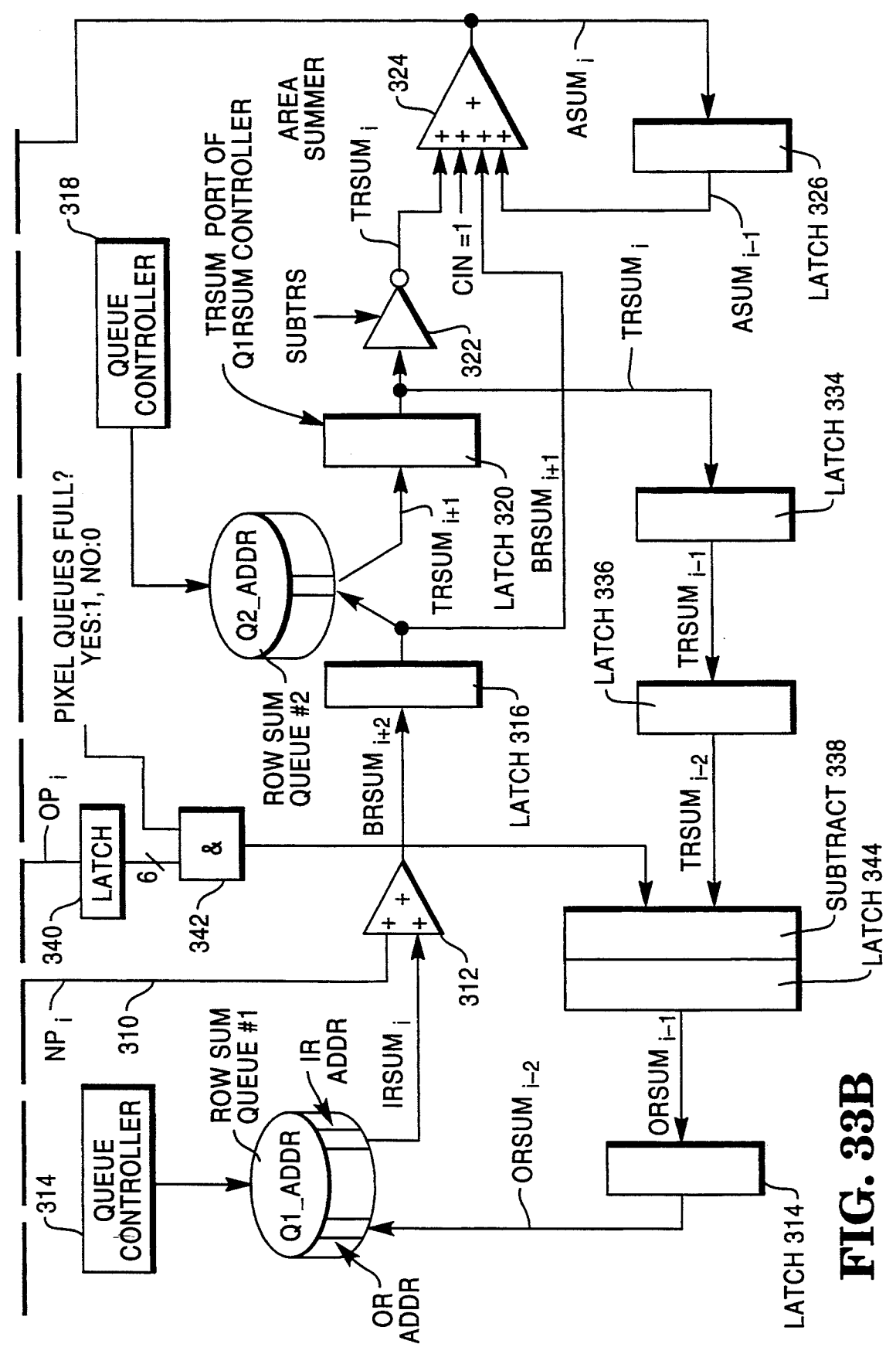

The NP-CP queue 296 and the CP-OP queue 298 are shown schematically in FIGS. 33A and 33B, taken together, which show a circuit 300 for performing certain manipulations associated with the window 66. The manipulations are similar to those discussed in relation to FIG. 13, for example, except row sums were calculated for each row within the window for the embodiment shown in FIG. 13, whereas, row sums are calculated for every third row in the circuit 300.

As seen in FIG. 33A, each new pixel coming into the circuit 300 enters a serial to parallel converter 302 which receives the pixels or scan line data. The converter groups the incoming pixels in groups of threes are positioned in the NP-CP 296 Queue shown in FIG. 31 and shown in more detail in FIG. 33A to include $NP\text{-}CP_1$, $NP\text{-}CP_2$, and $NP\text{-}CP_3$ which correspond to pixels positions 0, 1, and 2 (FIG. 32), and the CP-OP queue 298 is also shown in FIG. 33A. The middle or center pixel from each group of three is taken from the $NP\text{-}CP_2$ queue and routed to the CP-OP over a six bit bus 304. At this point in the processing, the pixels are gray scale values which are six bits long in the embodiment described. After the incoming pixels are stored in the individual sections of the NP-CP queue (FIG. 33A), they eventually come out and are fed into a parallel to serial converter 306 over an 18 bit bus 308. These pixels which come out of the converter 396 represent the group of three pixels which are to be thresholded as center pixels $CP_{1\ i+1}$, $CP_{2\ i+1}$, and $CP_{3\ i+1}$; this is analogous to the three center pixels marked CP in FIG. 30. To repeat, while each of these three pixels CP is thresholded individually, the row sums for the window 66 in FIG. 30 are derived from the pixel position #1 shown in FIG. 32. In other words, there are one third of the row sums included in the examining window 66 (FIG. 30) of the thresholder compared to the thresholder used with the examining window shown in FIG. 7.

Continuing with a discussion of FIGS. 33A and 33B, the techniques employed in circuit 300 are similar to those employed with regard to the discussion of calculation of row sums included in the examining window 66 shown in FIG. 7 and the circuit shown in FIG. 13. In this regard, the new pixel $NP_i$ coming from the $NP\text{-}CP_2$ of queue 296 over a bus 310 is fed into one input of a summer 312. The circuit 300 also includes a queue controller 314 which controls the activities associated with the Row Sum Queue #1. The Row Sum Queue #1 receives the old row sum $ORSUM_{i-2}$ from a latch 314 and outputs an input row sum $IRSUM_i$ from the Row Sum Queue #1. To repeat, every third row sum is utilized in the circuit 300, whereas, every row sum is utilized with the window arrangement shown in FIG. 7; however, the processing techniques are essentially the same. In this regard, because of the "wrap around" movement of the window 66, as discussed in relation to FIG. 7, the old row sum $ORSUM_i$ shown above the window 66, will become the input row sum $IRSUM_i$ shown at the bottom of the window 66 when the window is indexed one scan line to the left as viewed in FIG. 7. The Row Sum Queue #1 in FIG. 33B is like a circular memory in that the spacing of data therein is arranged so that as an old row sum enters Row Sum Queue #1, the appropriate input row sum will leave this Queue. The spacing is consistent with that discussed in relation to FIG. 30.

Figure 34:
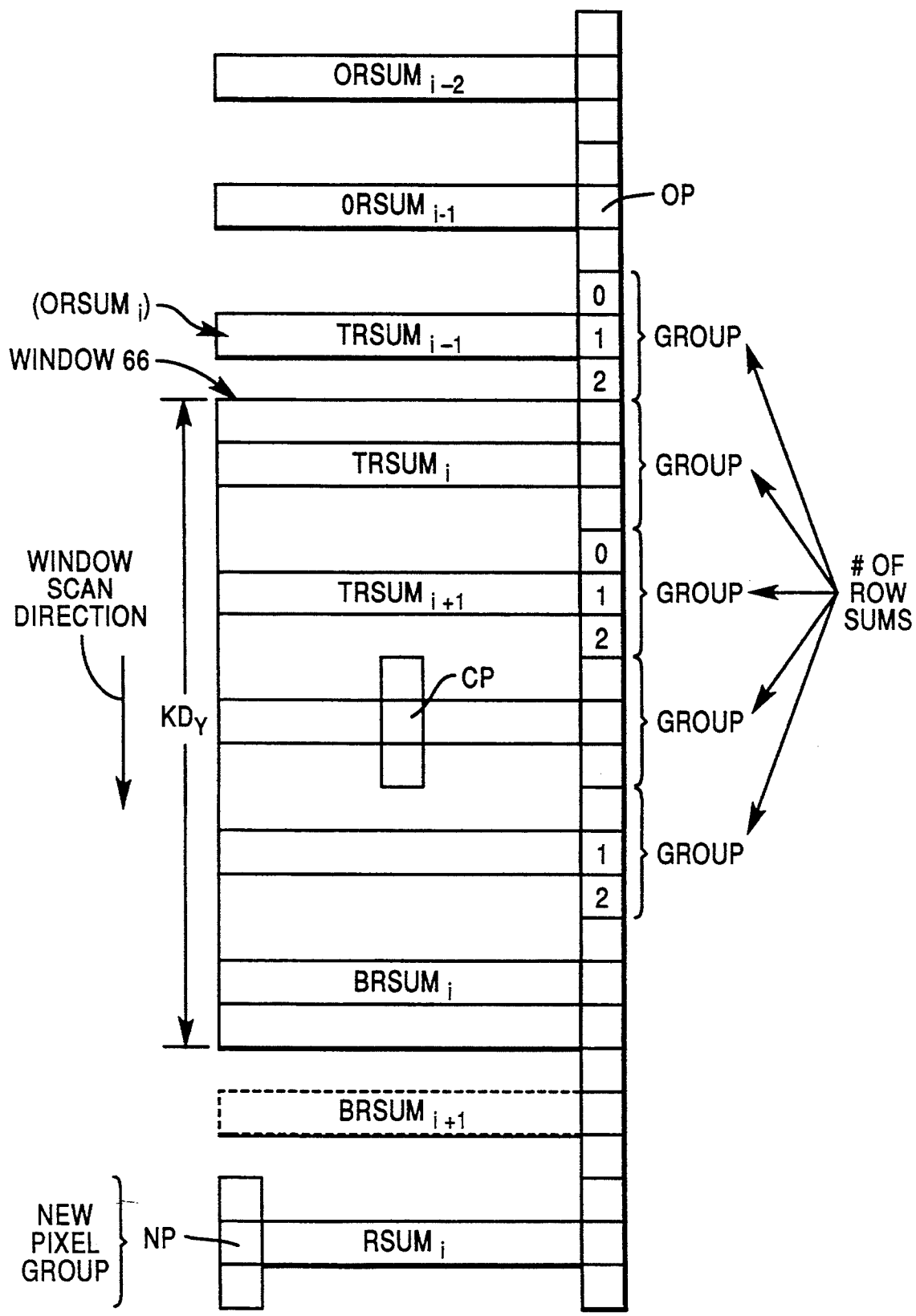
FIG. 34 is a schematic diagram showing how certain row sums are manipulated in the second embodiment shown in FIG. 26.

The new pixel $NP_i$ and the input row sum $IRSUM_i$ coming from the Row Sum Queue #1 are added by the summer 312 to generate a bottom row sum $BRSUM_{i+2}$ which is fed into a latch 316; this is analogous to the new pixel (NP) being added to the input row sum $IRSUM_i$ shown in FIG. 7. FIG. 34 shows an arrangement to reflect the various row sums generated with the circuit 300 shown in FIGS. 33A and 33B. From the latch 316, the bottom row sum $BRSUM_{i+1}$ is stored in a Row Sum Queue #2 which has a queue controller 318 controlling it. As the bottom row sums enter the window 66 and the Row Sum Queue #2, they eventually become top row sums as they emerge from the Queue #2. Again, the spacing and addressing techniques associated with the Row Sum Queue #2 are such as to follow the pattern discussed in relation to the arrangement shown in FIG. 30.

A new area sum for every third row in the window 66 (FIG. 34) is calculated as follows with regard to the circuit 300. From FIG. 34, as a bottom row sum enters or is added to the window 66 (with the window 66 moving in the direction shown) a top row sum leaves or is subtracted from the window 66. In this regard, a top row sum $TRSUM_{i+1}$ coming from the Row Sum Queue #2 is momentarily stored in a latch 320, is inverted by an inverter 322 to provide $\overline{TRSUM_i}$ (read as a "Bar" or inverted value), and is fed into one input of an area summer 324 to be subtracted out of the area sum. The bottom row sum $BRSUM_{i+1}$, coming from the latch 316, is also fed into the area summer 324 to be added to the area sum of the window 66. The output of the area summer 324 is area sum $ASUM_i$ which is fed into a latch 326, and the output ($ASUM_{i-1}$) from this latch is fed back into the area summer 324 with a delay. There are certain pipeline delays in the circuit 300 which are not shown in FIGS. 33A and 33B; however, they are similar in structure and function to those shown in FIG. 13 for the circuit 72. The last input to the area summer 324, $C_{in} = 1$, is needed to perform 2's complement subtraction. At this point in the processing, the area sum represents the sum of the gray scale values for every third row of pixels in the window 66 in the embodiment being described, and this area sum ($ASUM_i$) is then fed through a multiplexer 328 into a second multiplexer 330 and latch 332. The second multiplexer 330 can be switched between the PASSING, the CENTER PIXELS, and the $$\frac{ASUM\ i + 1}{N}$$

values (as in a normal thresholding operation) or a program address value (used in programming the look-up table 58-1). A bias RAM signal into the multiplexer 330 is used to select the area sum and center pixel values during normal thresholding, and a Programming Address (PGM ADDR.) value is used to select a programming address value when the look-up table 58-1 (FIG. 6) is programmed. The area sum and center pixels from the latch 332 are then sent to the look-up table where the associated center pixels are thresholded as discussed in relation to FIG. 6. There is a difference with the embodiment associated with FIG. 7 and FIGS. 33A and 33B in that the same area sum within the window 66 is used for thresholding the three pixels in the center group shown in FIG. 34. This center group (FIG. 34) of three pixels is shown as pixels $CP_{i\ i+1}$, $CP_{2\ i+1}$, and $CP_{3\ i+1}$ in FIG. 33A.

Some additional points need clarification with regard to FIG. 33A and 33B. As previously stated, that which is referred to as a bottom row sum in FIG. 34 passes through the window 66, becomes a top row sum, becomes an old row sum as the window 66 moves in the direction shown in FIG. 34, and eventually becomes a bottom row sum as the window again moves to the top of the scan line and the scanning progresses from right to left as viewed in this figure. In this regard, the output ($TRSUM_i$) of the latch 320 is routed to a latch 334 whose output becomes $TRSUM_{i-1}$, with this output being fed into a latch 336. The output of the latch 336 is $TRSUM_{i-2}$ which is fed into a subtractor 338. The function of the subtractor 338 is to subtract the old pixel from the row sum ($TRSUM_{i-2}$ (FIG. 34)) which was used in generating the area sum within the window 66. The old pixel is the middle pixel (marked (1)) from the old pixel group shown in FIG. 34. This old pixel $OP_i$ comes from the CP-OP Queue 298 through a latch 340 and six AND gates shown collectively as AND gate 342 to the subtractor 338. The AND gate 342 permits the data to pass therethrough only when the Pixel Queues are initialized as determined by the associated controller 350 (FIG. 33A); this is required for queue initialization to zero values. The output ($ORSUM_i$ shown in FIG. 34) of the subtractor 338 has the old pixel $OP_i$ deleted therefrom, and after being stepped through a latch 344, it becomes $ORSUM_{i-1}$ which is stored in latch 314. The latches, like 334, 336, and 314, for example, are used to provide pipeline delays to get the proper sequencing and timing of data being moved in the circuit 300.

A point to be made with the row sums shown in FIG. 34 is that the figure is a schematic representation, and that the row sums shown therein represent every third row in the example being described. In addition, the address range of the pixel queues, like Queues #1 and #2 shown in FIG. 33A is equal to the number of pixel groups (of three) between the NP pixel group and the CP pixel group (as discussed in relation to FIGS. 30, 32, and 34). This is also equivalent to the number of middle pixels between the CP and the OP pixels in Queue #2 (298) shown in FIG. 33A. As previously stated, the center pixels and the area sum shown in the top right hand corner of FIG. 33A are forwarded to the look-up tables (FIG. 6) for thresholding the six bit gray scale values of the center pixels to binary 1's or 0's as previously discussed.

CONFIGURATION PROCESS

Another portion of this system 10 relates to a configuration process 346 for configuring the system 10. The steps for the configuration process are generally as follows:

1. Determine the input parameters for a particular application of the system 10.
2. Determine the number of processing channels which are required for the system 10.
3. Determine the channel thresholder height for each of the channels in the system 10.
4. Compute the Start and End pixel numbers for each channel.
5. Compute the first pixel position (FPP), last pixel position (LPP), and alignment values (ALC) for each channel.
6. Compute the memory queue lengths for each channel. This relates to the pixel queues and row sum queues.
7. Compute the area sum shift divider value.
8. Compute the bias curve scaling factor as discussed in relation to FIG. 6.
9. Compute the overlap pixel removal values.
10. Using the Start Scan Pixel Numbers (SSPN) and the End Scan Pixel Numbers (ESPN), compute the start or First Splitter Pixel Word (FSPW) and the end or Last Splitter Pixel Word (LSPW) numbers.
11. Compute the pixel position of the first pixel in the start or First Splitter Pixel Word (FSPW).
12. Compute the pixel position of the last pixel in the end or Last Splitter Pixel Word (LSPW).
13. Compute the number of splitter pixel words to be reserved for each channel.

With regard to Step 1 of the Configuration Process 346, the input parameters relate to an application pixel rate which is determined by:

(a) Document track speed (inches/second);
(b) Scanline resolution (scanlines/inch);
(c) Maximum document height (inches); and
(d) Pixel resolution (pixels/inch).

As an example, suppose that a particular application requires a document to be imaged and the image data processed by the system 10 with the following parameters:

(a) Camera resolution equals 200 pixels/inch in X and Y directions.
(b) Document transport rate equals 300 inches per second.
(c) Document size, as far as the scan line is concerned is 5 inches. Based on the above parameters, the application pixel $$\text{rate } (APR) = 200 \times 300 \times 5 \times 200$$
$$= 60 \times 10^6 \text{ pixels/second.}$$

With regard to Step 2 of the Configuration Process 346, the number of processing channels is determined as follows. Because the system 10 uses overlaps in the processing of a scan line of data, the maximum effective pixel rate or the $$\text{Empirical Rate} = N * \text{Raw Pixel Rate/Ch.} * \frac{[\text{Doc. Ht.} * \text{Pixel Resolution}]}{(\text{Doc. Ht.} * \text{Pix. Res.}) + (N - 1)(KDy + 2) + N * 4}.$$

Some definitions are in order. The Raw Pixel Rate/Ch. is the maximum pixel rate that a channel can receive data. It is generally best to make sure that the Empirical Rate is greater than or equal to the Application Rate (APR). Solving the above equation for "N" gives the number of channels required for the particular application. With a kernel or window size, (like window 66) of 25 pixels in both X and Y directions, and with the parameters discussed in relation to Step 1 of the Configuration Process 346, the number of channels works out to be four.

Figure 35:
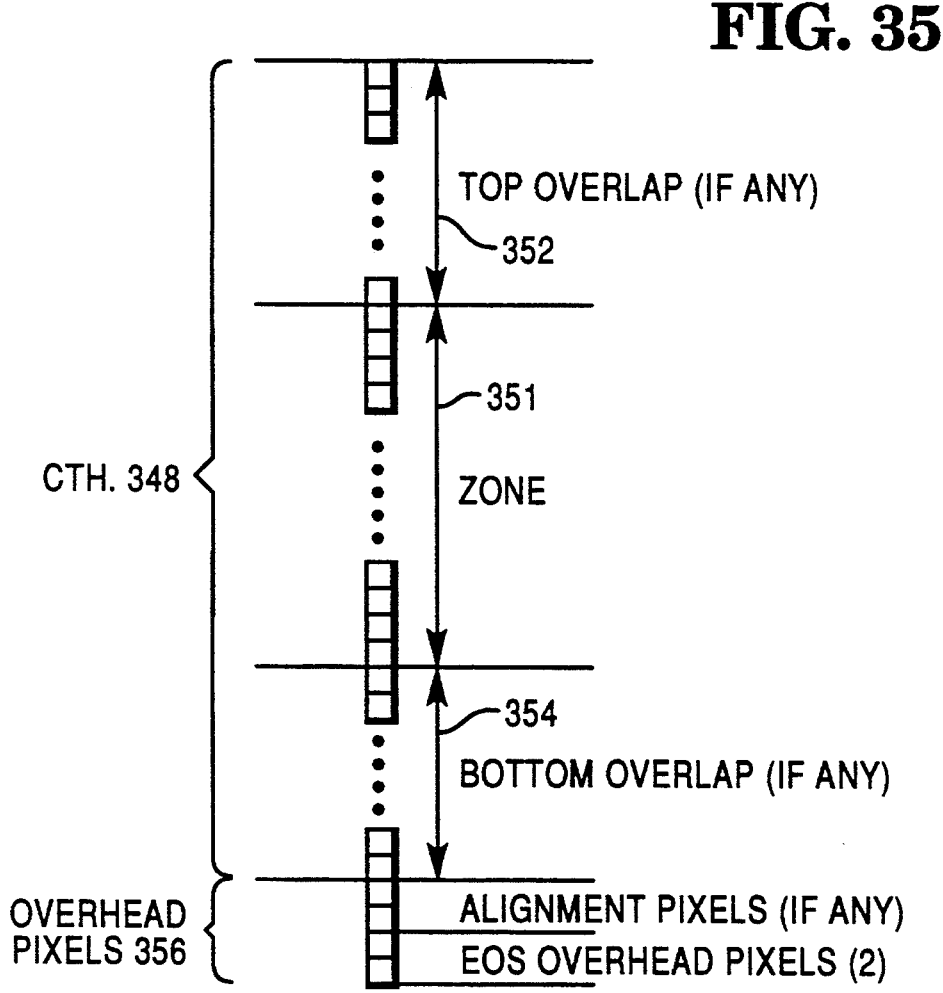
FIG. 35 is a schematic diagram showing what is included in a channel thresholder height.

With regard to Step 3 of the Configuration Process 346, the channel thresholder height for each channel is determined as follows. As a general statement, the channel thresholder height represents all the scanning line pixels that are assigned to a channel. In this regard, FIG. 35 shows the channel thresholder height 348 which is made up of a zone 351, a top overlap 352 (if any), and a bottom overlap 354 (if any). Bracket 356 shows the EOS Overhead and Alignment pixels inserted at the end of every scan line by the associated splitter.

With regard to the top overlap, the following equations apply:

Top overlap = 0 (for the first channel), and

Top overlap = $\frac{(KDY + 1)}{2} + 1$ (for all other channels).

Bottom overlap = 0 (for the last channel), and $= \frac{(KDY - 1)}{2} + 1$ (for all other channels).

These equations shown directly above relate to the second embodiment of the splitter 33 as shown in FIG. 6, for example. Each channel, like those shown in FIG. 26, receives two EOS overhead pixels and up to two Alignment pixels (as previously defined) from the splitter 33 for each and every scan line. Each channel uses the overhead pixels for memory alignment as discussed in relation to FIG. 28, for example. The overhead pixels being discussed show up in the equation for Effective Pixel Rate as follows:

$$\text{Effective Pixel Rate} = \frac{N * \text{Channel Pixel Rate}}{1 + \frac{(N-1)(KDY+2) + N*4}{\text{Frame Height}}}$$

Frame Height = Document Height * Pixel Resolution.

(Frame Height is usually measured in pixels. The "4" in the above equation relates to the 4 overhead pixels mentioned. The above equation represents the worst case scenario with regard to throughput; in other words, if the overhead pixels are fewer than 4 in number, the effective pixel rate will increase, slightly, and provide some margin relative to throughput for the particular application.

With regard to Step 4 of the Configuration Process 346, computing the Start and End pixel numbers for each channel is effected as follows. For the sake of simplicity, assume that the scanning line 14 (FIG. 1) is to have 1,000 pixels therein. Assume, also, that for a particular rate of processing, four channels were required. Assume, also, that the first pixel for channel #0 is a "0". Therefore, the Start Scanline Pixel Number (SSPN) is 0. It follows that: End Scanline Pixel Number $(ESPN_0) = SSPN_0 + CTH_0 - 1$. From what has been discussed earlier, the Channel Thresholder Height for Channel 0 ($CTH_0$), when $KDy = 25$, is given as:

$$CTH_0 = Trunc \frac{[\text{Frame Ht.} + (KD_y + 1) + 2]}{4} + \frac{KD_y - 1}{2} + 1$$

$$= Trunc \frac{[1000 + (26) + 2]}{4} + \frac{24}{2} + 1$$

$$= 270 \text{ pixels}.$$

Therefore, $ESPN_0$ (from above) $= 270 - 1 =$ Pixel 269.

Figure 36:
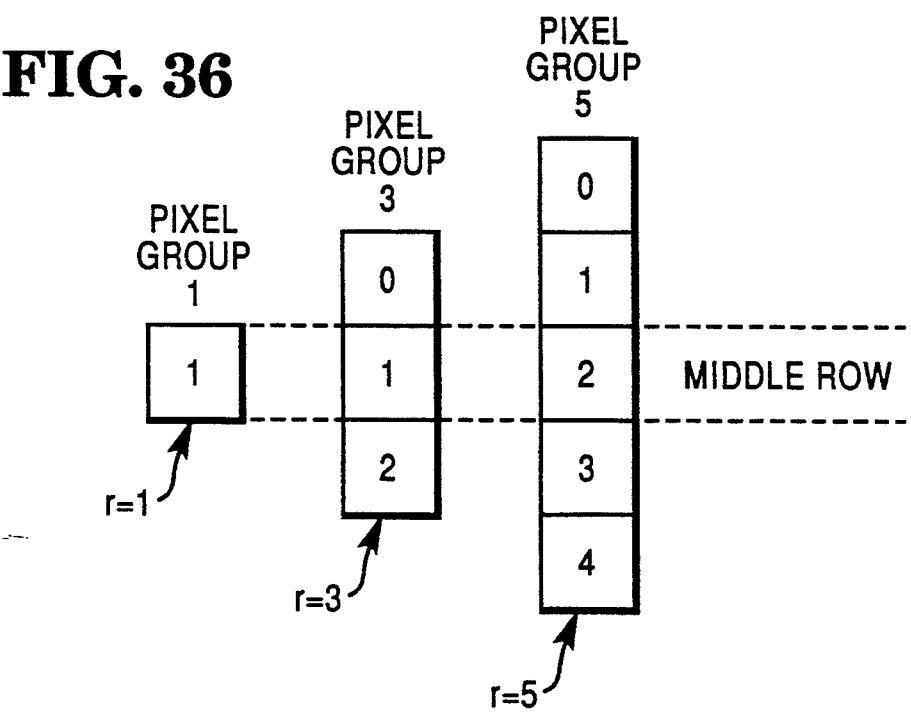
FIG. 36 is a schematic diagram showing various pixel groups with a reduction factor of "r"

In the example being described in the previous paragraph, it is necessary to find out the pixel positions of SSPN and ESPN within their groups of pixels as discussed in relation to FIGS. 27 and 28, for example. The example being described relates to a modulus (3) which means that there are three pixels within a group of pixels; this relates to calculating a row sum for every third row of pixels within an examining window. To generalize the idea, FIG. 36 shows Pixel Group 1 with a reduction factor of one (r=1); it shows Pixel Group 3 with a reduction factor of three (r=3); and it shows Pixel Group 5 with a reduction factor of five (r=5). As previously discussed, the first embodiment shown in FIG. 7, uses every row sum for the row sums within the window 66. The second embodiment of the splitter 33 and thresholder, discussed in relation to FIGS. 34 and 37, for example, uses every third row for the sums within the window 66. Pixel Group 5 is designed to use every fifth row for the row sums within the window 66. An advantage of using less than all the row sums within an examining window 66 is that the processing rate becomes 1/rth of the rate of Pixel Group 1.

Continuing with finding the pixel positions within their respective Pixel Group 3 (FIG. 36), the following is used:

FPP=(SSPN) MOD (3)=0; and
LPP=(ESPN) MOD (3)=2.

For both of the above situations, the alignment pixels are (ALC)=1 as determined by the Look-Up Table 290 shown in FIG. 29.

With regard to Step #5 of the Configuration Process 346 which relates to computing the first pixel position, the last pixel position, and the alignment values for each channel, the following comments apply. FIG. 37 is a Look-Up Table showing Load Distribution for a number of channels required for a particular application. The number (N) of channels required for a particular application is shown across the top of the table, and the channel number is shown along the left side thereof. FIG. 38 shows how the channel image height (CIH) for each of the channels relate to the frame height (F.H.), with the particular application shown being for four channels. The values shown in Look-Up Table of FIG. 37 are truncated to a whole number, so it is possible that after the loading is distributed, the revised frame height for all the channels may not agree exactly with the number of pixels in the scanning line. On a worst case basis, one pixel will be lost at the very end of the frame height.

Figure 39:
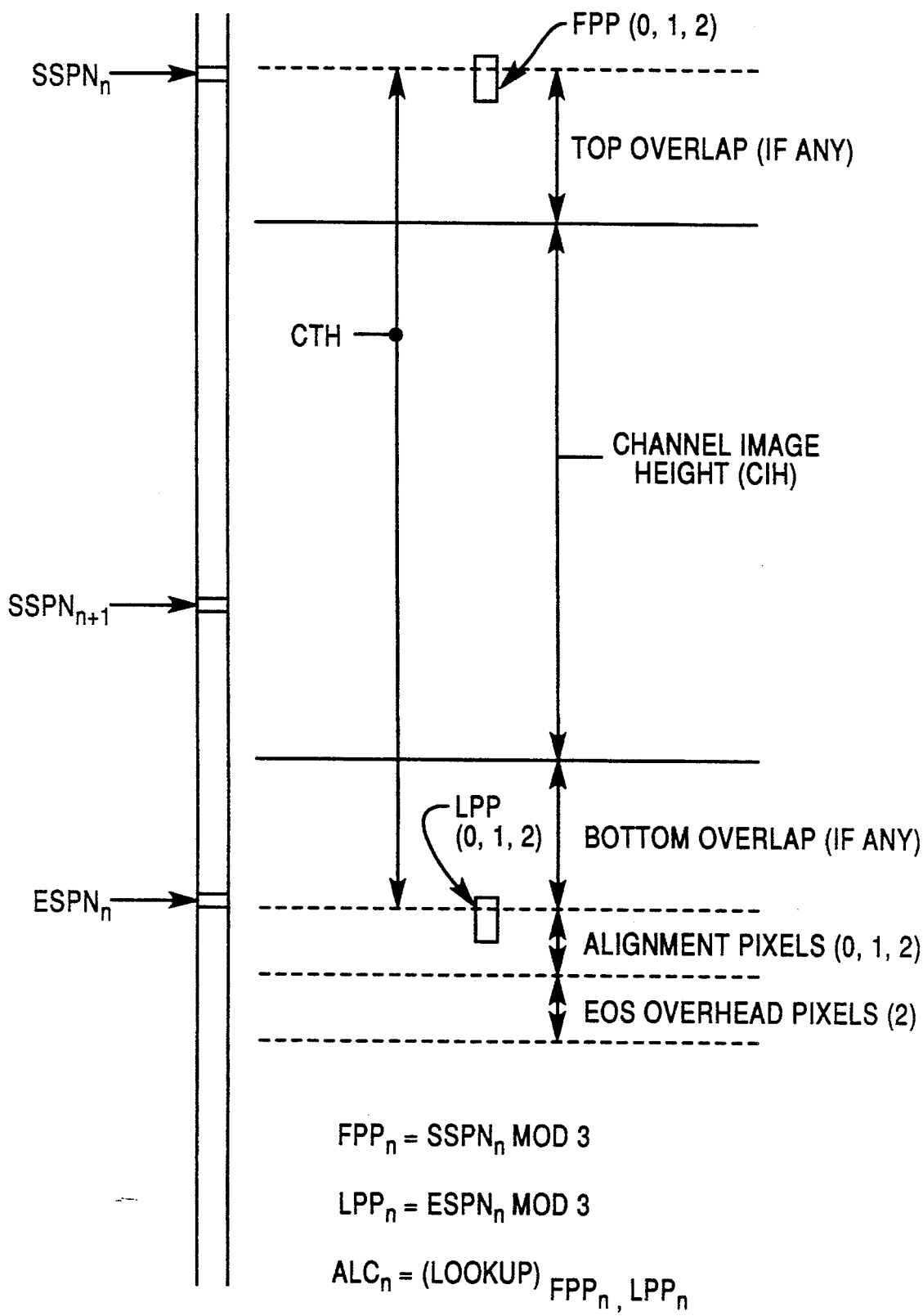
FIG. 39 is a schematic diagram showing how first pixel positions and last pixel positions are determined for each channel.

FIG. 39 is a schematic diagram similar to FIG. 35, with FIG. 39 showing the relationship first pixel position and last pixel position within the channel thresholder height (CTH). Once the CTHs are known for each of the channels, the "start" (SSPN) and "end" (ESPN) scanline pixels assigned to each channel are given by the following formulas:

Channel #0: $SSPN_0 = 0$.

$ESPN_0 = SSPN_0 + (CTH_0 - 1)$.

Channel #1: $SSPN_1 = ESPN_0 - (KDY + 1)$.

$ESPN_1 = SSPN_1 + (CTH_1 - 1)$.

Channel #n: $SSPN_n = ESPN_{n-1} - (KDY + 1)$.

Channel #n: $ESPN_n = SSPN_n + (CTH_n - 1)$.

The values shown above represent the start and end limits of each channel. Now, the FPP, LPP, and Alignment pixels can be calculated from the equations shown on the bottom of FIG. 39.

In the example shown in FIG. 39, the first pixel position (FPP) at the top of the channel is located at pixel position #"1" in the Pixel Group, and the last pixel position at the bottom of the channel is located at pixel position #0 in the associated Pixel Group. In the example described, because the FPP is located at pixel position #1 and the LPP is located at position #0, the number a alignment pixels added is "1" as determined from the Look-Up Table 290 in FIG. 29.

With regard to Step 6 of the CONFIGURATION PROCESS, the memory queue lengths for each of the channels is determined in the following manner. The number of pixel groups or addresses in the NP-CP Queue 296 and the CP-OP Queue 298 shown in FIG. 33A, for example, is given by the following equation:

$$PQC = \frac{(CTH + ALC + 2)}{3*} \frac{KDY - 1}{2} + 4 + TRUNC \frac{[KDY - 13]}{6}.$$

With regard to the above equation:

PQC=Pixel Group Addresses,

The "3" in the denominator relates to the pixel group size,

The "13" in the numerator relates to a minimum window or kernel size available, and The "6" in the denominator relates to 2 * the pixel group size.

Figure 40:
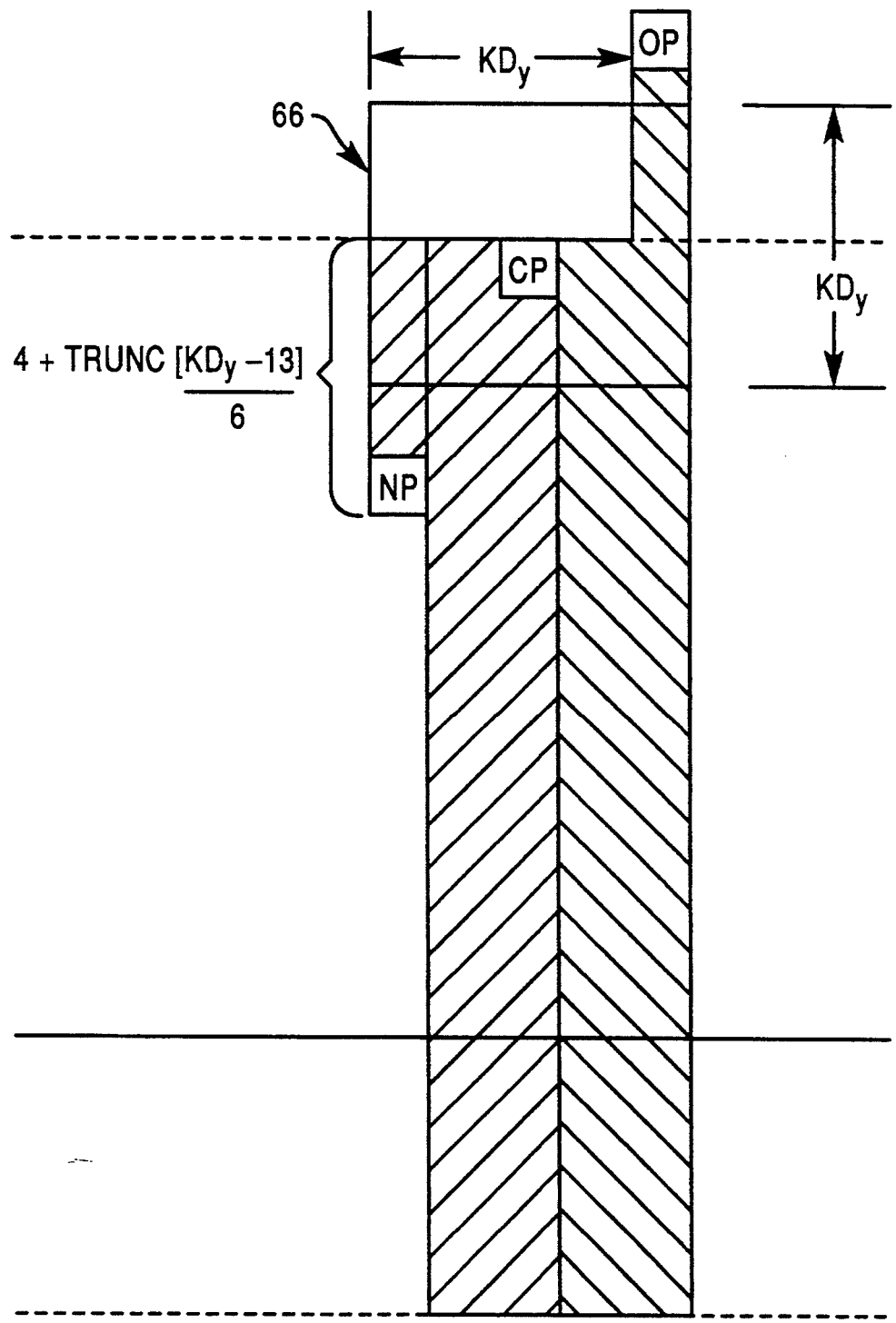
FIG. 40 is a schematic diagram showing how certain memory queues are established.

The relationship of the new pixel (NP), the center pixel (CP), and the old pixel (OP) discussed in this paragraph are shown in FIG. 40. Because the window 66 is square in the embodiment described, the horizontal dimension of the window 66 (in the x direction) is equal to the window dimension $KD_y$ in the y direction.

The memory queue length of the output row sum—input row sum queue shown as Row Sum Queue #1 in FIG. 33B is given by the following equation:

$$RS\ Q1 = \frac{CTH + ALC + 2}{3}.$$

With regard to the above equation, "3"=pixel group size, and the "2"=two EOS overhead pixels (EOS, EOS B).

$$RS\ Q2 = 5 + 2 * TRUNC \frac{[KDY - 13]}{6}.$$

With regard to the above equation:

The "5"=the minimum number of row sums when KDY=13,

The "2" represents the window or kernel increment step,

The "13" represents the minimum kernel size available, and

The "6"=2 * Pixel Size Group.

The term TRUNC means truncation and applies to the whole term which follows.

Figure 41:
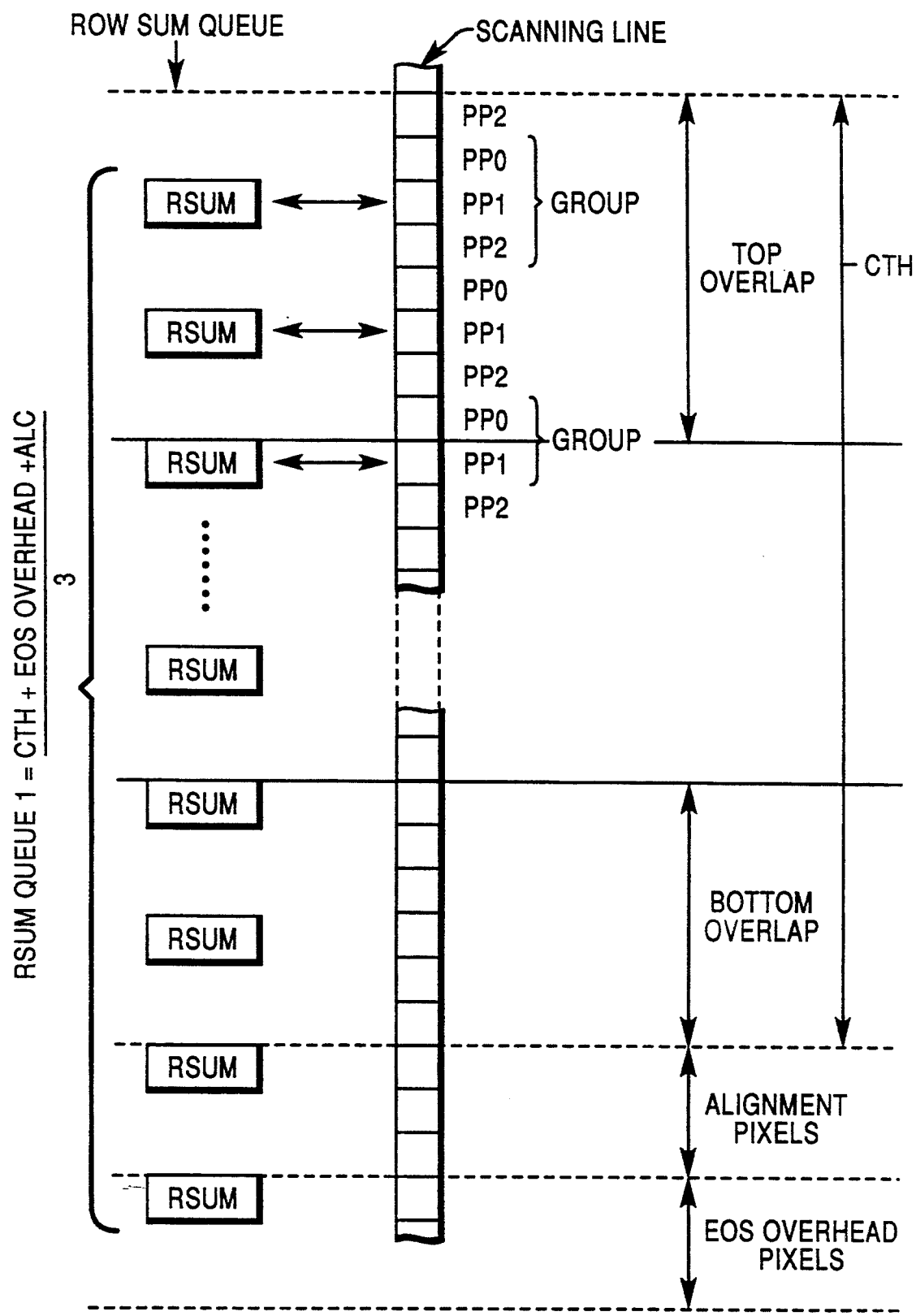
FIG. 41 is a schematic diagram showing a row sum queue is established.

FIG. 41 is a schematic diagram showing the layout of the row sums as they relate to the equation RS Q1 shown directly above. This is also for the embodiment in which every third row is calculated when thresholding each of the pixels in a scan line. The pixels within the scan line are also numbered with regard to their positions within the group of pixels. The number of EOS overhead pixels is always 2 pixels, and up to 2 alignment pixels are also added in the embodiment described. FIG. 41 shows the EOS overhead pixels and the alignment pixels as separate; however, these four pixels are shown as one group of overhead pixels 356 in FIG. 35.

Figure 42:
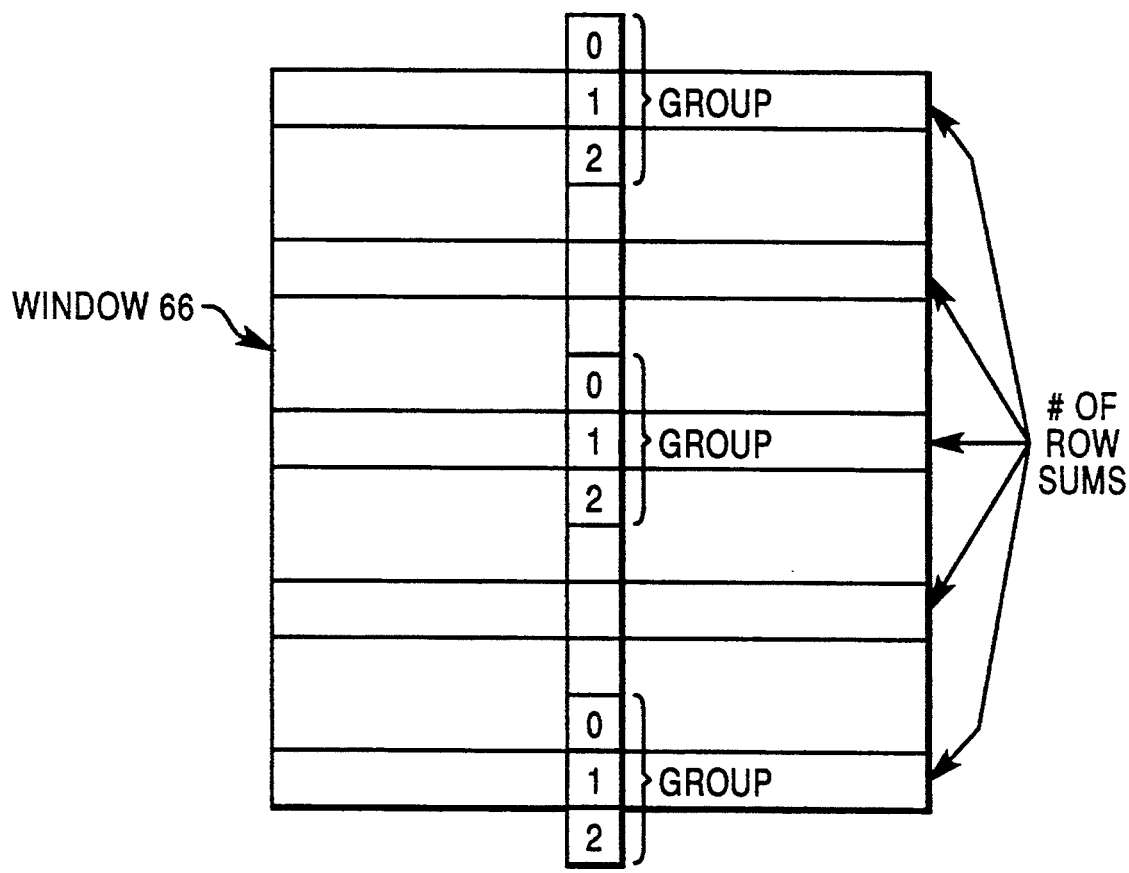
FIG. 42 is a schematic diagram of a row summer used with second embodiment of the splitter.

With regard to Step 7 of the CONFIGURATION PROCESS, the area sum shift divider value is determined in the following manner. FIG. 42 shows an area summer within a general window 66. In the embodiment described, the minimum number of row sums within an examining window 66 is 5, and it is given by Equation RS Q2 mentioned above. FIG. 42 shows a minimum number of rows (13), and for this window, there are five row sums when using every third row for the area sum. Notice for this window 66, that the pixel marked "1" within the Group of three pixels is within the window near the extremity thereof. The maximum number of rows within the examining window 66 is 51, and it is given by KDy (Max)=51. For the particular application being discussed in which every third row is used within the examining window 66, the Number Of Row Sums is equal to:

$$5 + 2 * TRUNC \frac{[KDy - 13]}{6}.$$

For a window size of 25 pixels square, the above equation gives the Number Of Row Sums equal to 9, with the layout being similar to that shown in FIG. 42. The Area Sum Pixels=Number Of Row Sums (in Q2 and also in the window 66)* KDy.

Q2 in the above equation relates to Row Sum Queue #2 shown in FIG. 33B.

The maximum shift division possible=N=TRUNC [$Log_2$ (Area Sum Pixels)].

The above equation is utilized in connection with the multiplexer 328 shown in FIG. 33A. It should be recalled that six bit gray scale values are being summed by the row sums within the window 66 (like FIG. 42) and shifting is done to perform the division to arrive at the scaling factor as discussed in relation to step 56 in FIG. 6.

$$\text{The scaling factor} = \frac{\text{Area Sum Pixels}}{2^N}.$$

Figure 43:
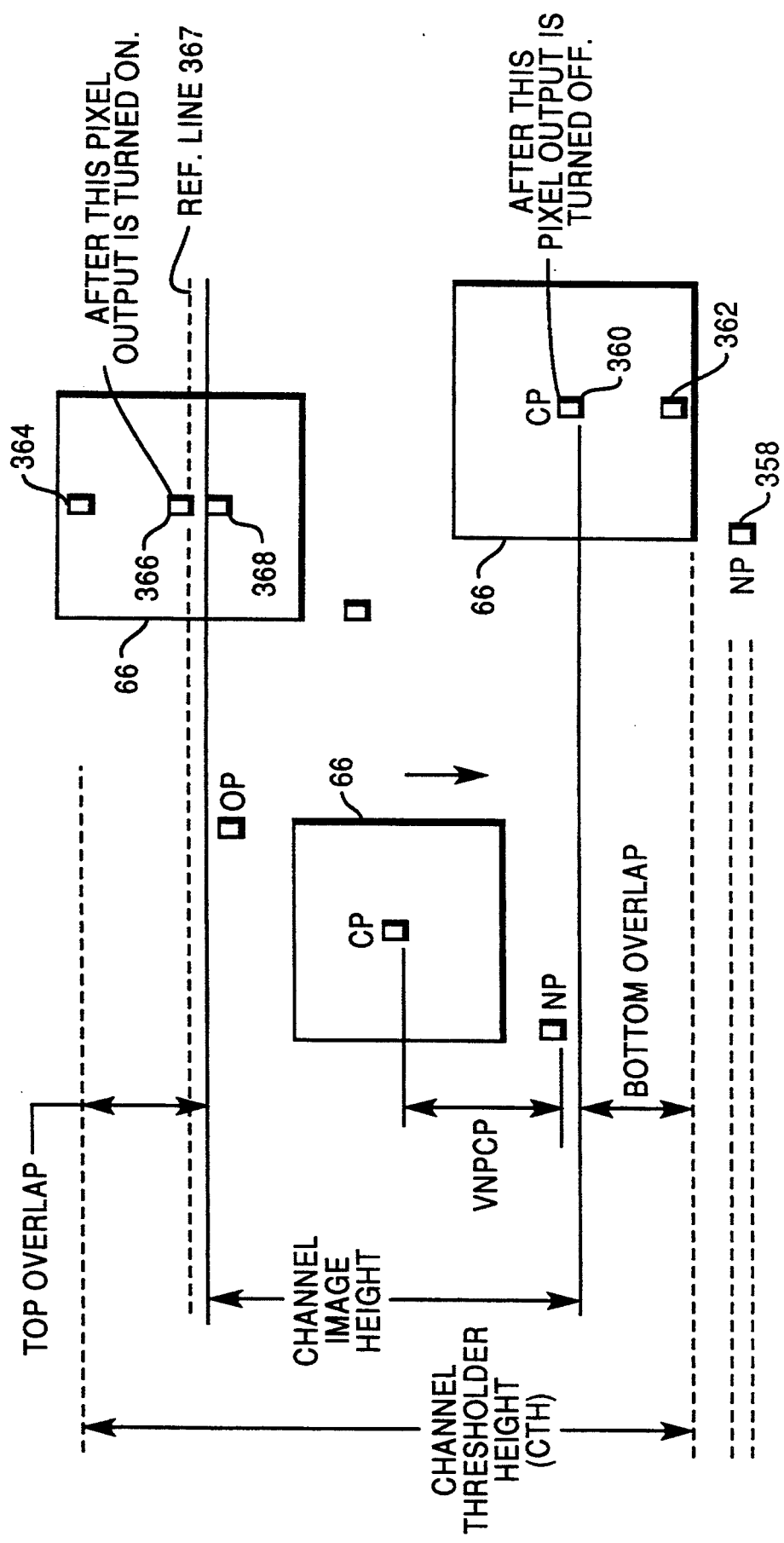
FIG. 43 is a schematic diagram showing how certain pixels included in the overlap portions of an associated channel are removed.

With regard to Step 9 of the CONFIGURATION PROCESS 346, computing the overlap pixel removal values is accomplished in the following manner. FIG. 43 is a schematic diagram showing how certain pixels located in the associated overlap areas for a channel are removed. As a general statement, the pixels in the overlap area are used for thresholding the pixels close to the channel borders; however, the pixels in the overlap areas which happen to be thresholded by the thresholders, like #1 and #2, for example, are not utilized by the associated compressors, like #1 and #2 (FIG. 1) of the system 10. With regard to FIG. 43, the alignment and EOS overhead pixels are located below the bottom of the bottom overlap for the channel shown therein. This particular channel has a bottom and a top overlap because it is one of the inner channels (like #2 or #3) shown in FIG. 26, for example.

Figure 44:
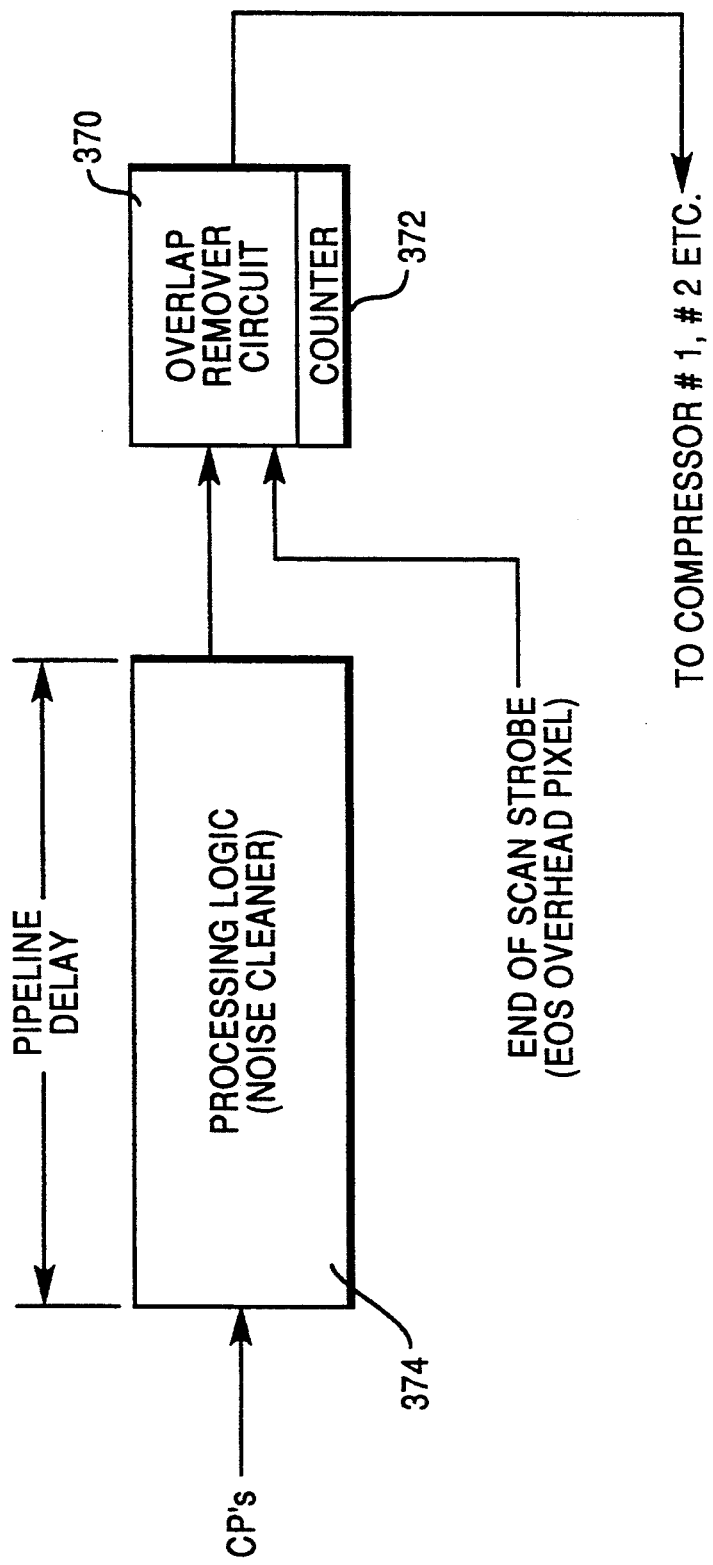
FIG. 44 is a schematic diagram showing certain circuitry related to that shown in FIG. 43.
Figure 46:
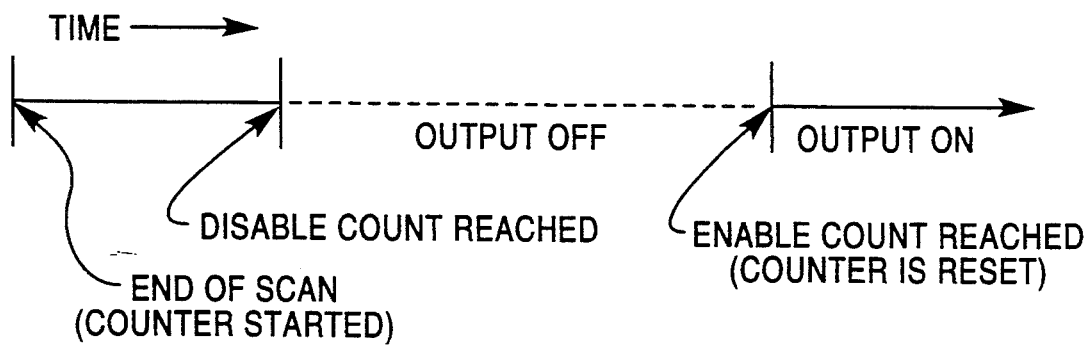
FIG. 46 is a schematic diagram showing showing a certain overlap removal process.

As the window 66 is moved downwardly, as viewed in FIG. 43, a point will be reached at which the last of the overhead pixels is located at the new pixel (NP) position 358 relative to the window 66. At this moment, the center pixel CP at position 360 is still within the channel zone or channel image height (CIH). A point to be made here is that thresholders, like #1, and #2 in FIG. 1, for example, continue to process data for whatever data is put into these units. As stated previously herein, a pixel (among others) at position 362 in FIG. 43 is used in the thresholding of pixel 360 which is the last pixel within the channel (CIH) shown; however, the pixel at position 362 should not be included as valid data for the channel (CIH). The same is true for the pixels at positions 364 and 366. The system 10 must calculate how many new pixels must be counted after the last overhead pixel before the output to the compressors (center pixels) is disabled and how many new pixels must be counted before the output from the thresholders (center pixels) is again turned on for the next scan line as representing valid data within the associated channel; the count values for these amounts are referred to as the Overlap Disable Count and the Overlap Enable Count, respectively. The circuitry for removing the "overlap" pixels is shown as an overlap remover circuit 370 which may include a counter 372 (shown schematically) for counting the center pixels to be removed in the process being discussed. When the examining window 66 reaches the position where the NP Pixel Group enters the EOS Overhead Pixel area (i.e. an End Of Scan signal is received), the overlap pixel counter, like 372 in FIG. 44, is enabled to start counting. When this counter 372 reaches the "Overlap Disable Count" value, the output of the thresholder (which passes CP values), is disabled. Later, when this counter 372 reaches the "Overlap Enable Count", the output of the thresholder is turned on again. This process is shown schematically in FIG. 46. An End Of Scan starts the counting process mentioned for both the Overlap Enable and Disable counts. This process removes the pixels associated with the top and bottom overlaps and the alignment and EOS overhead pixels from the output. In this manner only valid data or thresholded pixels (coming from the output of the overlap remover circuit 370) are used for each of the channels in the system 10, and valid data appears near the "seams" between the channels. After the pixel at position 366 (FIG. 43) is reached, the output to the associated compressor is turned on to provide a reference line 367 for the associated compression scheme as discussed earlier herein. The reference line 367 is outside the Channel Image Height; this aspect will be made clearer hereinafter.

The Overlap Disable Count mentioned in the previous prargraph =
VNP−CP − [bottom overlap + EOS overhead + alignment + offset] + Pipeline Delay.

The offset mentioned in the above equation takes into account the Last Pixel Position (LPP) of the Channel Thresholder Height and the number of alignment pixels required for the channel relative to VNP-CP; this is related to a Look-Up Table 291 (FIG. 47) which shows offset values.

$$VNP-CP = 3 * \left(4 + TRUNC \frac{[KDy - 13]}{6}\right).$$

The Pipeline Delay mentioned above is implementation dependent, and it reflects the number of stages added ahead of the overlap remover circuit 370 (FIG. 44). The Pipeline Delay is associated with processing logic like 374 which may include a noise cleaner, for example. In the embodiment described, the Pipeline Delay is equal to five pixels. Therefore, in the embodiment described, $$3 * \left(4 + TRUNC \frac{[KDy - 13]}{6}\right) - \begin{array}{l}\{Bottom\ Overlap\ + \\ ALC\ +\ Overhead\ + \\ Offset\} + 5.\end{array}$$

After receiving the "End of Scan Strobe" shown in FIG. 44, the number of pixels to count prior to turning on the output is referred to as an Overhead Enable Count;

this Count is =

Overlap Disable Count + {Bottom Overlap + ALC +

Overhead + Top Overlap}.

The above value ensures that the center pixels CP's being outputted to the compressors (FIG. 44) will be positioned within the channel image height CIH as discussed in relation to FIG. 44 in the next scanning line 14. It should also be recalled that the top overlap includes a reference line, like reference line 367 in FIG. 43, which is used by the particular compression scheme being used in the system 10. This reference line 367 has to be sent to the associated compressor in order to enable that compressor to start compression relative to the first row of data within the Channel Image Height for that particular channel. In other words, the Overlap Enable Count mentioned above must be reduced by one pixel, and accordingly, Overlap Disable Count + {Bottom Overlap + ALC +

-continued
Overhead + Top Overlap} − 1.

With regard to Step 10 of the CONFIGURATION PROCESS 346, the Start and End pixel numbers for each channel which were calculated at Step 4 of the CONFIGURATION PROCESS, are used the first and last Splitter Pixel Words. A Pixel Word is a group of four pixels to be received for each channel.

With regard to Step 11 of the CONFIGURATION PROCESS 346, the pixel position of the first pixel in the start or First Splitter Pixel Word (FSPW) is computed in the following manner. As previously stated, the splitter 32 or 33 outputs pixels (one at a time) to each of the associated channels as discussed relative to FIG. 1. The splitter 32 shown in FIG. 1 receives one pixel word at a time from the Channels #S1 and #S2 coming from the scanner 18. A splitter word has four pixels. For a 2 channel scanner, the pixels must first be converted to a four pixel word format before being sent to the splitter 32. If a scanner 18 which had four output channels instead of the two shown were to be used, there would be four pixels per word being inputted into the splitter 32 instead of the two shown. Accordingly, to cover the situation in which pixel words of a length of four pixels are inputted into the splitter 32 or 33, the following applies.

Using the SSPN and the ESPN values previously calculated with regard to FIG. 39, for example, the following items can be computed:

1. The First Splitter Pixel Word (FSPW) for a channel.
2. The Last Splitter Pixel Word (LSPW) for a channel.
3. The Number of Splitter Pixel Words to be received (SPWNUM).
4. The Position of the First Pixel within the First Splitter Pixel Word (FPL); and
5. The Position of the Last Pixel within the Last Splitter Pixel Word (LPL).

The equations for the above five situations are as follows:

$$FSPW = TRUNC \frac{(SSPN)}{4} + 1. \quad\quad 1.$$

This equation is used in Step 11 of the CONFIGURATION PROCESS 346. The "4" in the denominator equals the number of pixels per pixel word; this would be changed to a "2" if 2 pixels per pixel word are desired.

$$LSPW = TRUNC \frac{(ESPN)}{4} + 1. \quad\quad 2.$$

This equation is used in Step 10 of the CONFIGURATION PROCESS 346.

3. $SPWNUM = (LSWPW - FSPW) + 1.$

This equation is used in Step 10 of the CONFIGURATION PROCESS 346.

4. $FPL = SSPN\ MOD\ 4.$

This is used in Step 11 of the CONFIGURATION PROCESS 346.

5. LPN=ESPN MOD 4.

This is used in Step 12 of the CONFIGURATION PROCESS 346.

The different parameters mentioned above enable the splitters 32 and 33 to "split out" the scan data for each of the channels, like #1–#4, for example. Another point to stress is that for splitter 33, each channel sends out dummy pixels to each associated thresholder at the end of every scan line of data coming from the scanning line 14. This enables each thresholder, like #1–#4, for example, to have two EOS overhead pixels and to add up to two alignment pixels as discussed earlier herein; this is for each of the scan lines of data within each channel. The four pixels (two EOS overhead plus two alignment) are reflected in the following EMPR equation.

$$EMPR = \frac{N * \text{Channel Pixel Processing Rate}}{1 + \frac{(N-1)(KDY + 2) + N * 4}{\text{Max Dkt Ht * Resolution}}}.$$

In the above equation, EMPR stands for empirical processing rate, and this equation is similar to the Effective Pixel Rate discussed previously herein. The Maximum Document Height * Resolution mentioned above is the same as the Frame Height used earlier herein.

Figure 45:
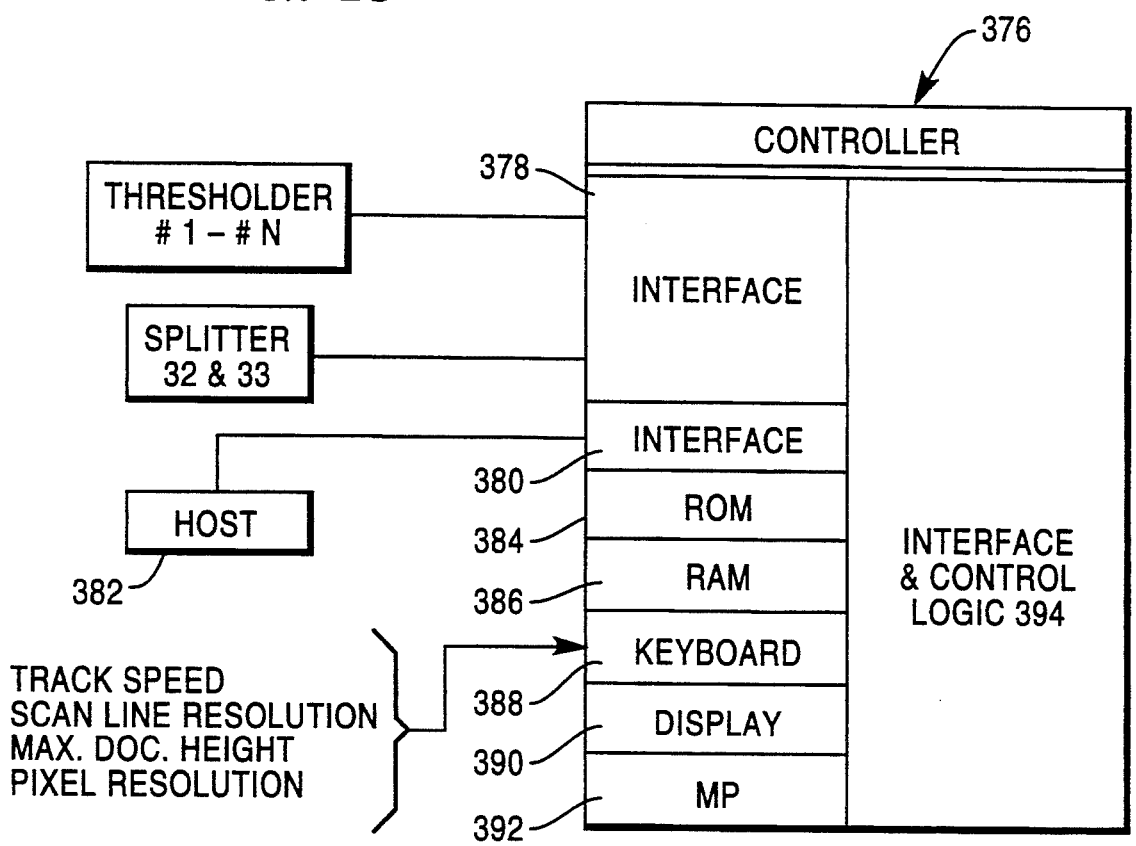
FIG. 45 is a schematic diagram showing a controller used in a configuration process used in the system.

The CONFIGURATION PROCESS 346 described above may be effected on a conventional controller 376 shown in FIG. 45. The controller 376 includes an interface for coupling the controller 376 to the splitters 32 and 33, and it also includes an interface 380 for coupling the controller 376 to a host 382, if found necessary or desirable. The controller 346 also includes a ROM 384, a RAM 386, a keyboard 388, a display 392, a microprocessor (MP) 392, and interface and control logic 394 for intercoupling the various elements just discussed. The form of the controller 376 is arranged to show the functional relationships among the various elements shown and does not represent the actual form of a controller.

The configuration parameters which are calculated by the processes described herein are inserted into registers in the logic associated with the splitter 32 and thresholders (#1–#N) shown in FIG. 1, for example. These configuration parameters or values remain fixed while the application's data is being processed. When any application parameters are changed, it means that new configuration parameters must be calculated and inserted in the registers as mentioned in this paragraph before the application data can be processed. The processes or algorithms described provide a "friendly" interface between the logic and the user in that the user of the system 10 has to concern himself only with the application parameters and the resolution window size. Another feature is that subject to the limitations imposed by the amount of implementation resources (memory), the same architecture can be used to process data for any transport application where binary compression data can be used.

Figure 48:
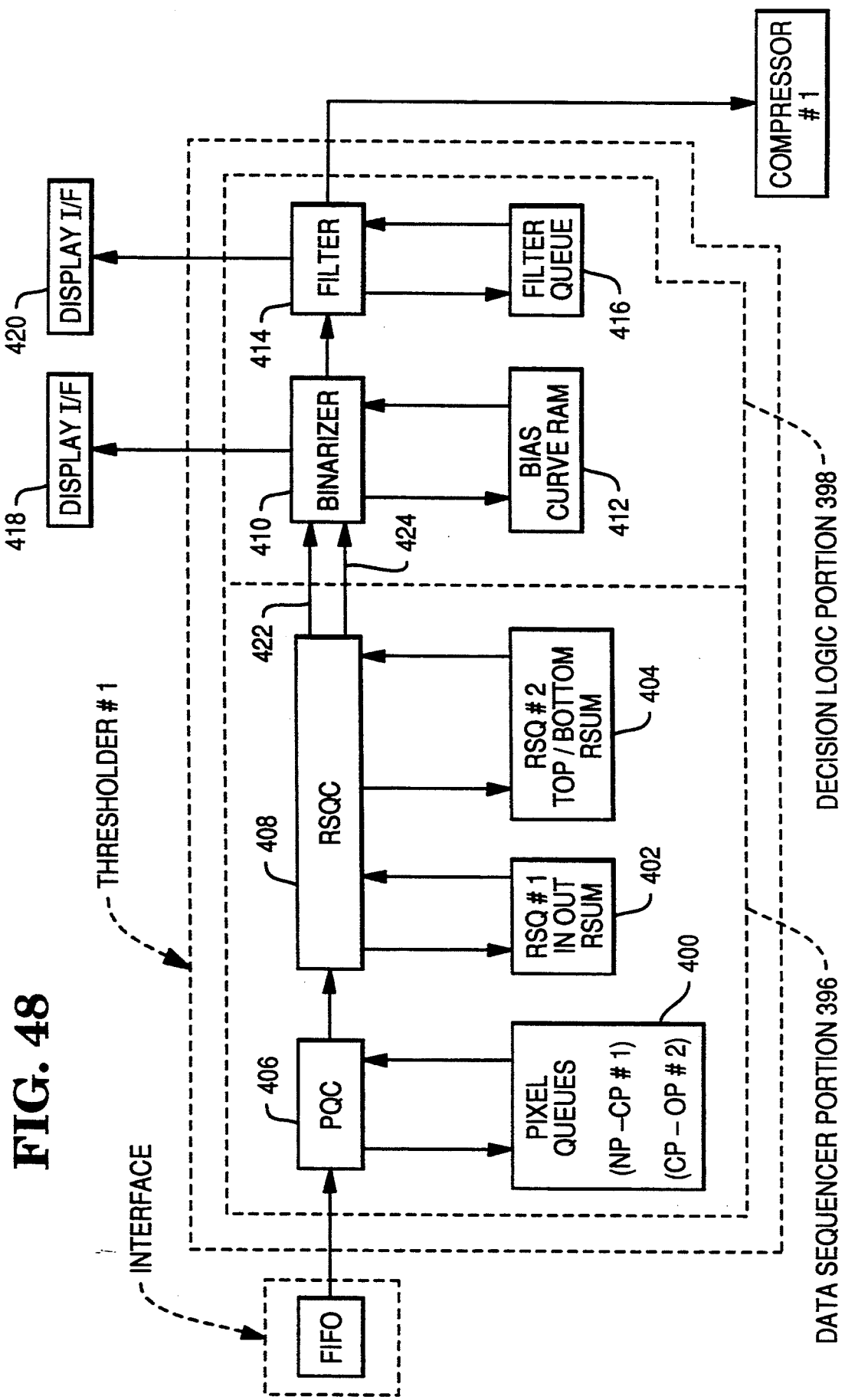
FIG. 48 is a schematic block diagram showing a thresholder shown in FIG. 1.

Some miscellaneous points appear in order. In this regard, FIG. 48 is a more generalized block diagram of a thresholder, like thresholder #1 and an associated compressor, like compressor #1, already discussed in relation to FIGS. 1, 8A, 8B, 8C, 33A, and 33B, for example. This FIG. 48 is useful in showing certain displays and filters which are used in the system 10. A thresholder, like #1, for example, broadly includes a data sequencer portion 396 shown in dashed outline and a decision logic portion 398, also shown in a dashed outline.

The data sequencer portion 396 (FIG. 48) includes: the Pixel Queues (NP-CP #1) and (CP-OP #2), shown as block 400; the Row Sum Queue #1 for In and Out Row Sums, shown as block 402; and the Row Sum Queue #2 for Top and Bottom Row Sums, shown as block 404, as already discussed earlier herein. The data sequencer portion 396 also includes a Pixel Queue Controller (PQC) 406 which represents the controllers 134 and 136 (FIG. 8A) and also includes Row Sum Queue Controller (RSQC) 408 which represents the Queue Controllers 106 and 108 (FIG. 8B) and Controller 124 (FIG. 8C). In effect, the RSQC 408 subtracts the top row sum from the bottom row sum to produce a difference row sum which is forwarded to a binarizer 410 over output bus 422. The general block diagram shown in FIG. 48 also represents the second embodiment discussed in relation to FIGS. 33A and 33B, for example.

The decision logic portion 398 (FIG. 48) of a thresholder, like #1, broadly includes a binarizer 410, bias curve RAM 412, filter 414, filter queue 416, display I/F 418, and display I/F 420. The binarizer 410 performs the functions discussed earlier with respect to FIG. 6., with the bias curve RAM 412 including the look-up table 58-1. The difference sum from the RSQC 408 is forwarded to the binarizer 410 over a bus 422 and the center pixel is forwarded to the binarizer 410 over a bus 424. The center pixel or the difference sum may be displayed on the display 418.

As alluded to earlier herein, the thresholders, like #1 in FIG. 48 include the filter 416 to remove overlaps and to remove noise pixels from a group of pixels within an examining window, like 66. For example, if all the surrounding pixels in a 3×3 examining window are white pixels, and the center pixel in this window is a black pixel, then the black pixel in this instance is changed to a white pixel because this black pixel is most likely noise; correspondingly, a black pixel surrounded by white pixels is changed to a white pixel. This is an important feature of this invention because it has reduced the compressed image file by ten percent compared to a system without it. The filtered output is sent to the associated compressor, like #1, for compression as described earlier herein. There is no need to change any of the compression algorithms on a pixel by pixel basis by this technique.

What is claimed is:

1. A machine implemented method of processing image data derived from scanning a document, with the image data presented in the form of successive scan lines of pixels, said method comprising the steps of:
   (a) splitting each scan line of pixels into a plurality of processing channels, with a predetermined number of pixels being located within each of said processing channels; and
   (b) initiating processing of the pixels in said processing channels in parallel after a predetermined number of successive scan lines of pixels has been generated but before the entire document has been scanned;
   said splitting being effected through using a split RAM bank for each one of said processing channels, and through using a computer implemented process which receives as inputs: track speed for moving the document past a scanner to generate said successive scan lines of pixels; scan line resolution from said scanner; maximum document height;

and pixel resolution to determine the number of processing channels required to meet a predetermined throughput.

2. A machine implemented method of processing image data derived from scanning a document, with the image data presented in the form of successive scan lines of pixels, said method comprising the steps of:
(a) splitting each scan line of pixels into a plurality of processing channels having boundaries therefor, with a predetermined number of pixels being located within each of said processing channels;
(b) assigning predetermined pixels located outside said processing channels as overlap pixels associated with said processing channels;
(c) using the overlap pixels associated with a said processing channel to facilitate processing of the pixels located within said processing channel; and
(d) thresholding the pixels located in said processing channel;
said splitting and assigning steps (a) and (b) being performed in one operation;
said splitting being effected through using a split RAM bank for each one of said processing channels, and through using a computer implemented process which receives as inputs: track speed for moving the document past a scanner to generate said successive scan lines of pixels; scan line resolution from said scanner; maximum document height; and pixel resolution to determine the number of processing channels required to meet a predetermined throughput.

3. A method of configuring a system for processing image data derived from scanning a document, with the image data presented in the form of successive scan lines of pixels, said method comprising the steps of:
(a) using the number of pixels in a scan line of pixels to represent a Frame Height of pixels;
(b) splitting said Frame Height of pixels into a number of processing channels, with each processing channel having a Channel Image Height; and
(c) adding at least one overlap group of pixels to each of said processing channels to arrive at a Channel Thresholder Height for each of said processing channels;
said splitting step (b) including using a predetermined number of pixels along a scan line of pixels for an Examining Window in the splitting step;
said splitting step being effected by the following formulas to arrive at the Channel Image Height (CIH) for each of three processing channels CH#1–CH#3 when the number of processing channels is three:

$$\text{For CH\#1, CIH} = \frac{\text{F.H.} \cdot \frac{(KDy + 1)}{2} + 1}{3};$$

$$\text{For CH\#2, CIH} = \frac{\text{F.H.} - (KDy + 2) + 1}{3}; \text{ and}$$

$$\text{For CH\#3, CIH} = \frac{\text{F.H.} \cdot \frac{(KDy - 1)}{2} + 1}{3};$$

wherein:
F. H.=Frame Height; and
KDy=the predetermined number of pixels along the scan line of successive pixels for the Examining Window.

4. A method of configuring a system for processing image data derived from scanning a document, with the image data presented in the form of successive scan lines of pixels, said method comprising the steps of:
(a) using the number of pixels in a scan line of pixels to represent a Frame Height of pixels;
(b) splitting said Frame Height of pixels into a number of processing channels, with each processing channel having a Channel Image Height; and
c) adding at least one overlap group of pixels to each of said processing channels to arrive at a Channel Thresholder Height for each of said processing channels;
said splitting step (b) including using a predetermined number of pixels along a scan line of pixels for an Examining Window in the splitting step;
said splitting step being effected by the following formulas to arrive at the Channel Image Height (CIH) for each of four processing channels CH#1–CH#4 when the number of processing channels is four:

$$\text{For CH\#1, CIH} = \frac{\text{F.H.} + (KDy + 1) + 2}{4};$$

$$\text{For CH\#2, CIH} = \frac{\text{F.H.} - (KDy + 1) - 2}{4};$$

$$\text{For CH\#3, CIH} = \frac{\text{F.H.} - (KDy - 1) - 2}{4}; \text{ and}$$

$$\text{For CH\#4, CIH} = \frac{\text{F.H.} + (KDy - 1) + 2}{4};$$

wherein:
F.H.=Frame Height; and
KDy=the predetermined number of pixels along the scan line of successive pixels for the Examining Window.

5. A method of configuring a system for processing image data derived from scanning a document, with the image data presented in the form of successive scan lines of pixels, said method comprising the steps of:
(a) using the number of pixels in a scan line of pixels to represent a Frame Height of pixels;
(b) splitting said Frame Height of pixels into a number of processing channels, with each processing channel having a Channel Image Height; and
(c) adding at least one overlap group of pixels to each of said processing channels to arrive at a Channel Thresholder Height for each of said processing channels;
said splitting step (b) including using a predetermined number of pixels along a scan line of pixels for an Examining Window in the splitting step;
said method further comprising the step of:
(d) assigning Start Scan line Pixel Numbers (SSPN) and End Scan line Pixel Numbers (ESPN) for each of said processing channels, starting at Channel #0 and ending at Channel #n, as follows:

For Channel #0:  $SSPN_O = 0$;

$ESPN_O = SSPN_O + (CTH_O - 1)$;

For Channel #1:  $SSPN_1 = ESPN_O - (KDy + 1)$ $ESPN_1 = SSPN_1 + (CTH_1 - 1)$; and For Channel #n: $SSPN_n = ESPN_{n-1} - (KDy + 1)$ $ESPN_n = SSPN_n + (CTH_1 - 1);$ wherein:

CTH=Channel Thresholder Height; and

KDy=the predetermined number of pixels along said scan line of pixels for said Examining Window.

6. A machine implemented method of processing image data derived from scanning a document comprising the steps of:

(a) scanning the document so as to produce successive odd and even scan lines of pixels;

(b) processing said pixels within a said scan line to generate a digital gray scale value for each of the pixels within the scan line;

(c) splitting a first said odd scan line of pixels into a plurality of processing channels so that each processing channel comprises a predetermined number of the pixels in a said scan line, with each processing channel having a starting pixel, an ending pixel, and also having a predetermined number of adjacent pixels associated therewith as part of said splitting operation;

(d) storing the pixels in said processing channels from step (c) in a first memory;

(e) splitting a first even said scan line of pixels as described in step (c);

(f) storing the pixels in said processing channels from step (e) in a second memory; and (g) repeating steps (c), (d), (e), and (f) for the remaining successive scan lines of pixels;

said splitting steps (c) and (e) being effected through using a computer implemented process which receives as inputs track speed for moving the document past a scanner to generate said successive scan lines of pixels; scan line resolution from said scanner; maximum document height; and pixel resolution to determine the number of processing channels required to meet a predetermined throughput.

7. A machine implemented method of processing image data derived from scanning a document in which successive scan lines of pixels are to be generated by a scanner, said method comprising the steps of:

(a) determining a number of processing channels to be used after splitting each said scan line of pixels into a plurality of said processing channels so that each processing channel comprises a predetermined number of the pixels in a said scan line of pixels, with each processing channel having a starting pixel, an ending pixel, and also having a predetermined number of overlap pixels associated therewith as part of said splitting operation;

said determining step being effected through using a computer implemented process which receives as inputs: track speed for moving the document past said scanner to generate said successive scan lines Of pixels; scan line resolution from said scanner; maximum document height; and pixel resolution to determine the number of processing channels required to meet a predetermined throughput;

(b) scanning the document so as to produce said successive scan lines of pixels;

(c) splitting each said scan line of pixels into said number of processing channels; and (d) processing said pixels in said processing channels in parallel.

8. The method as claimed in claim 7 in which said processing step is initiated after a predetermined number of said successive scan lines has been generated but before the entire document has been scanned.

9. The method as claimed in claim 8 in which said processing step (d) includes the steps of:

(d-1) thresholding said pixels to generate thresholded pixels; and (d-2) compressing said thresholded pixels.

* * * * *

UNITED STATES PATENT AND TRADEMARK OFFICE
CERTIFICATE OF CORRECTION

PATENT NO. : 5,390,262
DATED : February 14, 1995
INVENTOR(S) : Charles K. Pope

It is certified that error appears in the above-indentified patent and that said Letters Patent is hereby corrected as shown below:

Column 51, line 3, "$CTH_1 - 1)$" should be --$(CTH_n - 1)$--.

Signed and Sealed this

Twenty-fifth Day of April, 1995

Attest:

BRUCE LEHMAN

*Attesting Officer*   *Commissioner of Patents and Trademarks*